US006323922B1

(12) United States Patent
Suzuki et al.

(10) Patent No.: US 6,323,922 B1
(45) Date of Patent: Nov. 27, 2001

(54) LIQUID CRYSTAL DISPLAY CELL

(75) Inventors: Masayoshi Suzuki; Ken-Ichi Takatori; Ken Sumiyoshi; Setsuo Kaneko; Teruaki Suzuki; Hideo Shibahara; Yoshihiko Hirai, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/542,110

(22) Filed: Mar. 31, 2000

Related U.S. Application Data

(62) Division of application No. 09/096,607, filed on Jun. 12, 1998, now Pat. No. 6,081,314, which is a division of application No. 08/424,123, filed on Apr. 19, 1995, now Pat. No. 5,781,262.

(30) Foreign Application Priority Data

| Apr. 19, 1994 | (JP) | 6-79089 |
|---|---|---|
| Sep. 28, 1994 | (JP) | 6-233354 |
| Nov. 10, 1994 | (JP) | 6-301336 |
| Nov. 14, 1994 | (JP) | 6-278833 |
| Jan. 18, 1995 | (JP) | 7-5871 |
| Jan. 18, 1995 | (JP) | 7-5874 |
| Jan. 18, 1995 | (JP) | 7-5877 |

(51) Int. Cl.[7] .................. G02F 1/1333; G02F 1/1337
(52) U.S. Cl. .................................... 349/110; 349/129
(58) Field of Search ............................. 349/38, 110, 111, 349/128, 129

(56) References Cited

U.S. PATENT DOCUMENTS

| 4,762,400 | 8/1988 | Shimoda et al. ............. 349/128 |
| 4,813,767 | 3/1989 | Clark et al. ................. 349/128 |
| 4,917,475 | 4/1990 | Meyer et al. ............... 349/129 |
| 5,182,661 | 1/1993 | Ikeda et al. ................. 349/38 |
| 5,212,574 | 5/1993 | Katayama et al. ........... 349/38 |
| 5,223,963 | 6/1993 | Okada et al. ............... 349/129 |
| 5,280,375 | 1/1994 | Tsuda et al. ............... 349/129 |
| 5,321,537 | 6/1994 | Okada et al. ............... 349/128 |
| 5,339,181 | 8/1994 | Kim et al. ................... 349/38 |
| 5,400,157 | 3/1995 | Won ........................... 349/111 |
| 5,402,254 | 3/1995 | Sasano et al. ................ 349/38 |
| 5,424,857 | 6/1995 | Aoki et al. ................... 349/38 |
| 5,473,455 | 12/1995 | Koike et al. ............... 349/129 |
| 5,594,570 | 1/1997 | Hirata et al. ............... 349/129 |
| 5,666,178 | 9/1997 | Hirata et al. ............... 349/136 |
| 5,781,262 | 7/1998 | Suzuki et al. ............... 349/128 |

FOREIGN PATENT DOCUMENTS

| 57-186735 | 11/1982 | (JP) . |
| 58-43723 | 9/1983 | (JP) . |
| 59-211019 | 11/1984 | (JP) . |
| 60-211422 | 10/1985 | (JP) . |
| 61-47932 | 3/1986 | (JP) . |
| 61-174725 | 8/1986 | (JP) . |
| 63-106624 | 5/1988 | (JP) . |
| 64-88520 | 4/1989 | (JP) . |
| 1-245223 | 9/1989 | (JP) . |
| 5-173142 | 1/1993 | (JP) . |
| 5-173137 | 7/1993 | (JP) . |
| 5-173138 | 7/1993 | (JP) . |
| 5-203951 | 8/1993 | (JP) . |
| 5-210099 | 8/1993 | (JP) . |
| 5-281545 (A) | 10/1993 | (JP) . |
| 6-110060 (A) | 4/1994 | (JP) . |
| 6-148641 | 5/1994 | (JP) . |

Primary Examiner—William L. Sikes
Assistant Examiner—Dung Nguyen
(74) Attorney, Agent, or Firm—Foley & Lardner

(57) ABSTRACT

Liquid crystal display (LCD) has sub-pixel domains in each of pixels to obtain a wide viewing angle. The sub-pixel domains are formed by divided orientation alignment in which the sub-pixel domain are subjected to rubbing in different directions opposite to each other. The liquid crystal has a splay-type TN deformation structure in the first sub-pixel domain and a normal TN deformation structure in the second sub-pixel domain. The pre-tilt angles of the liquid crystal in the first domain and second domain are selected to obtain a wide viewing angle. The LCD has a shield pattern for for shielding disclination causing afterimages and storage capacitor electrodes having a function as a signal lines.

4 Claims, 55 Drawing Sheets

FIG. 28
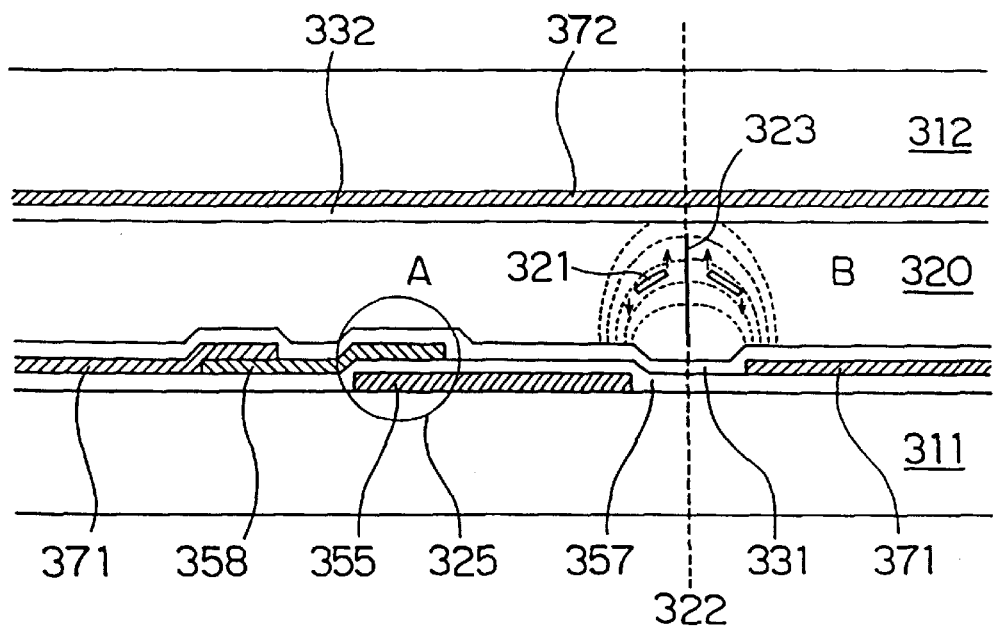
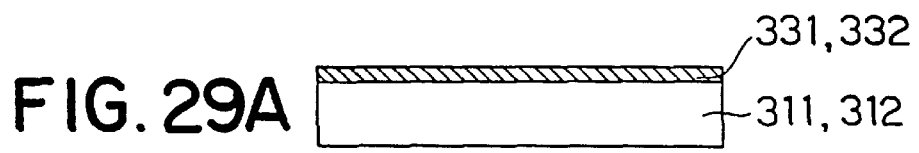
FIG. 29A
FIG. 29B
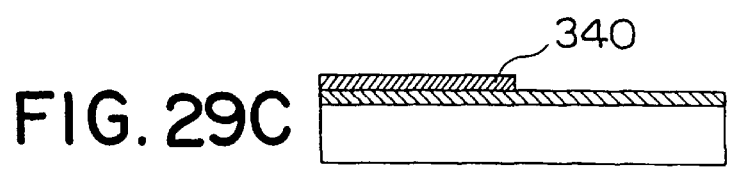
FIG. 29C
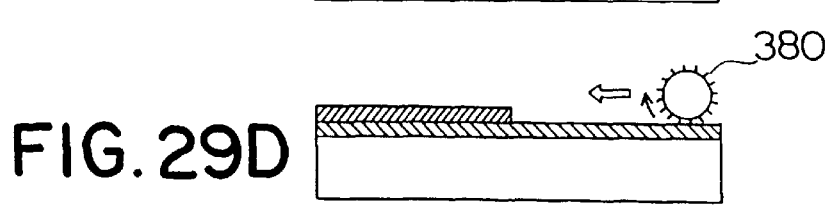
FIG. 29D
FIG. 29E

RUBBING DIRECTION

PRE TILT DIRECTION

RUBBING DIRECTION

RUBBING DIRECTION

RUBBING DIRECTION

RUBBING DIRECTION

LIQUID CRYSTAL DISPLAY CELL

This application is a divisional application Ser. No. 09/096,607, filed Jun. 12, 1998 now U.S. Pat. No. 6,081,314, which is a divisional of Ser. No. 08/424,123, filed Apr. 19, 1995, now a U.S. Pat. No. 5,781,262 granted Jul. 14, 1998.

BACKGROUND OF THE INVENTION

1. Field of the Invention

The present invention relates to a liquid crystal display (LCD) cell and, more particularly, to an LCD cell having a wider view angle for display by providing a plurality of active areas on a substrate.

2. Description of the Related Art

Liquid crystal display cells having a plurality of minute areas in each pixel, which is generally called sub-pixel domains, have been reported in Patent Publication Nos. JP-A-82-186735, JP-B-83-43723, JP-A-84-211019, JP-A-88-106624, JP-A-89-88520, JP-A-89-245223, JP-A-93-173138, JP-A-93-203951. The main object in dividing a pixel into a plurality of minute areas is to align orientations of the respective areas so that viewing angle of the areas constituting one pixel may be compensated by each other in the pixel. There exist two major technologies for aligning the orientation of a liquid crystal. One is a slanting deposition technology of an oxidized silicon film while the other is a rubbing technology in which a polyimide film is rubbed to be directed toward a certain direction, the latter of which has widely been applied due to its ease of operation. Polyimides as used in this technology are described in Patent Publication Nos. JP-A-86-47932 and JP-A-86-174725, which may be SE-7311 supplied from Nissan Chemical Corp. and AL-1051 supplied from Japan Synthetic Rubber, both of which are trademarks.

FIG. 23 of the present application (FIG. 3 of Publication JP-A-88-106624) is a cross-sectional view showing an image pixel of a liquid crystal display cell having two-orientations in each pixel.

On a first glass substrate for an active matrix, namely a TFT substrate, there are provided transparent pixel electrodes (indicated as ITO, indium-tin oxide) each having a unit size as large as a pixel, an orientation film and TFTs for driving the pixel electrodes. On a second glass substrate, namely a color filter substrate, there are also provided a transparent counter electrode (ITO) and an orientation film. Each pixel is divided into sub-pixel domains A and B.

Rubbing processings are performed on respective orientation films, in different directions in the divided sub-pixel domains A and B shown as arrows in FIG. 24. In FIG. 24, arrows written in broken lines indicate the directions for rubbing the orientation film located on the TFT substrate while arrows written in solid lines indicate the directions for rubbing the orientation film formed on the color filter substrate. On the other hand, arrows written in solid arcs shown in FIG. 24 indicate twisting directions and angles of the oriented liquid crystals between both substrates.

FIG. 25 is cross-sectional views taken along lines a–a' and b–b', respectively, of FIG. 24 showing both pre-tilt directions of the liquid crystal induced by orientation forces provided by both substrate surfaces and forces applied to the liquid crystal by the electric field acting between the substrates.

The following paragraphs 1)–3) present reasons why each pixel divided into a plurality of sub-pixel domains having different orientations of a liquid crystal attains a wider viewing angle.

1) FIG. 24 indicates that helical twist directions of the liquid crystal are the same between sub-pixel domains A and B while FIG. 25 indicates that an angle, with which the major axes of the liquid crystal in the vicinity of substrate initially intersects a substrate surface, and, which is called a "pre-tilt angle", has different rotational directions therebetween in sub-pixel domains A and B.

2) The difference in pre-tilt directions induces a difference in directions of the major axes of the liquid crystal during application of a voltage, which is called "tilt directions", as shown in FIG. 25, so that sub-pixel domains A and B compensate optical characteristics of each other within each set of sub-pixel domains in a pixel if rays of light are incident in directions other than a perpendicular direction onto the panel.

3) Viewing angle dependence of optical characteristics during application of an electric field compensated between sub-pixel domains provides optical characteristics having a less viewing angle dependence. Especially, even when a viewing angle is varied during a gradation display, a tone reversal phenomenon will not appear.

Division of a pixel into a plurality of minute areas are performed by applying a plurality of different rubbing directions to the polyimide film in the respective minute areas. Practical procedures of implementing rubbing steps for division have been reported in Publication Nos. JP-B-85-211422 and JP-B-93-203951. For instance in JP-B-85-211422, a dividing procedure of a pixel is described wherein a part of a polyimide film is masked by a photoresist film after a first rubbing step is effected for the entire area of the polyimide film, then the other part of the polyimide film is subjected to a second rubbing step and finally the photoresist film is removed. On the other hand, Publication Nos. JP-B-93-173137 and JP-B-93-203951 show another procedure for dividing a pixel wherein orientation alignment for division is performed to a polyimide film formed on a first substrate while a uniform orientation alignment is pursued to the polyimide film formed on a second substrate disposed in opposed relationship to the first substrate. In this operation, the pre-tilt angle of the liquid crystal in a vicinity of the first substrate is set equal to or larger than that of the liquid crystal in the vicinity of the second substrate, so that the orientation of the liquid crystal in the vicinity of the first substrate are dominant as compared with that of the liquid crystal in the vicinity of the second substrate. Thus, it enables a dividing orientation alignment in a fewer steps of processing.

The conventional orientation alignments for dividing a pixel as described above have problems that one orientation direction turns dominant over the other, depending on combination of rubbing orientations between the two areas.

Furthermore, a disclination line is generated on a boundary between the areas which have different orientations even when the divided orientation alignment is obtained. The disclination line shifts or deforms, especially when a driving voltage is applied to liquid crystal display cells. The shift of the disclination line is observed as an afterimage, which deteriorates performance of display cells.

SUMMARY OF THE INVENTION

It is an object of the present invention to provide a liquid crystal display cell having a wide view angle and a high performance characteristic.

It is an additional object of the present invention to provide a liquid crystal display cell in which the orientation of liquid crystals in each of sub-pixel areas is stabilized for providing an excellent image over the entire surface of the liquid crystal display cell.

It is a further object of the present invention to provide a method for manufacturing a liquid crystal display cell as described above.

According to a first aspect of the present invention, there is provided a liquid crystal display cell comprising: first and second substrates opposed to each other; an array of pixel electrodes overlying the first substrate, each of the pixel electrodes defining a pixel area and having an active element for applying a voltage to the pixel electrode; at least one counter electrode overlying the second substrate and opposing the array of pixel electrodes; a first and a second orientation film overlying the pixel electrode and the counter electrode, respectively, the first orientation film having first and second areas subjected to a divided orientation alignment in different directions to divide the pixel area, the second orientation film being subjected to a uniform orientation alignment; and a liquid crystal interposed between the first orientation film and the second orientation film, the first area and second area defining a first domain and a second domain, respectively, for the liquid crystal, the liquid crystal having a splay-type deformation structure in the first domain and a deformation structure other than the splay-type deformation structure in the second domain, the liquid crystal having a first pre-tilt angle in the first domain and a second pre-tilt angle in the second domain in the vicinity of the first orientation film, the first pre-tilt angle being larger the second pre-tilt angle.

It is preferred that the pre-tilt angle of the liquid crystal in the vicinity of the second substrate subjected to a uniform orientation alignment is less than at least the pre-tilt angles of the liquid crystal in the vicinity of the first portion of the first substrate, and more preferably, less than both pre-tilt angles of the first and second portions of the first substrate, from the point of view of display stability.

According to a second aspect of the present invention, there is provided a liquid crystal display cell comprising: first and second substrates opposed to each other; an array of pixel electrodes overlying the first substrate, each of the pixel electrodes defining a pixel area and having an active element for applying a voltage to the pixel electrode; at least one counter electrode overlying the second substrate and opposing the array of pixel electrodes; a first and a second orientation film overlying the pixel electrode and the counter electrode, respectively, at least one of the first orientation film and the second orientation film being subjected to a divided orientation alignment in different directions to divide the pixel area at boundary into a first area and a second area; a plurality of gate bus lines each for supplying a signal to a control electrodes of a row of the active elements and a plurality of drain bus lines each for supplying a voltage to a column of the pixel electrodes through corresponding the active element; a liquid crystal interposed between the first orientation film and the second orientation film, the first area and second area defining a first domain and a second domain, respectively, for the liquid crystal; and a first shield film, at least a part thereof disposed in alignment with a region adjacent to at least one of the gate bus lines and drain bus lines, for shielding a disclination deformed by a lateral electric field acting between the pixel electrode and at least one of the gate bus lines and drain bus lines during operation of the liquid crystal display cell.

According to a third aspect of the present invention, there is provided a liquid crystal display cell comprising: first and second substrates opposed to each other; an array of pixel electrodes overlying the first substrate, each of the pixel electrodes defining a pixel area and having an active element for applying a voltage to the pixel electrode; at least one counter electrode overlying the second substrate and opposing the array of pixel electrodes; a first and a second orientation films overlying the pixel electrode and the counter electrode, respectively; a plurality of gate bus lines each for supplying a signal to control electrodes of a row of the active elements and a plurality of drain bus lines each for supplying a voltage to a column of the pixel electrodes through a corresponding active element; and a liquid crystal interposed between the first orientation film and the second orientation film, at least one of the first orientation film and the second orientation film being subjected to a divided orientation alignment to divide the pixel area at a boundary into a first area and a second area, the first area and second area defining a first domain and a second domain, respectively, for the liquid crystal, wherein the pixel electrode has a cut-away portion aligned with the boundary between the first area and second area.

In a preferred embodiment according to the third aspect of the present invention, a first shield pattern film provided in the vicinity of a boundary dividing the sub-pixel domains at a center of a pixel electrode, in the vicinities of gate bus lines amid a drain bus line covers a disclination deformed by lateral electric fields acting between the gate bus lines and the pixel electrode as well as between the drain bus line and the pixel electrode, the first shield pattern film being formed on the active device substrate side, while a second shield pattern film provided on the color filter substrate shields active devices and peripherals of the pixel electrode.

Alternatively, the third aspect of the present invention provides a liquid crystal display cell comprising:

first and second substrates opposed to each other; an array of pixel electrodes overlying the first substrate, each of the pixel electrodes defining a pixel area and having an element for applying a voltage to the pixel electrode; at least one counter electrode overlying the second substrate and opposing the array of pixel electrodes; first and second orientation films overlying the pixel electrode and the counter electrode, respectively;

a plurality of gate bus lines each for supplying a signal to control electrodes of a row of the active elements and a plurality of drain bus lines each for supplying a voltage to a column of the pixel electrodes through a corresponding active element; and a liquid crystal interposed between the first orientation film and the second orientation film, at least one of the first orientation film and second orientation film being subjected to a divided orientation alignment to divide the pixel area at a boundary into a first area and a second area, the first area and second area defining a first domain and a second domain, respectively, for the liquid crystal, wherein each of the pixel electrodes has an offset at the boundary in a direction of the boundary whereby a gap between the each of pixel electrodes an adjacent one of the drain lines is different at both sides of the boundary.

According to a fourth aspect of the present invention, there is provided a liquid crystal display cell comprising: first and second substrates opposed to each other; an array of pixel electrodes overlying the first substrate, each of the pixel electrodes defining a pixel area and having an active element for applying a voltage to the pixel electrode; at least one counter electrode overlying the second substrate and opposing the array of pixel electrodes; a plurality of gate bus lines each for supplying a signal to control electrodes of a row of the active elements and a plurality of drain bus lines each for supplying a voltage to a column of the pixel electrodes through a corresponding active element; a first and a second orientation film overlying the first and second substrates, respectively; and a liquid crystal interposed between the first orientation film and the second orientation film, wherein one of the pixel electrodes has an edge portion constituting a storage capacitor electrode opposing one of the gate bus lines, with an insulator layer interposed therebetween, to form a storage capacitor, at least a part of an edge of the storage capacitor electrode extending in a first direction other than the direction extending parallel or perpendicular to a second direction in which the parallel gate bus lines extend.

According to a fifth aspect of the present invention, there is provided a method for manufacturing a liquid crystal display cell comprising first and second substrates opposed to each other, an array of pixel electrodes overlying said first substrate and each defining a pixel area and a counter electrode overlying said second substrate and opposing said array of said pixel electrode, first and second orientation films overlying said first and seconds substrates, respectively, a liquid crystal disposed between said first orientation film and said second orientation film, said method consecutively including steps of: rubbing at least one of said first and second orientation films; forming a photoresist film on said at least one of said first and second orientation films; patterning said photoresist film into a photoresist pattern by photolithography, said photoresist pattern defining a first area for masking and a second area for exposing; removing said photoresist pattern by an etching solution, without another step of rubbing before said step of removing; and fabricating said first substrate, second substrate and said liquid crystal to form said liquid crystal cell in which said first area provides a first pre-tilt angle to said liquid crystal in the vicinity of said first area, said second area providing a second pre-tilt angle to said liquid crystal in the vicinity of said second area.

The method for manufacturing a liquid crystal display cell provides a structure in which liquid crystals have different pre-tilt angles in each of the pixels. Since it is not necessary to form a two-layer structure in part of the orientation film, the number of manufacturing steps can be reduced, thereby reducing the manufacturing costs.

We have found through experiments that, by forming a photoresist pattern on a rubbed orientation film and subsequently removing the photoresist pattern, areas providing different pre-tilt angles can be formed in accordance with the photoresist pattern. A method for manufacturing a liquid crystal display panel according to the fifth aspect of the present invention has been achieved based on this finding.

In a prefered embodiment, each of the orientation films of the first and second substrates is subjected to the alignment process as described above such that a larger pre-tilt angle is provided to the liquid crystal in the vicinity of the surface of the orientation film in first minute areas and a smaller pre-tilt angle is provided to the liquid crystal in the vicinity of the surface of the orientation film in second minute areas, wherein the first and second substrates are combined such that the first areas of the orientation film of the first substrate oppose to the second areas of the orientation film of the second substrate, while the second areas of the orientation film of the first substrate oppose to the first areas of the orientation film of the second substrate.

Further, the alignment process may be modified such that the orientation film of one of the substrates (for example, the first substrate) is processed such that liquid crystals in minute areas have different pre-tilt angles in the vicinity of the surface of the orientation film, and the orientation film of the other substrate (the second substrate) is processed such that liquid crystal in minute areas have a single uniform pre-tilt angle in the vicinity of the surface of the orientation film. In this case, it is possible to obtain a structure in which the inequality $\alpha°>\gamma°>\beta°$ is satisfied, wherein $\alpha°$ is the larger one of the pre-tilt angles in the vicinity of the orientation film of the first substrate, $\beta°$ is the smaller one of the pre-tilt angles in the vicinity of the orientation film of the first substrate, and $\gamma°$ is the pre-tilt angle in the vicinity of the orientation film of the second substrate.

BRIEF DESCRIPTION OF THE DRAWINGS

The above and other objects, features and advantages of the present invention will be more apparent from the following description, taking in conjunction with accompanying drawings in which:

FIG. 28 is a sectional view of the liquid crystal display cell of Embodiment 22 which shows the structure around a gate bus line;

FIGS. 29A–29E are sectional views showing an alignment process performed for the substrates in consecutive steps;

DETAILED DESCRIPTION OF THE PREFERRED EMBODIMENT

Figure 1:
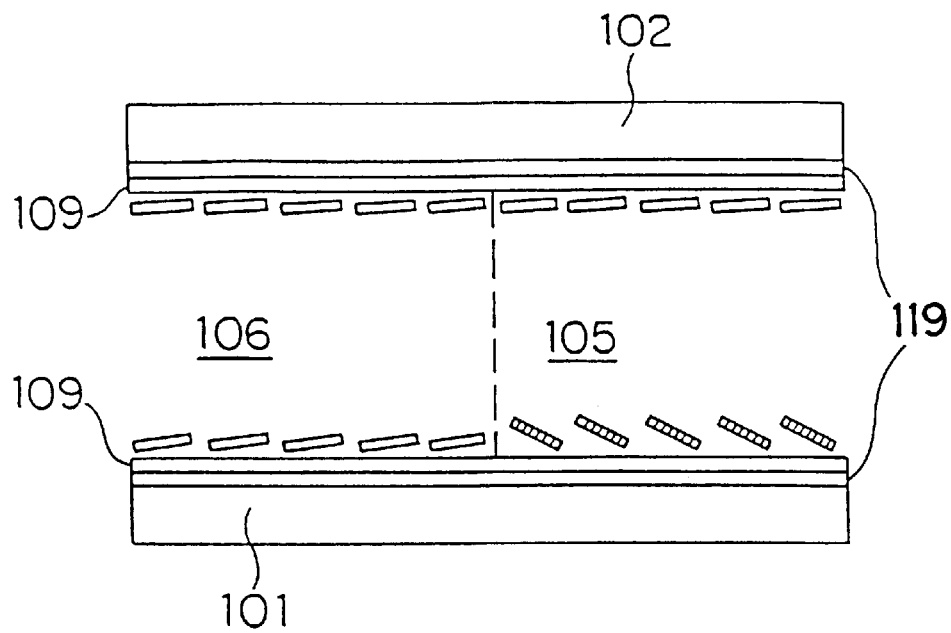
FIG. 1 is a cross-sectional view showing a first schematic construction of a liquid crystal display cell according to a first aspect of the present invention.

Before describing preferred embodiments according to the present invention, more precise principles and mechanisms of the present invention will be explained for a better understanding of the first aspect of the present invention.

In an embodiment of the first aspect of the present invention, a photoresist technology which is similar to Patent Publication Nos. JP-A-85-211422 and JP-A-93-203951 is employed for implementing an orientation alignment in different directions, for example, in opposite directions in each pixel. After a first rubbing step, a first portion of each pixel of the polyimide film is covered by a photoresist pattern. After a second rubbing step for a second portion of each pixel of the polyimide film which is not covered by the photoresist pattern, the photoresist pattern is removed by a chemical solution. By this operation, a difference in pre-tilt angle of the liquid crystal is provided between in the first portion covered by the photoresist pattern and the second portion not covered by the photoresist pattern. In the present invention, the difference in pre-tilt angles is designed so that the pre-tilt angle of the liquid crystal disposed in the vicinity of the first portions exhibiting a splay-type deformation, which is unstable from an energy level point of view, is set larger than the pre-tilt angle of the liquid crystal disposed in the vicinity of the second portions exhibiting any of deformations except the splay-type deformation.

For instance, it is assumed that each pixel of the liquid crystal display cells of a twisted nematic (TN) structure is divided into two portions by employing two rubbing steps having orientations different to each other by 180 degrees. It will provide a first domain, which exhibits an ordinary TN deformation and has a stable energy level, and a second domain, which exhibits a splay-type TN deformation and has an unstable energy level. On that occasion, it is generally easy to design by selecting a combination of rubbing directions during cell assembly so that either of the two pre-tilt angles is larger than another in the cell structure. Accordingly, in a liquid crystal display having a first substrate subjected to a divided orientation alignment and a second substrate subjected to a uniform orientation alignment, the pre-tilt angle in a first domain exhibiting a splay-type TN deformation is set higher than the pre-tilt angle in a second domain exhibiting an ordinary TN deformation in the vicinity of the first substrate. Consequently, the divided orientations are set stable, so that the disclination line is fixed strongly to the boundary line existing between the two domains.

On the contrary, if the pre-tilt angle in the second domain exhibiting an ordinary TN deformation is set larger than the pre-tilt angle in the first domain exhibiting a splay-type TN deformation in the vicinity of the substrate, the disclination line is not fixed well, resulting in shifting or drifting of the disclination line due to existence of a lateral electric field during operation of the liquid crystal display cell.

Now present embodiment of the first aspect of the present invention will be described.

Embodiment 1

Figure 2A:
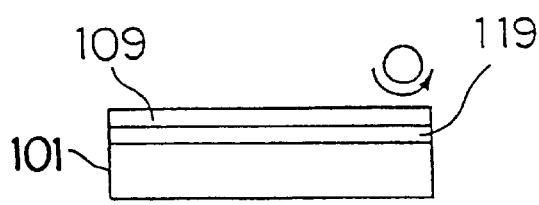
FIGS. 2A through 2E are cross-sectional views showing processing for an orientation alignment for an orientation film in consecutive steps during the manufacture of the liquid crystal display cell of FIG. 1.
Figure 2B:
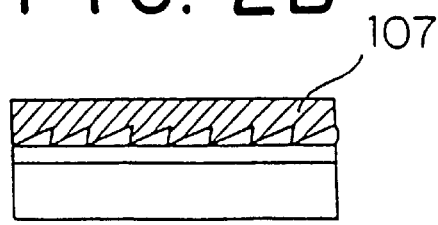
Figure 2C:
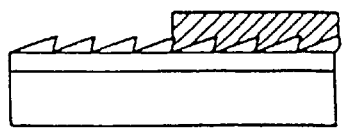

FIGS. 2A–2E illustrate consecutive process steps for obtaining a plural-orientation alignment (divided-orientation alignment) in each pixel of a liquid crystal cell of the present embodiment. After cleaning of a first glass substrate 101 constituting a main substrate previously coated with a transparent conductive film 119 made of indium-tin oxide (ITO), a raw resin of polyimide known under the trademark K-100 and supplied from Toray Industry for providing a high pre-tilt angle was spin-coated on the transparent conductive film 119. The raw resin film was then subjected to a heat treatment performed at 200° C. for one hour to form an orientation film 109. After the orientation film was subjected to a first rubbing step by a rubbing roller as shown in FIG. 2A, one pm-thick novolac photoresist 107 known under the trademark OFPR-800C and supplied from Tokyo-Ohka Corp. was spin-coated on the polyimide film 107 as shown in FIG. 2B. The photoresist film 109 was then subjected to a baking step carried out at 85° C. for half an hour. After an exposure/development step by employing a mask having a chequered pattern of a 500 $\mu$m-square in lattice size, the substrate was rinsed in de-ionized water for removing developer, which was then followed by a first drying step performed at 75° C. for 20 minutes for improving adhesion of the photoresist pattern 107 to the orientation film 109. Inspection of the resultant pattern by employing an optical microscope confirmed existence of a chequered photoresist pattern having 500 $\mu$m-square in lattice size as shown in FIG. 2C.

Figure 2D:
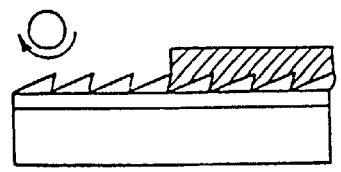
Figure 2E:

Subsequently, the orientation film 109 was subjected to a second rubbing step in the direction opposite to the direction of the first rubbing step by the rubbing roller as shown in FIG. 2D. Next, the substrate 101 was immersed in an ester called ethyl-lactate for 2 minutes to remove the photoresist pattern 107 and then in de-ionized water to remove the residual solvent, which was followed by a second drying step carried out at 110° C. for half an hour.

Referring to FIG. 1, a second glass substrate 102 constituting a counter substrate, on which an ITO film 119 had been deposited, was cleaned and then spin-coated with a raw resin of a polyimide providing a low pre-tilt angle, known under the trademark AL-1051 and supplied from Japan Synthetic Rubber Corp. A baking step was then pursued at 200° C. for an hour.

Two substrates 101 and 102 fabricated as described above were adhered by a glue to each other to form a cell, with spherical spacers being disposed therebetween to have a gap of 6 $\mu$m, and with the rubbing directions of the substrates 101 and 102 being perpendicular to each other. An ordinary nematic liquid crystal prepared by dissolving a left-hand chiral agent was poured into the cell, whose inlet was then sealed off. During the cell formation steps, rubbing directions of the orientation films 109 and the cell fabrication were selected so that the first sub-pixel domains of the liquid crystal exhibited a splay-type TN deformation while the second sub-pixel domains of the liquid crystal exhibited a normal TN deformation.

The structure of the liquid crystal display cell thus formed was inspected with a polarization optical microscope while applying a rectangular wave signal having ±3 V (volt) in amplitude and 16.7 msec. in period, which confirmed an excellent divided orientation alignment.

Next, a first anti-parallel cell to be used for investigation of the TN cell described above was fabricated. The first anti-parallel cell was fabricated such that the first portions covered by a polyimide film called K-100 providing a high pre-tilt angle and the second portions not covered by the polyimide were obtained in the same condition as those of the present embodiment so as to provide the same pre-tilt angles as those in the present embodiment. The pre-tilt angles so obtained were measured by using crystal rotation technology. The results were such that the first portions covered with the photoresist pattern during the second rubbing step provided about 5.5 degrees in pre-tilt angle while the second portions not covered with the photoresist pattern during the second rubbing step provided about 1 degree.

A second anti-parallel cell to be used for investigation of the TN cell described above was fabricated, in which an orientation film made of a polyimide raw resin AL-1051 providing a lower pre-tilt angle was used in the same conditions as those used for forming the TN cell of the present embodiment. Evaluation by employing the crystal rotation technology provided the pre-tilt angle of 1 degree in the second anti-parallel cell.

Comparative Example 1

A liquid crystal display cell of Comparative Example 1 was formed similarly to Embodiment 1, except for the rubbing direction of the counter substrate, which was directed in Comparative Example 1 to the reverse direction. Two rubbing directions were determined so that first portions covered with a photoresist pattern during the second rubbing step provided a normal TN deformation while second portions not covered with the photoresist pattern during the second rubbing step provided a splay-type TN deformation. The fabricated cell was inspected with a polarization optical microscope while applying a rectangular wave signal having ±3 V in amplitude and 16.7 msec. in period. Although the inspection detected a divided-orientation alignment structure in each pixel, poor characteristics were observed, in which one of the two sub-pixel domains was narrower than the other in area.

Embodiment 2

A liquid crystal display cell according to Embodiment 2 was fabricated similarly to Embodiment 1 except that the orientation film providing the lower pre-tilt angle for the counter substrate 202 in Embodiment 1 was replaced by an orientation film made of polyimide called RN-1006 and supplied from Nissan Chemical Corp. The evaluation procedure confirmed that Embodiment 2 exhibited excellent characteristics provided by the two-orientation alignment. Further, the crystal rotation technology evaluated the pre-tilt angle provided by the polyimide made of RN-1006 as 3 degrees in an anti-parallel cell fabricated for Embodiment 2 similarly to Embodiment 1.

Comparative Example 2

A liquid crystal display cell of Comparative Example 2 was fabricated similarly to Embodiment 2, except that the rubbing direction of the counter substrate was directed to the reverse direction in this example. The rubbing directions of both substrates were determined so that the first portions covered with the photoresist pattern during the second rubbing step provided a normal TN deformation while the second portions without photoresist pattern provided a splay-type TN deformation. The fabricated cell was inspected with a polarization optical microscope while applying a rectangular wave signal having ±3 V in amplitude and 16.7 msec. in period. Although the inspection detected a two-orientation alignment, the alignment was poor in stability because the domains collapsed as time elapsed.

Embodiment 3

A liquid crystal cell according to Embodiment 3 was fabricated similarly to Embodiment 1, except the orientation film providing the high pre-tilt angle and the baking temperature were replaced by an orientation film made of a polyimide raw resin called RN-715 supplied from Nissan Chemical Corp. and 250° C., respectively. The results verified an excellent characteristic resulting from a divided orientation alignment configuration. The pre-tilt angle provided by the RN-715 film was evaluated by using crystal rotation technology similarly to Embodiment 1. The results showed that the first portions covered with the photoresist pattern during the second rubbing step provided a pre-tilt angle of 12 degrees while the second portions exposed directly to the second rubbing step provided a pre-tilt angle of 9 degrees.

Embodiment 4

A liquid crystal cell according to Embodiment 4 was fabricated similarly to Embodiment 1, except the orientation film providing the high pre-tilt angle and the baking emperature in Embodiment 1 were replaced by an orientation film made of a polyimide raw resin called LC-102 supplied from Hitachi Chemical Corp. and 250° C., respectively. The results showed an excellent characteristic resulting from a divided orientation alignment configuration. The pre-tilt angle provided by LC-102 was measured by a crystal rotation technology similarly to Embodiment 1. The results showed that the first portions covered with the photoresist pattern during the second rubbing step provided a pre-tilt angle of 3 degrees while the second portions exposed directly to the second rubbing step provided a pre-tilt angle of 2 degrees.

Embodiment 5

A liquid crystal cell according to Embodiment 5 was fabricated similarly to Embodiment 1, except the orientation film providing the high pre-tilt angle and the baking temperature which were replaced by an orientation film made of a polyimide raw resin called LC-2001 supplied from Hitachi Chemical Corp. and 250° C., respectively. The pre-tilt angles were evaluated by a similar technology which employed anti-parallel cells and a crystal rotation measurement. The first portions covered with the photoresist pattern during the second rubbing step provided a pre-tilt angle of 5 degrees while the second portions exposed directly to the second rubbing step provided a pre-tilt angle of 6 degrees.

Another liquid crystal cell was formed similarly to Embodiment 1, except the orientation film providing the high pre-tilt angle and the baking temperature were replaced by an orientation film made of a polyimide raw resin called LC-2001 supplied from Hitachi Chemical Corp. and 250° C., respectively. The rubbing directions were also changed and determined so that the first portions covered with the photoresist pattern during the second rubbing step provided a normal TN deformation while the second portions exposed directly to the second rubbing step provided a splay-type TN deformation. The fabricated cell was inspected with a polarization microscope while being applied with a rectangular wave having ±3 V in amplitude and 16.7 msec. in period. The inspection guaranteed existence of an excellent characteristic resulting from the divided orientation alignment configuration.

Embodiment 6

The combinations of the orientation films as described above were then applied to a first substrate or a TFT substrate on which an active matrix made of TFTs was formed and a second substrate or a color filter substrate on which color filters were formed. The TFT substrate as used here was an ordinary conventional substrate for TFT use, except a shield pattern film having 12 μm-wide stripes were allocated to center lines of pixels for shielding disclination lines of the pixels. A first orientation film made of a polyimide raw resin known under the trademark K-100 and providing the high pre-tilt angle was formed on the TFT substrate while a second orientation film providing a low pre-tilt angle and made of a polyimide raw resin called AL-1051 was formed on the color filter substrate. A divided orientation alignment was performed similarly to Embodiment 1 so that a boundary for dividing each pixel into sub-pixel domains existed just in the center line of each pixel. Rubbing directions were determined so that the first portions covered with the photoresist pattern during the second rubbing step provided a splay-type TN deformation while the second portions exposed directly to the second rubbing step provided a normal TN deformation. Failures such as afterimages were not recognized on the liquid crystal display cell thus formed. Inspection with a loupe could not find any disclinations which were substantially shielded by the shield stripes.

Comparative Example 3

A liquid crystal display cell of Comparative Example 3 was fabricated similarly to Embodiment 6 except for rubbing directions, which were determined so that the first portions covered with the photoresist pattern during the second rubbing step provided a normal TN deformation while the second portions directly exposed to the second rubbing step provided a splay-type TN deformation in this example. The disclination-induced phenomena appeared during operation of this example, which verified degradation in display performance.

Embodiment 7

A liquid crystal display cell of Embodiment 7 was fabricated similarly to Embodiment 6, except the orientation film providing the high pre-tilt angle and the baking temperature were replaced by an orientation film made of RN-715 and 250° C., respectively. This display cell did not exhibit failures such as afterimages during operation thereof.

Comparative Example 4

A liquid crystal cell was fabricated similarly to Embodiment 7, except the rubbing directions in this example were determined so that the first portions covered with photoresist pattern during the second rubbing step provided a normal TN deformation while the second portions directly exposed to the second rubbing step provided a splay-type TN deformation. This display panel exhibited disclination-induced failures such as afterimages, which indicated degradation in display performance.

Embodiment 8

A liquid crystal display cell of Embodiment 8 was fabricated similarly to Embodiment 7, except the orientation film providing the high pre-tilt angle, the baking temperature and the rubbing directions were replaced by an orientation film made of LC-2001, 250° C. and a different configuration in orientation, respectively. Rubbing directions were determined here so that the first portions covered with the photoresist pattern during the second rubbing step provided a splay-type TN deformation while the second portions exposed directly to the second rubbing step provided a normal TN deformation. This display panel did not exhibit substantially any failures such as afterimages during operation.

Comparative Example 5

A liquid crystal cell of Comparative Example 5 was fabricated similarly to Embodiment 8, except for rubbing directions, which were determined here so that the first portions covered with the photoresist pattern during the second rubbing step provided a normal TN deformation while the second portions exposed directly to the second rubbing step provided a splay-type TN deformation. The thus formed display panel exhibited disclination-induced failures such as afterimages, which indicated degradation in display performance.

Next, a description will be made as to embodiments and comparative examples in which electric fields and orientation directions of liquid crystal were investigated for substrates having a TFT array as an active matrix.

Embodiment 9

Figure 3:
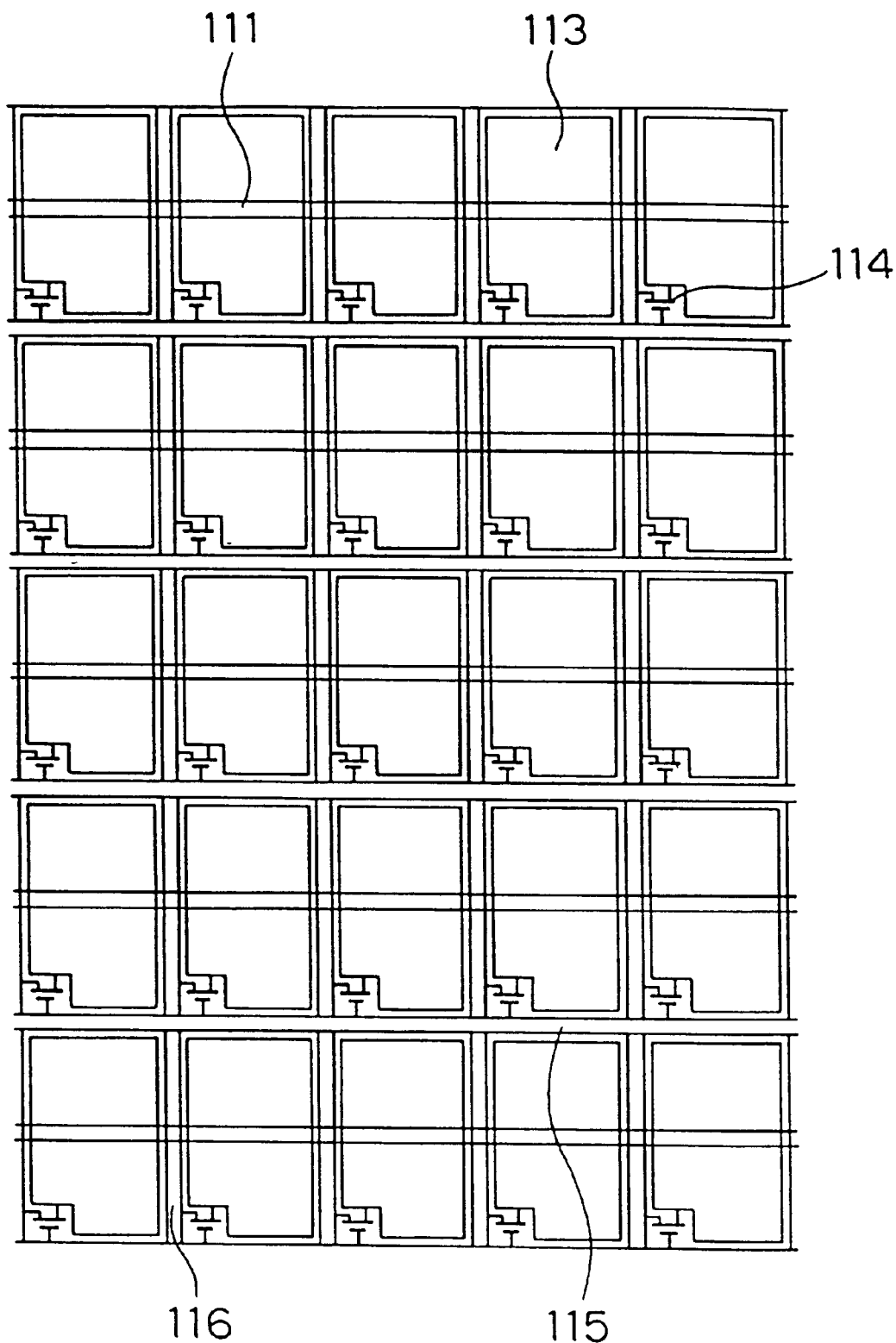
FIG. 3 is a plan view showing a thin film transistor (TFT) array in the liquid crystal display cell of Embodiment 9.
Figure 4:
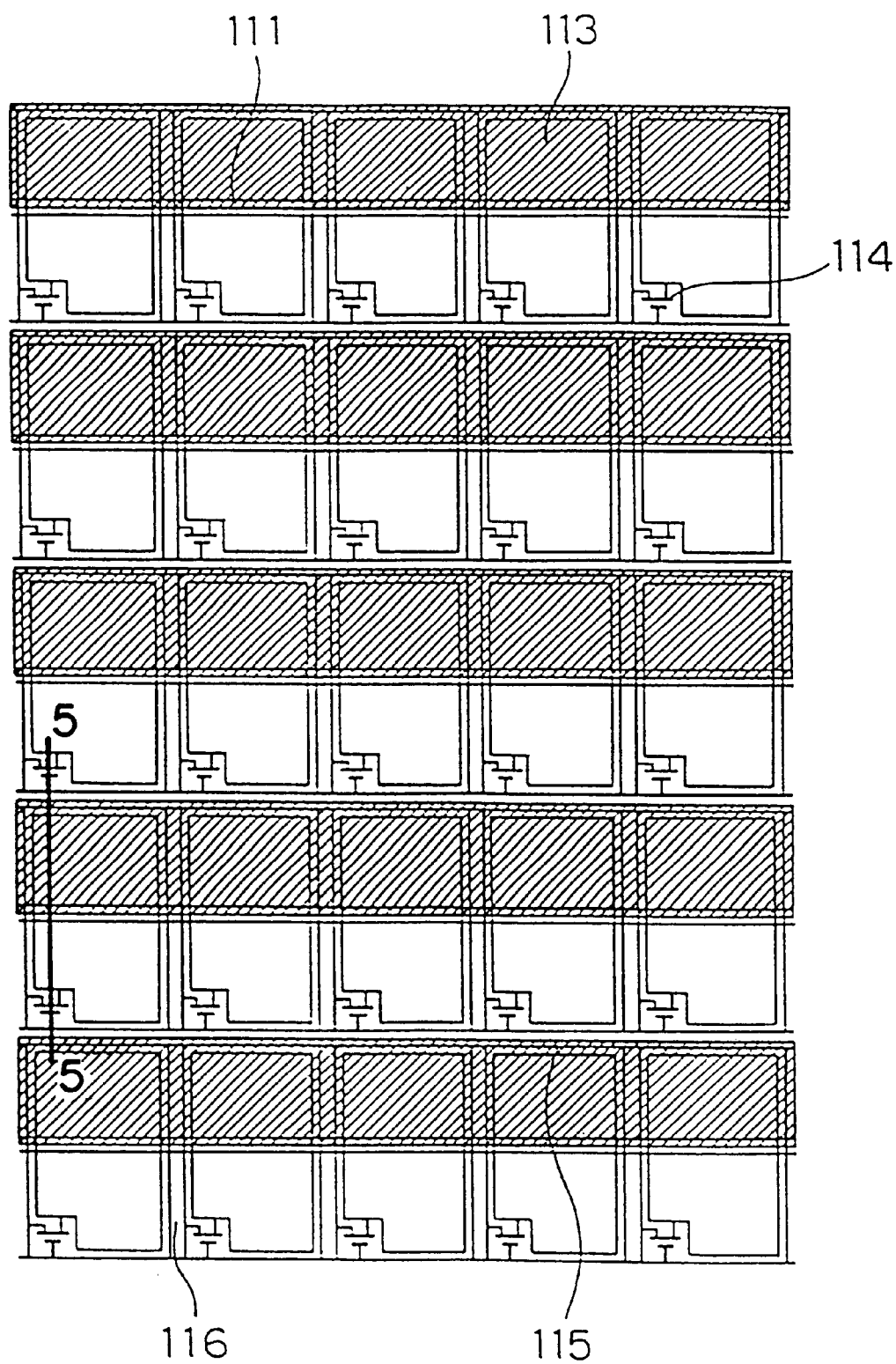
FIG. 4 is a schematic plan view showing a mask layout during the step for orientation alignment for Embodiment 9.

FIG. 3 is a schematic plan view showing a TFT array according to Embodiment 9. FIG. 4 is a schematic plan view showing a mask pattern layout after an exposure/development step. Active driving devices employed in this embodiment were TFTs 114 made of amorphous silicon layers wherein each of pixels was of a recatngular shape having a size of 300 µm by 100 µm. Ten µm-wide sputter-deposited chromium (Cr) stripes constituted horizontal scan bus lines 115 and vertical signal bus lines 116, intersecting each other at the left bottom corners of the pixels in the vicinity of TFTs 114. The Cr stripes further constituted 12 µm-wide shield stripes 111 located at the center of the pixels for shielding disclination lines formed at boundaries between two sub-pixel domains. A silicon nitride ($SiN_x$) film implemented a gate insulating film. Transparent electrodes each constituting a pixel electrode 113 was made of a sputter-deposited ITO film. A first glass substrate on which the array of TFTs 114 were formed constituted a main substrate 121. A second glass substrate on which an array of color filters 112 was formed by a dyeing technology constituted a counter substrate 122 having a transparent counter electrode 120 of an ITO film covering the color filters 112. The counter electrode 120 is covered with a protective film made of silica.

During fabrication of liquid crystal display cells according to Embodiment 9, a plural-orientation alignment was performed in the first substrate similarly to Embodiment 1 after the first substrate was cleaned. After an exposure/development step, 150 µm-wide stripes were formed as a mask pattern to shield the areas bounded by the shield stripes 111 and the horizontal scan bus lines 115 from an incident exposure light, as shown in FIG. 4. The mask pattern shown in FIG. 4 provided a pre-tilt angle configuration in which a pre-tilt angle of the first portions of the polyimide film covered with the photoresist pattern during the second rubbing step was higher than that of the second portions exposed directly to the second rubbing step, as will be detailed later in measured data.

On the other hand, the second substrate 120 having a color filter formed thereon was cleaned and spin-coated with an orientation film made of a polyimide raw resin called AL-1051 providing a low pre-tilt angle similarly to Embodiment 1, then baked at 200° C. for an hour.

Two substrates thus manufactured were adhered to each other via spherical silica spacers by a glue layer to form a cell or display panel, with a 5.5 µm-long gap being disposed between the two substrates 121 and 122, so that the rubbing directions of the two substrates were perpendicular to each other. A nematic liquid crystal having a normal positive dielectric anisotropy, in which a left-hand chiral agent was dissolved, was filled into the cell, of which inlet was then sealed off. During those steps, rubbing directions of the first and the second substrates were determined so that the first portions covered with the photoresist pattern during the second rubbing step provided a splay TN deformation to liquid crystal while the second portions exposed directly to the second rubbing step provided a normal TN deformation to the liquid crystal in the second sub-pixel.

An excellent display performance was obtained during operation of Embodiment 9 without burning phenomena. Furthermore, inspection with a transmission optical microscope guaranteed absence of disclination failures while another inspection with a reflection optical microscope clarified that disclinations were fixed within the width of the shield stripes 111.

Figure 5:
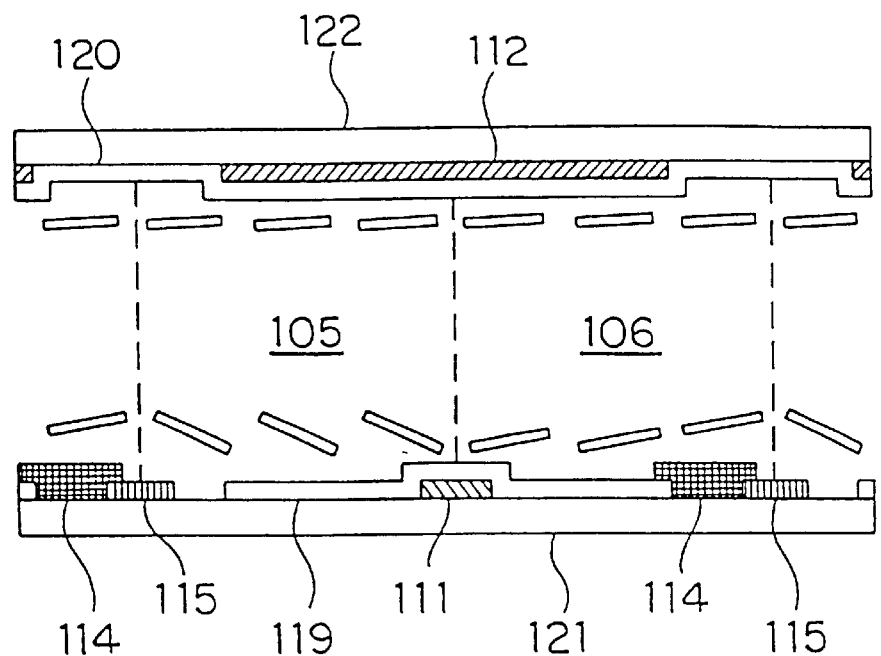
FIG. 5 is a schematic cross-sectional view taken along line 5—5 of FIG. 4.

FIG. 5 shows a cross-sectional view taken along line 5—5 of FIG. 4 for schematically showing liquid crystal orientations with respect to the surfaces of the substrates as described above.

In FIG. 5, liquid crystal in the first sub-pixel domains 105 exhibits a highest pre-tilt angle in the vicinity of the first portion of the first orientation film formed on the first substrate 121, while the liquid crystal in the second sub-pixel domains 106 exhibits a second highest pre-tilt angle in the vicinity of the second portion of the first orientation film formed on the first substrate 121. The liquid crystal in the first and the second sub-pixel domains 105 and 106 exhibits a lowest pre-tilt angle in the vicinity of the second orientation film formed on the second substrate 122. The liquid crystal further exhibits a splay-type TN deformation in the first sub-pixel domain 105 while exhibits a normal TN deformation in the second sub-pixel domain 106. The orientation of the liquid crystal twists or rotates as viewed along an optical path from the first substrate 121 to the second substrate 122 by 90 degrees in both domains 105 and 106. Splay type deformation structure is such that pre-tilt (rotational) direction of the liquid crystal with respect to substrate surface differs in the vicinities of both the substrates, and is different from the normal deformation structure in which the both pre-tilt directions are the same between in the vicinities of both the substrates.

Comparative Example 6

Figure 6:
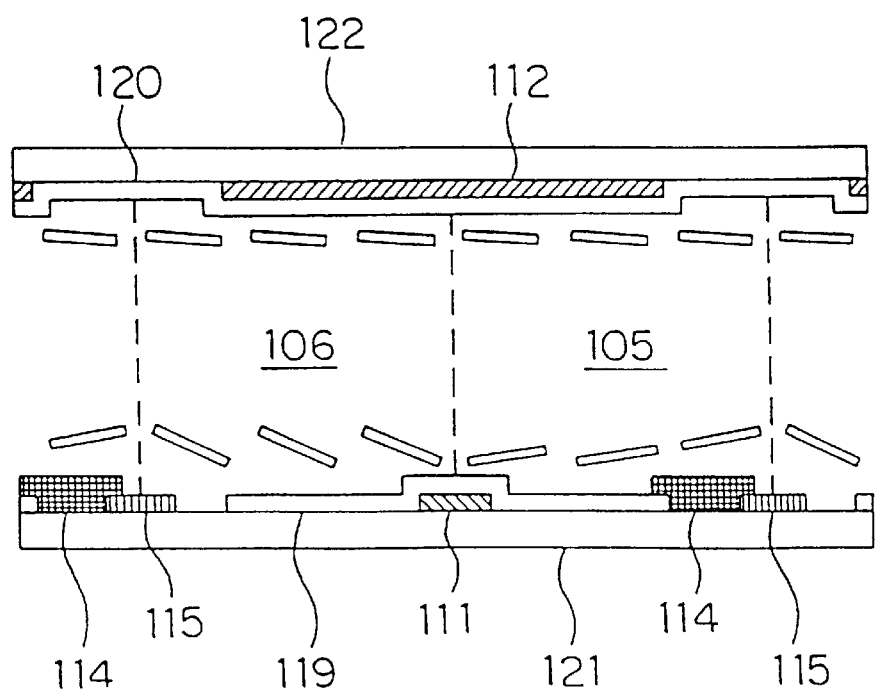
FIG. 6 is a schematic cross-sectional view of a liquid crystal display of Comparative Example 6.

A liquid crystal display cell of Comparative Example 6 was fabricated similarly to Embodiment 9 except for the reversed rubbing direction of the second substrate 122 having color filters 112 thereon. FIG. 6 is a schematic cross-sectional view showing Comparative Example 6. It will be understood that the pre-tilt angle of the splay-type deformed liquid crystal in the domain 105 is lower than that of the normally deformed liquid crystal in the domain 106, in the vicinity of the first substrate subjected to the divided orientation alignment on the contrary to FIG. 5 of Embodiment 9. Rubbing directions of both the substrates 121 and 122 were determined so that the first portions covered with the photoresist pattern during the second rubbing step provided a normal TN deformation structure in the domains 105 while the second portions exposed directly to the second rubbing step provided a splay-type TN deformation structure in the domains 106. Operation of the thus formed liquid crystal display cell induced various failures such as burnings. The microscopic inspection clarified the reason therefor that the majority of the pixels exhibited either unbalanced areas between the sub-pixel domains or substantially undivided single domain in each cell while the location of disclination lines were almost out of control during operation, although a few pixels exhibited balanced sub-pixel domains.

Comparative Example 7

Figure 7:
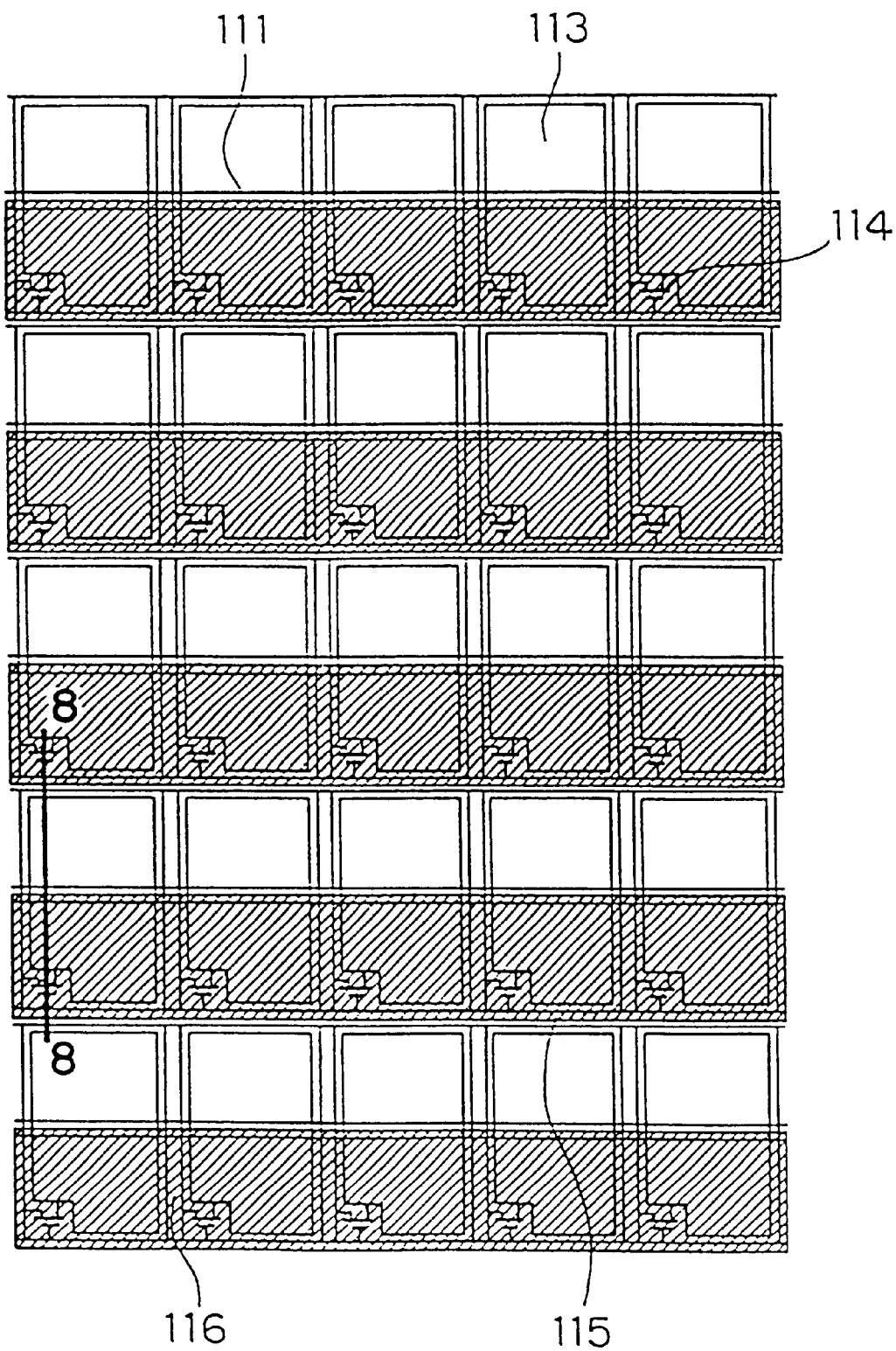
FIG. 7 is a schematic plan view showing a mask layout during the step for orientation alignment for Comparative Example 7.
Figure 8:
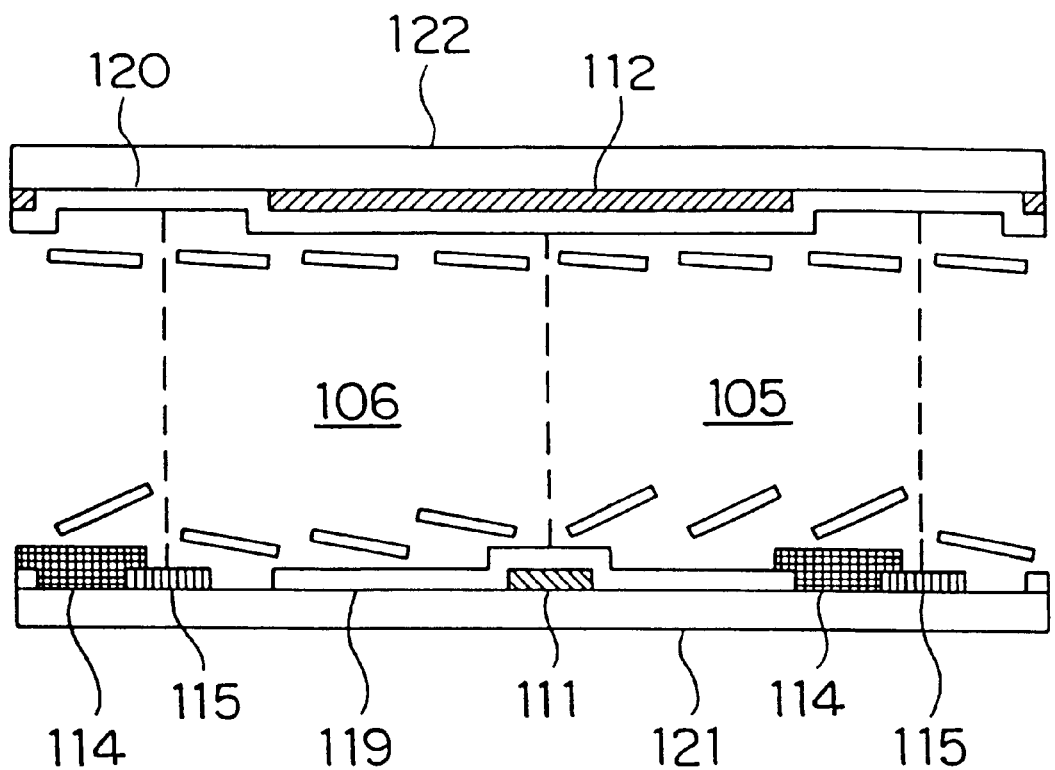
FIG. 8 is a schematic cross-sectional view of a liquid crystal display cell of Comparative Example 7 taken along line 8—8 of FIG. 7.

A liquid crystal display cell of Comparative Example 7 was fabricated similarly to Embodiment 9, except for the mask pattern layout of the first substrate and the rubbing direction of the second substrate having color filters 112 thereon. FIGS. 7 and 8 show a schematic plan view showing a mask pattern during the second rubbing step and a cross-sectional view of the cell structure in Comparative Example 7, respectively, similarly to FIG. 5. The arrangement of the mask pattern layout and the rubbing directions are reversed from the configuration of Embodiment 9. In FIG. 8, the first portions covered with the photoresist pattern during the second rubbing step provided a splay-type TN deformation in the sub-pixel domains 105 while the second portions directly exposed to the second rubbing step provided a normal TN deformation in the second domains 106 of the liquid crystal. FIG. 8 further shows that the liquid crystal domain 106 having a smaller pre-tilt angle in the vicinity of the first substrate 121 was allocated to the area in which a higher lateral electric field was applied due to the absence of TFT 114. Operation of thus formed liquid crystal display cell induced various failures such as burnings. Although inspection with an optical microscope confirmed formation of divided orientation alignment of each pixel, disclination line was beyond control to be exposed out of the shield stripes.

Embodiment 10

A liquid crystal display cell of Embodiment 10 was fabricated similarly to Embodiment 9, except for an orientation film located on the counter substrate providing the lower pre-tilt angle in Embodiment 9, which was replaced by an orientation film made of a polyimide raw resin RN-1006 supplied from Nissan Chemical Corp. The liquid crystal display cell thus formed provided excellent display performance substantially without failures such as burnings.

Comparative Example 8

A liquid crystal display cell of Comparative Example 8 was fabricated similarly to Embodiment 10, except for the rubbing direction of the counter substrate. Rubbing directions of both substrates were determined so that the first portion covered with the photoresist pattern during the second rubbing step provided a normal TN deformation while the second portions exposed directly to the second rubbing step provided a splay-type TN deformation. Operation of the liquid crystal display cell thus formed induced a plenty amount of burning failures. Microscopic observation of orientation in the liquid crystal indicated that the domains once formed by the divided orientation alignment were unstable, so that the domains collapsed as time elapsed.

Embodiment 11

A liquid crystal display cell of Embodiment 11 was fabricated similarly to Embodiment 9, except for the orientation film providing the high pre-tilt angle and the baking temperature in Embodiment 9, which were replaced by an orientation film made of a polyimide raw resin called RN-715 and supplied from Nissan Chemical Corp. and 250° C., respectively. Operation of the liquid crystal display cell thus formed provided an excellent image quality substantially without failures such as burnings.

Embodiment 12

A liquid crystal display cell of Embodiment 12 was fabricated similarly to Embodiment 9, except for the orientation film providing the high pre-tilt angle and the baking temperature in Embodiment 9, which were replaced by an orientation film made of a polyimide raw resin LC-102 supplied from Hitachi Chemical Corp. and 250° C., respectively. Operation of the liquid crystal display cell thus formed also provided an excellent display performance substantially without failures such as burnings.

Embodiment 13

A liquid crystal display cell of Embodiment 13 was fabricated similarly to Embodiment 9, except for the orientation film providing the high pre-tilt angle, the baking temperature and the rubbing direction configuration in Embodiment 9, which were replaced by an orientation film made of a polyimide raw resin LC-2001 supplied from Hitachi Chemical Corp., 250° C. and a reversed configuration, respectively. Rubbing directions were determined so that the first portions covered with the photoresist pattern during the second rubbing step provided a normal TN deformation while the second portions exposed directly to the second rubbing step provided a splay-type deformation. Operation of the liquid crystal display cell thus formed confirmed an excellent display performance substantially without failures such as burnings.

Embodiment 14

Figure 9:
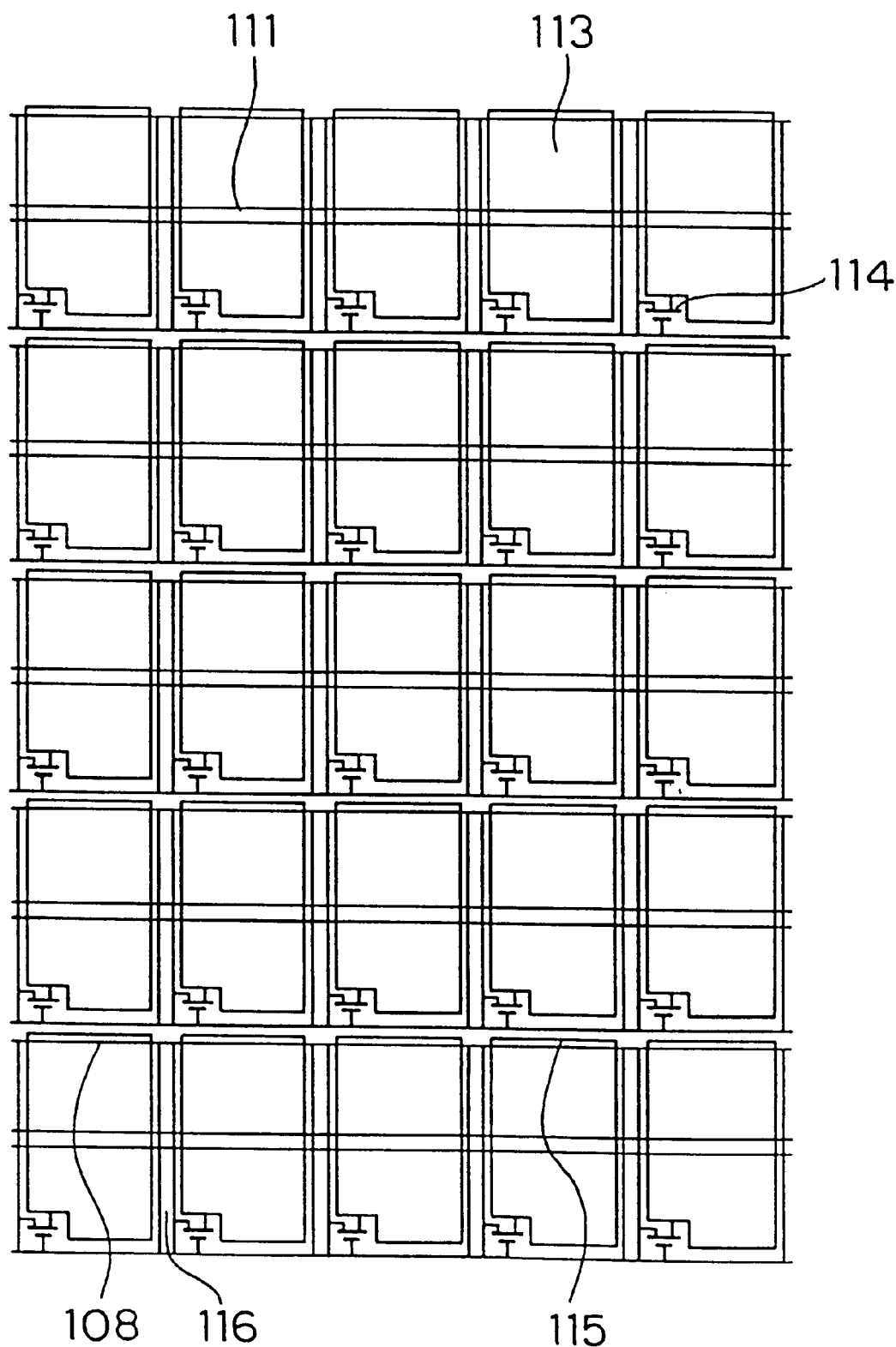
FIG. 9 is a schematic plan view showing a TFT array having a storage capacitor according to an Embodiment 14 of the present invention.
Figure 10:
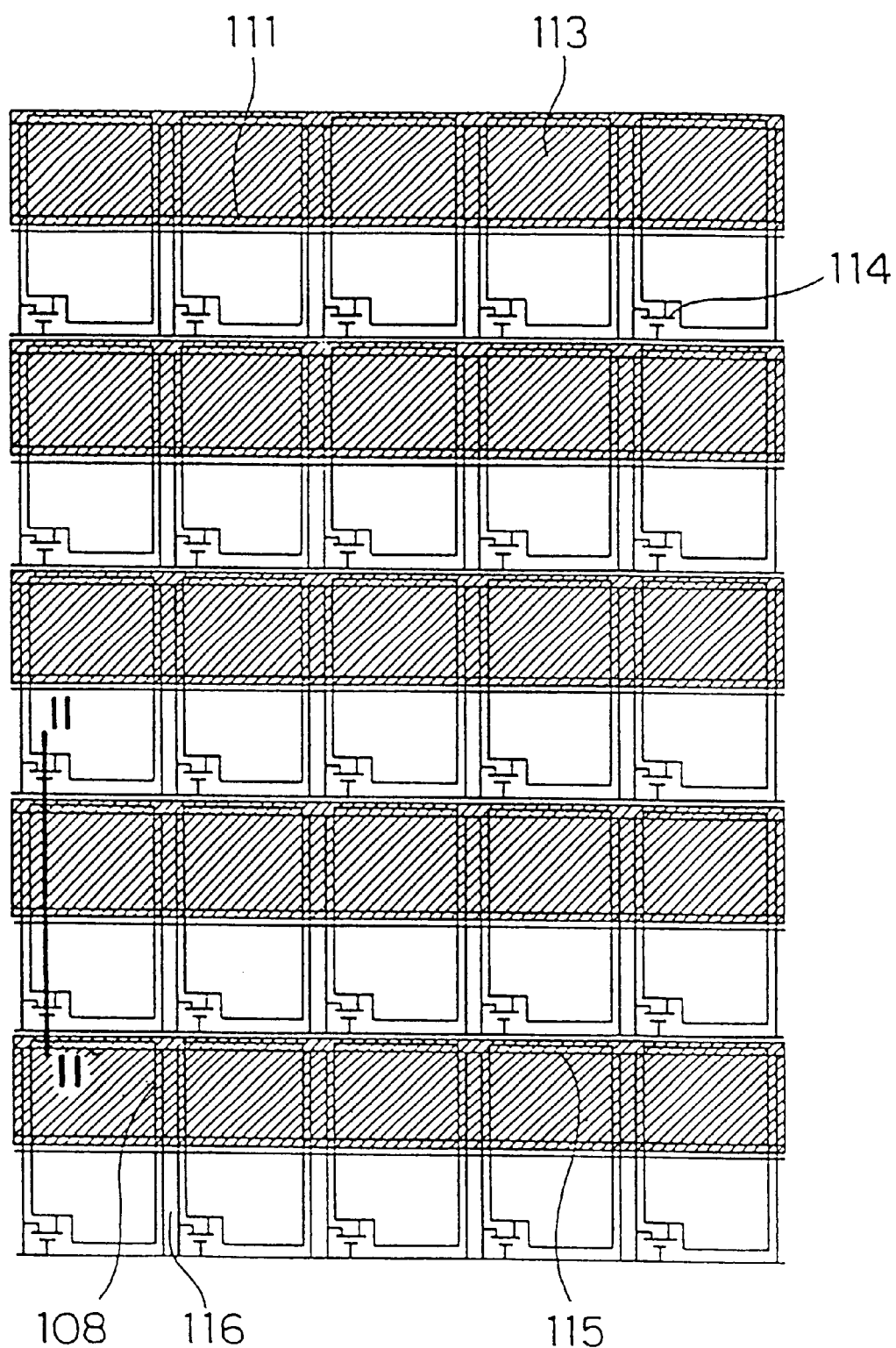
FIG. 10 is a schematic plan view showing a mask layout during the step for orientation alignment in Embodiment 14 of the present invention.
Figure 11:
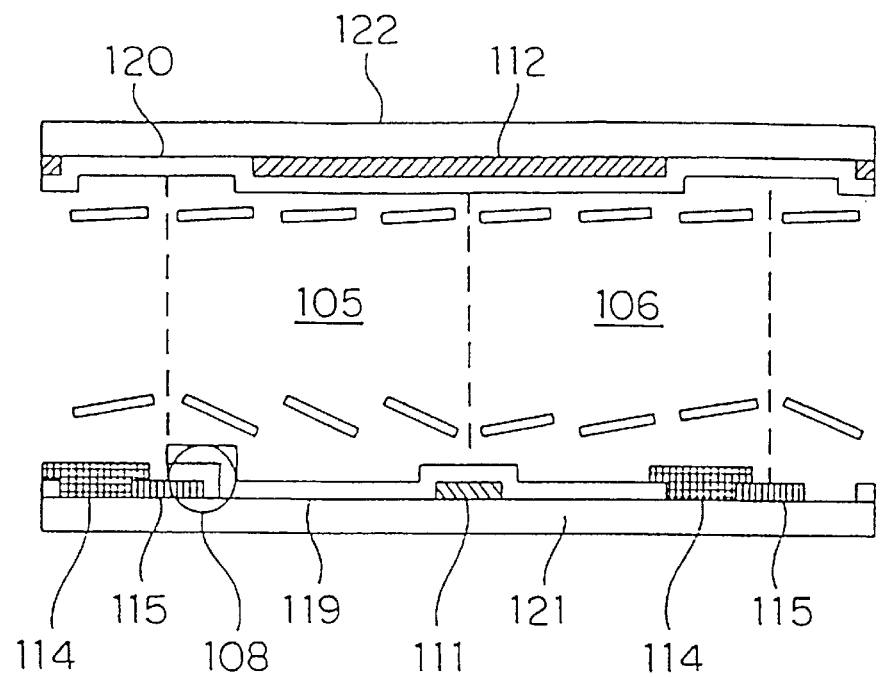
FIG. 11 is a schematic cross-sectional view taken along line 11—11 of FIG. 10.

A liquid crystal display cell of Embodiment 14 was fabricated similarly to Embodiment 9, except for a pixel structure which was modified here to that having storage capacitors on the first substrate on which a TFT array was formed. FIG. 9 is a schematic plan view showing a structure of the TFT array of Embodiment 14. FIG. 10 shows the mask pattern layout as obtained by an exposure/development step while FIG. 11 is a schematic cross-sectional view of the resultant cell structure. In the drawings, an active element for each of pixels implemented by a TFT 114 is located on the bottom-left corner of the corresponding pixel while the stripe mask pattern covers the array of pixels on the upper half of the pixels in which the active element is not located. A storage capacitor 108 is formed between the pixel electrode 113 and the scan bus line 115. Operation of the liquid crystal display cell thus formed as including storage capacitors also provided excellent image characteristics.

Embodiments and comparative examples as described above clarified that making the first pre-tilt angle of the splay-type TN-deformed domains of liquid crystal larger than the second pre-tilt angle of the normal TN-deformed domains in the vicinity of a first substrate subjected to a plural-orientation alignment provided an excellent image display characteristic due to the stable plural-orientation alignment. It is also confirmed that a stable image display is obtained by allocating a liquid crystal domain having a smaller pre-tilt angle to a portion of each pixel on which active element is located so that a lateral electric field of the portion is smaller in magnitude than the other portion of the pixel. In the present invention, the rubbing directions of the two divided areas need not be "opposite", but may be "different".

For the sake of understanding the second and third aspect of the present invention, disadvantages of the conventional technology will be described in connection with the second aspect of the present invention.

A discontinuous region in orientation of a liquid crystal is called "disclination", which is generated on a boundary between two sub-pixel domains of each pixel. The disclination induces a distortion in transmittance of light. Namely, the disclination causes a rise in transmittance during displaying an image in a black tone, which fact changes the tone of the image totally in white to some extent. This involves a sort of degradation in contrast.

Existence of disclinations described above during display of images suffers afterimages or burnings wherein residual precedent images and following images are dually observed. The disclinations cause also viewing angle-dependent luminescent spots called "luminescent spots during slanting observation", which deteriorates the display dignity.

Publication No. JP-A-93-173138 describes a conventional technology for solving the problem caused by disclinations.

Figure 26:
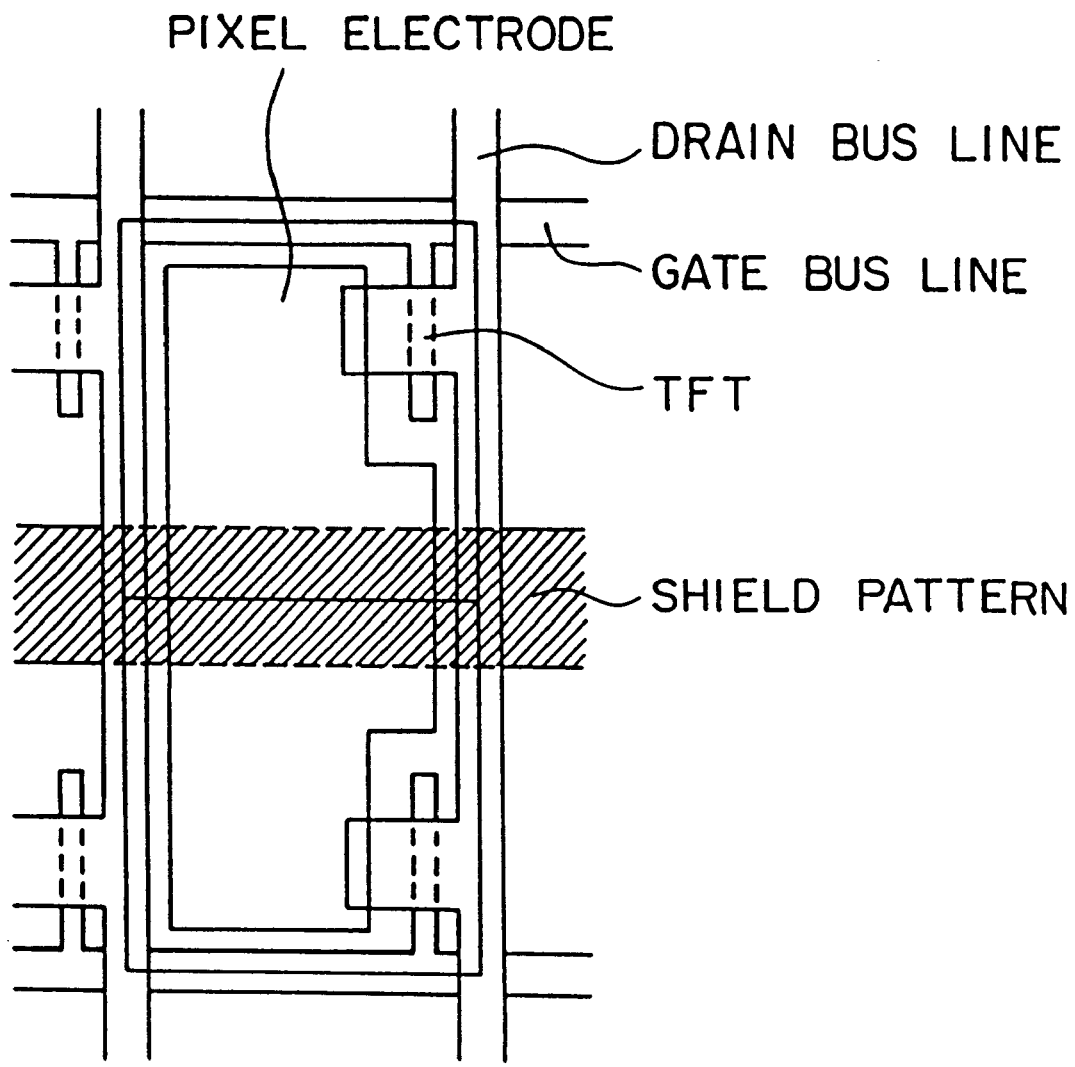
FIG. 26 is a schematic plan view showing an example of a shield pattern employed in a conventional liquid crystal display device.

FIG. 26 of the present application corresponds to FIG. 13 of Publication No. JP-A-93-173138 which is a plan view showing an example of a shield pattern in a liquid crystal display cell.

Because a disclination line is generated on a boundary which lies at a center of a pixel and between two sub-pixel domains having different orientations, a shield pattern is provided for shielding an area wherein disclination lines generate.

Employment of a shield pattern for shielding the disclination lines can suppress a rise in optical transmittance when a black tone is displayed, which can in turn reduces failures such as afterimages, burnings and luminescent spots during slanting observation.

However, the problems described above such as distortions in optical transmittance, afterimages, burnings and luminescent spots during slanting observation are not completely solved due to the following reason:

1) A disclination, which is a discontinuous region in a liquid crystal orientation, is affected not only by plural-orientation alignment in substrate but also by an electric field acting thereto. Namely, not only an orientation energy of a liquid crystal itself but also an electric field-induced energy have direct effects on the stability of a boundary between sub-pixel domains having different orientations in a liquid crystal.

2) A disclination generated by plural-orientation alignment on a center of a pixel frequently deforms due to the reason as described above, so that it is forced to appear outside the shield pattern.

3) A lateral electric field which acts in a peripheral region of a pixel electrode in more greater degree, namely acts both between the pixel electrode and gate bus lines as well as between the pixel electrode and a drain bus line, is higher than that acting in a center region of the pixel electrode. As a result, a disclination generated in the peripheral region of the pixel electrode is more susceptible to deformation than that generated in the center region of the pixel electrode.

The reasons as described above clarify that the shield pattern employed in Publication No. JP-A-93-173138 as shown in FIG. 26 for such a distortion caused by the diselination is insufficient.

Now, preferred embodiments of the present invention will be detailed with reference to the drawings.

Embodiment 15

Figure 12A:
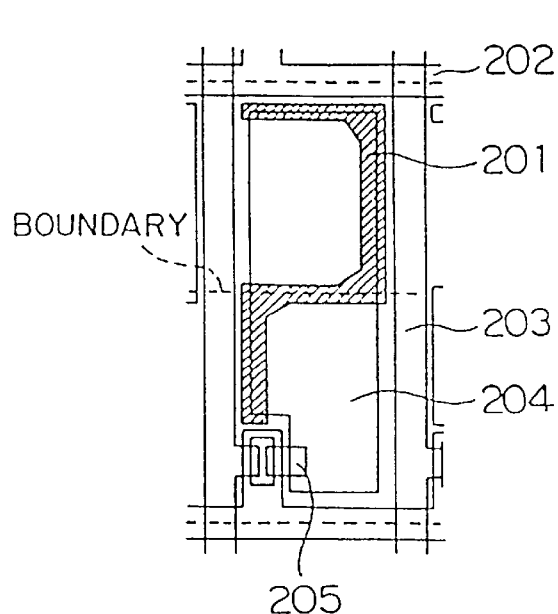
FIG. 12A is a schematic plan view showing around a pixel of a liquid crystal display cell according to Embodiment 15 of the present invention.
Figure 12B:
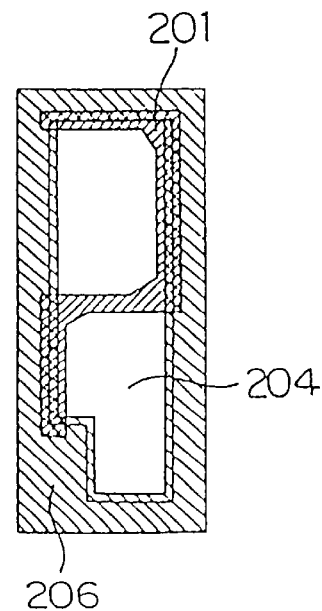
FIG. 12B is a schematic plan view showing a combination of shield films on a TFT substrate and a counter substrate.

FIGS. 12A and 12B illustrate an area around a pixel of a liquid crystal display cell according to the present embodiment. The liquid crystal display cell includes: a first shield pattern 201 provided in each pixel and formed on a TFT substrate; a gate bus line 202 provided for each row of pixels; a drain bus line 203 provided for each column of pixels; an image pixel electrode 204 provided for each pixel; a TFT 205 provided for each pixel; and a second shield pattern 206 provided for each pixel and formed on a color filter substrate, the second shield pattern 206 shielding the TFT 205 and a periphery of the pixel electrode 204 and being called a black matrix. Liquid crystal, which is interposed between the TFT substrate and the color filter substrate, and color filters are omitted in the drawings. The liquid crystal display cell employs the TFT 205 made of amorphous silicon films as an active matrix in this embodiment.

The TFT substrate is provided with the first shield pattern 201 extending on a boundary dividing sub-pixel domains on the center of the pixel, the boundary being shown in a broken line in the middle of FIG. 12A. The first shield pattern 201 further extends adjacent to the drain bus lines 203 extending on both sides of the pixel. The drain bus line 203 in the left side of the pixel drives a column of the pixels including the pixel concerned while that in the right side drives pixels located on a right side column. The first shield pattern further extends in parallel with and adjacent to the gate bus line 202 driving pixels located on the upper row shown in an uppermost part of FIG. 12A. Namely, the first shield pattern 201 has a shape for covering disclinations, which will generate and deform in the vicinity of the gate bus line 202, of the drain bus lines 203 on both sides of the pixel and of the boundary dividing a pixel into sub-pixel domains.

FIG. 12B is a plan view showing a combination of the first shield pattern 201 formed on the TFT substrate and the second shield pattern 206 formed on the color filter substrate.

FIGS. 13A–13D are plan views for analyzing disclinations generated and deformed in a liquid crystal display cell. In those drawings, arrows shown at a front side of the sheet denote rubbing directions of the TFT substrate while arrows shown at a rear side of the sheet denote rubbing directions of the color filter substrate.

Figures 13A, 13B:
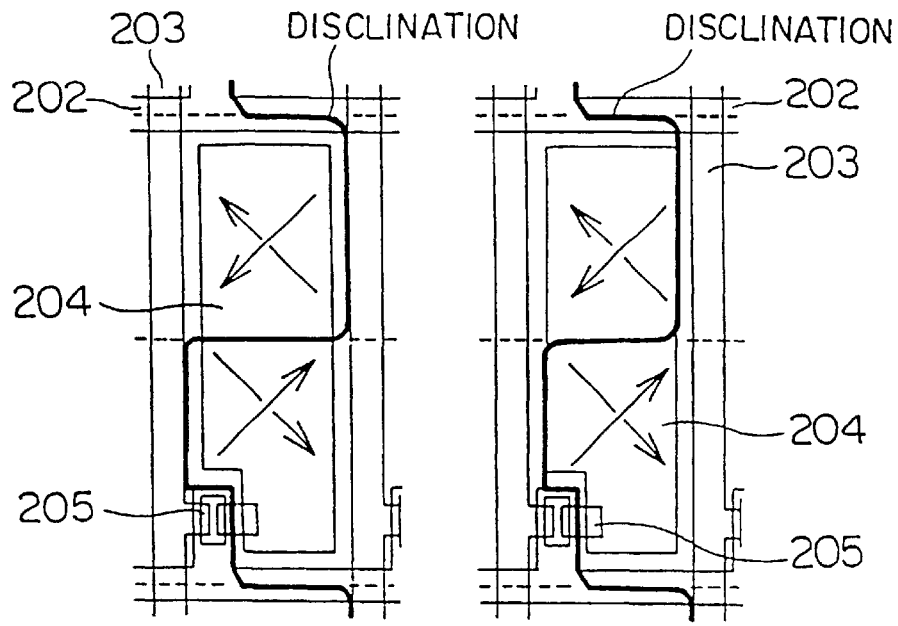
FIGS. 13A, 13B, 13C and 13D are schematic plan views each showing a disclination which is generated in the liquid crystal display cell shown in FIGS. 12A and 12B.

FIG. 13A shows a disclination line generated in a condition wherein two-orientation aligned areas of the liquid crystal cell are smoothly divided due to a low influence by lateral electric fields acting between the image pixel electrode 204 and both gate bus line 202 and drain bus lines 203. Performance of a shield pattern for shielding the disclination in this situation can be effected enough by the conventional technology having a shield pattern in alignment with the boundary, so long as the shield stripe has 5–10 μm in width. If a second shield pattern 206 is additionally provided, it will shield disclinations generated adjacently o the gate bus line 202 and the drain bus lines 203.

Figures 13C, 13D:
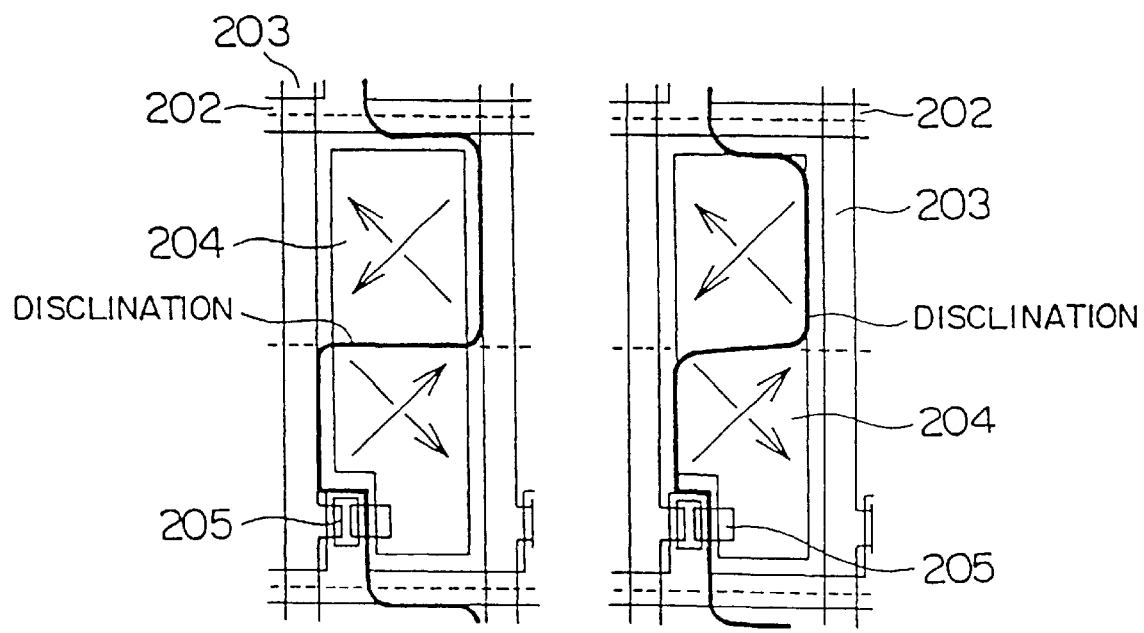

However, the situation shown in FIG. 13A is not usually the case in practical displays of liquid crystal display cells because lateral electric fields are intensified during display of dynamic images or black tone images to deform disclinations as illustrated in FIGS. 13B–13D.

FIG. 13B illustrates a disclination in a situation wherein a disclination originally located adjacent to the signal lines 203 shifts (or deforms) toward the image pixel electrode 204 due to intensified lateral electric fields acting between the drain bus lines 203 and the pixel electrode 204. In this situation, the disclination generated on the boundary dividing sub-pixel domains is forced to bend in a large radius at the sides of the pixel electrode 204 (or at the corners of the sub-pixel domains) together with shifts in diselination adjacent to drain bus lines 203.

FIG. 13C illustrates another disclination in a situation wherein a disclination originally generated adjacent to the gate bus line 202 shown in an uppermost dotted line in the drawings shifts (or deforms) toward an upper edge of the pixel electrode 204 due to an intensified lateral electric field acting between the gate bus line 202 and the pixel electrode 204. In this situation, the disclination originally generated adjacent to a boundary dividing pixels at the center of the gate bus line 202 also shifts downwards and stays outside the gate bus line 202.

FIG. 13D illustrates a disclination in a situation wherein the disclination deforms strongly due to influences of intensified lateral electric fields acting both between the drain bus lines 202 and the image pixel electrode 204 and between the gate bus lines 203 and the image pixel electrode 204. In this situation, both deformations shown in FIGS. 13B and 13C arise in the diselination. Unless the shield patterns 201 and 206 as shown in FIG. 12B shield those deformed disclinations, image failures in the liquid crystal display cell such as afterimages, burnings and luminescent spots will arise.

Figure 14:
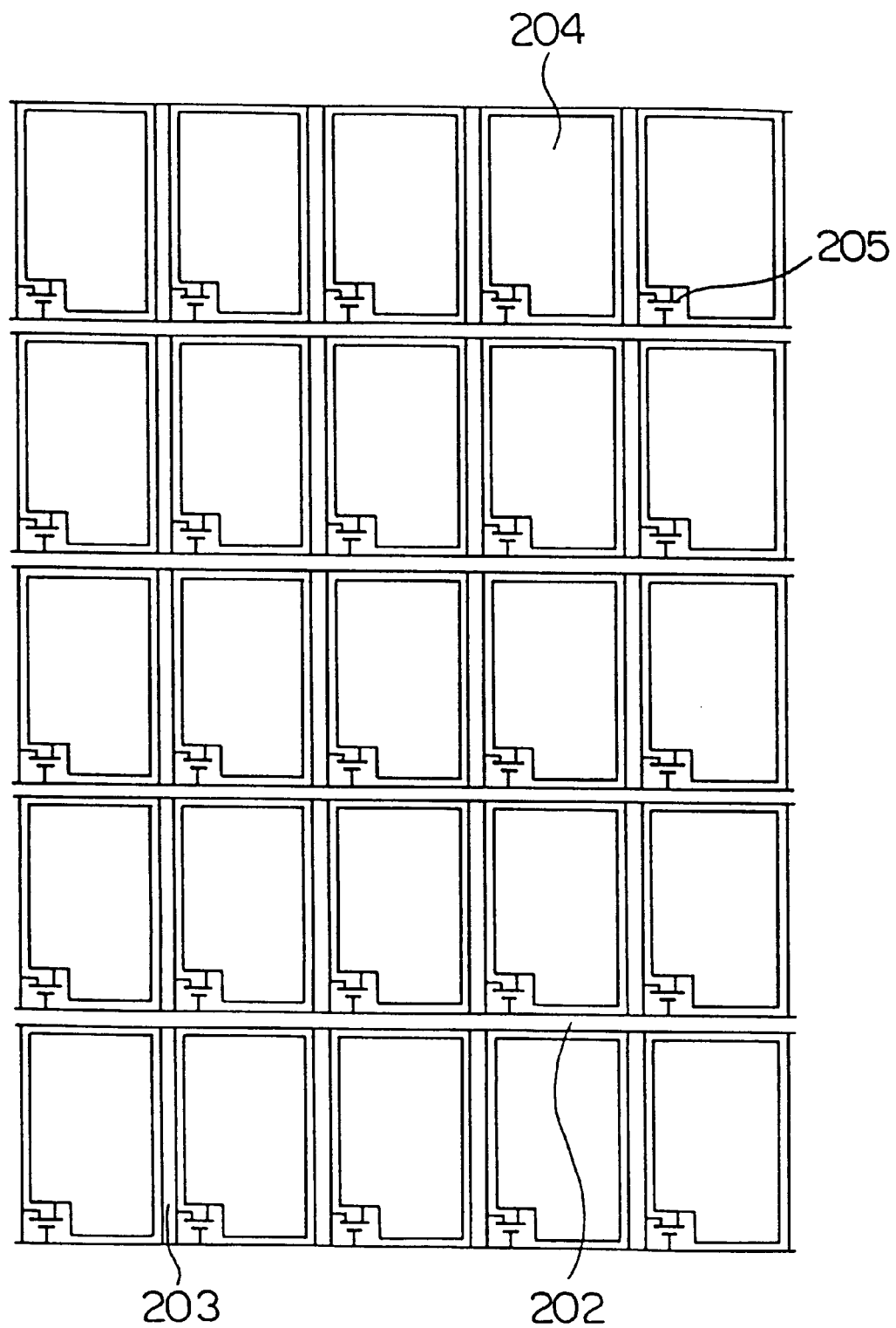
FIG. 14 is a schematic plan view of a liquid crystal display cell according to Embodiment 15 of the present invention.

FIG. 14 is a schematic plan view showing a TFT array of the liquid crystal display cell of the present invention. Unit image pixel for the TFT array of FIG. 14 is assumed, for instance, 261 μm in length by 108 μm in width. A sputter-deposited chromium (Cr) film may be used as the gate bus lines 202 and the drain bus lines 203, which have, for instance, 18 μm in width, respectively.

A photoresist compound mixed with a black dye may be used as a material for the first shield pattern 201. The shield pattern 201 (FIG. 12A or 12B) has a small width of, for instance, 9 μm in a substantially linear stripe portion at the center of the image pixel, a medium width of 13.5 μm in a substantially linear stripe portion in the vicinity of drain bus lines 203, 9 μm in the vicinity of gate bus line 202 extending at the periphery of the pixel opposite to the periphery including TFT 205 and 18 μm in large width portions wherein the shield pattern extends diagonally and connects the other portions. A silicon nitride ($SiN_x$)) film may be employed, for instance, as a gate insulating film.

A transparent electrode composed of a sputter-deposited indium-tin oxide (ITO) film may be employed as the image pixel electrode 204 formed on the TFT substrate. A transparent electrode implementing the counter electrode made of ITO is formed on the shield pattern 206 made of Cr film on the color filter substrate. Color filters are formed thereon by employing a dyeing technology and a protective film made of silica is formed on the color filters. The TFT substrate has thereon a polyimide film formed after cleaning of the TFT substrate. The polyimide film is subjected to a uniform rubbing in a certain direction, then covered with a positive-type photoresist film. A photo-mask having stripe patterns formed in a similar size, of which masking "line" is 126 μm-wide and of which opening "space" is 135 μm-wide, respectively, is used for photolithography. Hence, each pixel is divided into a "masked" and an "exposed" sub-pixel domains. One of the sub-pixel domains which is located adjacent to the TFT 205 is selected as the exposed domain while the other is selected as the masked domain. The selection described above can equalize both sub-pixel domains in area when combined with the color filter substrate shown in FIG. 12B.

After exposure of the photoresist film, a second rubbing step is performed in a direction different from the first rubbing direction, for example, opposite direction. The photoresist pattern is then removed. The color filter substrate is also subjected to a rubbing step in a direction normal to the rubbing direction of the TFT substrate. The rubbing orientations during the two-orientation alignment are illustrated in FIGS. 13A–13D.

The TFT substrate and the color filter substrate are then adhered by a glue layer with spherical silica particles disposed therebetween so that a gap spacing of 5.5 $\mu$m is obtained and that rubbing directions of both orientation films are normal to each other. A nematic liquid crystal having a normal positive dielectric anisotropy, into which a left-hand chiral material is dissolved, is introduced into a liquid crystal display cell.

In operation of the the liquid crystal display cell of the present embodiment, not only a disclination shown in FIG. 13A but also those shown in FIGS. 13B–13D are shielded almost perfectly by the shield area formed by combination of the first shield pattern 201 on the TFT substrate with the second shield pattern 206 on a color filter substrate as shown in FIG. 12B. As a result, failures such as afterimages, burnings and luminescent spots during slanting observation, which frequently appear in a conventional liquid crystal display cell, do not appear. By observing disclinations which were covered with both the shield patterns 201 and 206, under the reflected rays of light incident from the color filter substrate and the substrate, it was confirmed that diselinations such as shown in FIGS. 13A–13D stayed substantially perfectly within the area of the shield patterns.

On the other hand, the liquid crystal display cell according to the present embodiment has somewhat a low opening rate, which is defined by a ratio of an effective area to a total area of a display cell. However, employment of the shield patterns provides remarkable advantages wherein burnings and luminescent spots disappear, resulting in an enough compensation of the lowering in opening rate. Experiments performed by us also verified that the liquid crystal display cell according to the present embodiment remarkably improved the image quality.

The shield pattern 201 of the present embodiment has a wide corner wherein width thereof increases substantially at a linear rate toward a corner of sub-pixel domains. However, any shield patterns having various shape may also be used, for instance, having a wider straight portion or a curved corner so long as the shield pattern can cover the deformed disclinations shown as in FIGS. 13A–13D. The situation is quite similar to shield patterns having other shapes and to the other embodiments described hereinafter.

The liquid crystal display cell according to the present embodiment employs the novolac photoresist mixed with a black dye as a material for a shield pattern. However, it will be understood that other materials can be used as shield patterns so long as they are substantially opaque due to absorbing or reflecting property.

Furthermore, a Cr film, which is deposited for forming a gate bus line 202 may be used as a material for implementing the shield pattern 201 in other parts of the Cr film. In this configuration, a step for simultaneously photo-engraving the gate bus line 202 and the shield pattern 201 reduces manufacturing steps of the liquid crystal display cell. Reduction of steps is also obtained if individual steps for forming drain bus lines 203 and shield patterns 201 are pursued in a single step or if individual steps for patterning the shield films 201 and amorphous silicon films for TFTs 205 are pursued in a single step.

Figure 15A:
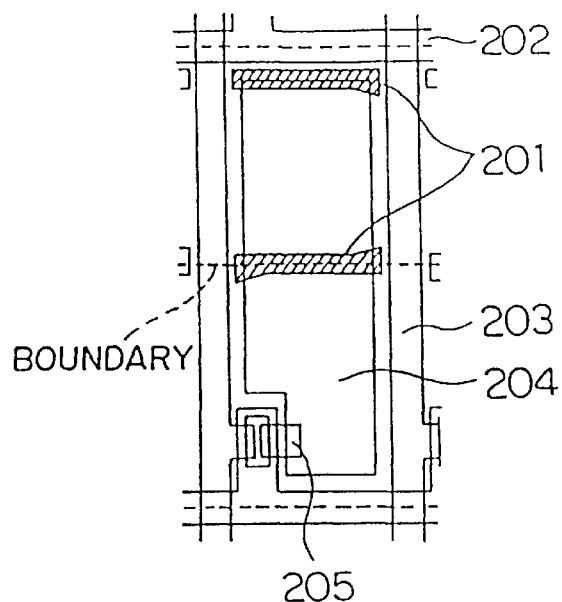
FIGS. 15A and 15B are schematic plan views showing a pixel of a modified example of the shield pattern shown in FIGS. 12A and 12B.

The configuration of shield patterns 201 may be modified as detailed below:

FIG. 15A illustrates shield patterns formed on a TFT substrate, wherein one of separate shield patterns 201 is allocated to a boundary for dividing sub-pixel domains while the other separate pattern 201 is allocated to an upper gate bus line 202 in the vicinity thereof. With this configuration, the separate shield patterns 201 shield the disclinations which will generate and deform in the vicinities of both the gate bus line 202 and the boundary dividing sub-pixel domains.

Figure 15B:
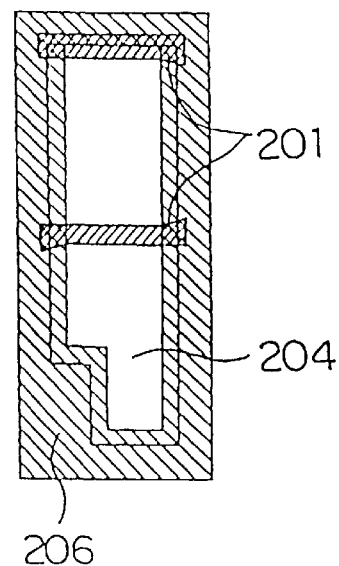

FIG. 15B illustrates a combination of the shield patterns 201 formed on the TFT =substrate as shown FIG. 15A with the shield pattern 206 formed on the color filter substrate. The shield pattern 201 formed on the boundary for dividing sub-pixel domains is 9 $\mu$m wide at a narrowed center thereof while 13.5 $\mu$m-wide at both boundary ends wherein the boundary intersects side edges of the pixel. The other shield pattern 201 located in the vicinity of the gate bus line 202, which runs on an upper end of the pixel, is 13.5 $\mu$m-wide on a wide corner of the upper sub-pixel while 9 $\mu$m-wide at the narrow center portion thereof.

Combination of the shield pattern 201 formed on the TFT substrate with the shield pattern 206 formed on the color filter substrate as shown in FIG. 15B can shield disclinations shown in FIG. 13A as well as in FIG. 13C, substantially completely. During our experiments by observation under reflected rays of light incident from either of the TFT substrate side and the color filter substrate side, disclinations especially located adjacently to the gate bus line 202 shown in FIG. 13C, stayed almost perfectly within the area of the shield patterns. Accordingly, the liquid crystal display cell described above reduces afterimages, burnings and luminescent spots, which frequently appear in a conventional liquid crystal display cell having sub-pixel domains during slanting observation.

Figure 16A:
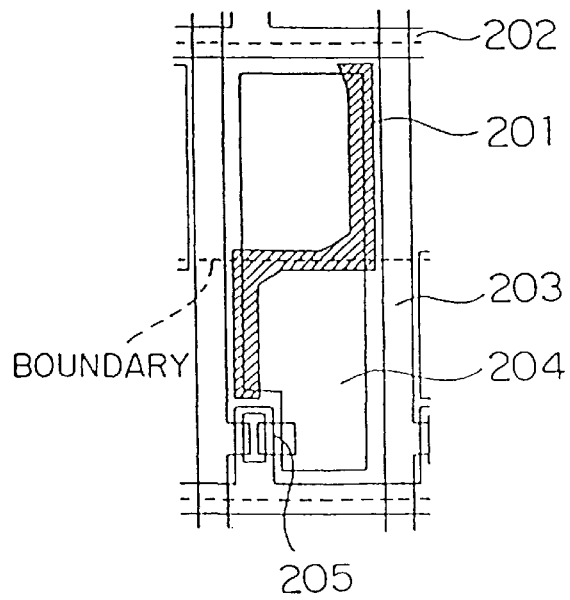
FIGS. 16A and 16B are schematic plan views showing a pixel of another modified example of the shield pattern shown in FIGS. 12A and 12B.

FIG. 16A shows another modification of the shield pattern 201 which covers both of the boundary dividing sub-pixel domains and the vicinity of the drain bus lines 203. Namely, the shield pattern 201 has a shape covering disclinations which will be generated and deform in the vicinities of the drain bus lines 203 and of the boundary dividing sub-pixel domains.

Figure 16B:
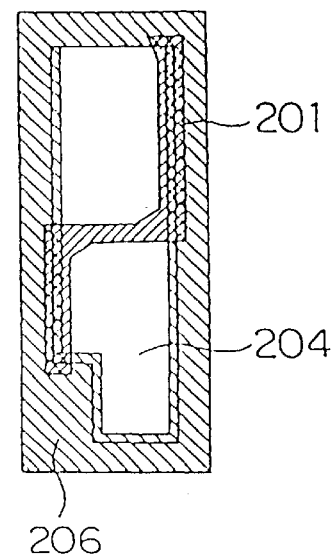

FIG. 16B illustrates a combination of the first shield pattern 201 as shown in FIG. 16A with the second shield pattern 206 formed on an color filter substrate. The shield pattern 201 is, for instance, 9 $\mu$m-wide at a narrow horizontal portion, 13.5 $\mu$m-wide at medium-wide upright portions in the vicinity of the drain bus lines 203 and 18 $\mu$m-wide at a wide upper-right end adjacent to the gate bus line 202 located opposite to TFT 205 with respect to the pixel electrode.

The combination of the shield patterns 201 and 206 as shown in FIG. 16B substantially perfectly shields disclinations shown in FIG. 13A as well as in FIG. 13B. During our experiments by employing observation under reflected rays of light incident from either a TFT substrate side or a color filter substrate side, the combination described above almost perfectly covered disclinations within the shielding range thereof, especially disclinations generated adjacently to the drain bus lines 203 such as shown in FIG. 13B. Accordingly, the liquid crystal display cell remarkably reduces afterimages, burnings and luminescent spots, which frequently appears in the conventional liquid crystal display cells having sub-pixel domains.

Furthermore, it is proved that the shield patterns 201 shown in FIGS. 12A, 15A and 16A have functions for shielding the disclinations and effects for reducing defects to some extent even if the shield patterns 201 lack shield stripes for covering boundaries dividing the pixel electrodes 204. For instance, our experiments provided the following data:

A liquid crystal display cell having a shield pattern lacking a center portion at the boundary dividing sub-pixel domains exhibited a contrast of about 100:1 while another liquid crystal display cell having a shield pattern including the center portion at the boundary exhibited a contrast of about 200:1, which is twice the value of the former. Both liquid crystal display cells provide comparatively excellent image qualities, except for the difference in contrast, resulting in substantial elimination of image failures such as afterimages. The reason therefor is considered to be attributed to the fact that the disclination generated at the boundary is not visually recognized as a display failure such as an afterimage because it is fixed and does not drift once it appears, which would, otherwise, draws attentions visually.

Embodiment 16

Figure 17A:
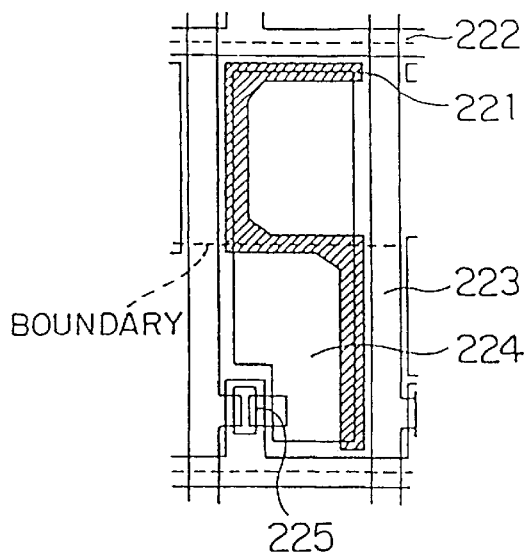
FIGS. 17A and 17B are schematic plan views showing a pixel of a liquid crystal display cell according to Embodiment 16 of the present invention.
Figure 17B:
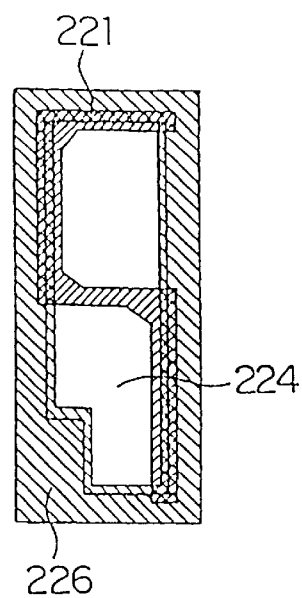

FIGS. 17A and 17B are schematic plan views showing a configuration of a liquid crystal display cell according to the present embodiment. The liquid crystal display cell includes a first shield pattern 221 for each pixel, a gate bus line 222 for each row of the pixels, a drain bus line 223 for each column of the pixel, a pixel electrode 224 for each pixel, a TFT 225 for each pixel, which are formed on a TFT substrate, and a second shield pattern 226 formed a color filter substrate. Each constituent element designated by reference numerals 221–226 in the present embodiment corresponds to each constituent element designated by reference numerals 201–206 in Embodiment 15.

As shown in FIG. 17A, the first shield pattern 221 formed on the TFT substrate extends on a boundary dividing sub-pixel domains in the vicinity of the gate bus line 222 d,o and to drain bus lines 223, respectively. Namely, the shield pattern 221 shields disclinations which will be generated and deform in the vicinities of the gate bus line 222, the drain bus lines 223 and the boundary dividing sub-pixel domains.

FIG. 17B shows a combination of the first shield pattern 221 formed on the TFT substrate with the second shield pattern 226 formed on the color filter substrate.

Figure 18A:
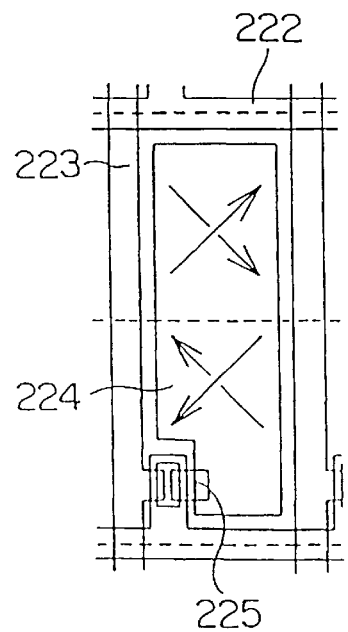
FIGS. 18A and 18B are schematic plan views each showing a disclination which is generated in the liquid crystal display cell shown in FIGS. 17A and 17B.
Figure 18B:
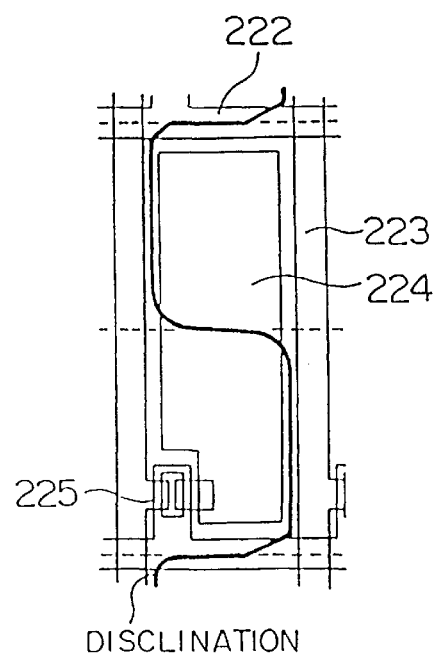

FIGS. 18A and 18B clarify a figure of diselination generated on a liquid crystal display cell according to the present embodiment. Here, FIGS. 18A and 18B correspond precisely to FIG. 13A. Arrows illustrated in FIG. 18A indicate the rubbing directions of the orientation films formed on the TFT substrate located at front side of the sheet and the color filter substrate located at rear side of the sheet, respectively, which support two sub-pixel liquid crystal domains in the region of the pixel electrode 224. It will be understood that orientation of the liquid crystal in the sub-pixel domains has different orientations from those shown in FIGS. 13A, 13B, 13C and 13D. Accordingly, the disclination of the present embodiment exhibits somewhat a different configuration, as shown in FIG. 18B, wherein the shape and the location of the diselination line are obtained by an inversion of those shown in FIG. 13A.

The TFT array of the present embodiment is formed similarly to the Embodiment 15 shown in FIG. 14. The shield pattern 221 has a configuration obtained by inversion of that of the shield pattern 201 shown in FIGS. 12A and 12B in accordance with the disclination shown in FIG. 18B.

Manufacturing steps and resultant performances of a liquid crystal display cell are substantially similar to those of Embodiment 15.

The configuration of the generated and deformed disclination is affected by liquid crystal orientations in the vicinity of the substrate surface, by pre-tilt angles of the liquid crystal provided from the substrate surface, by electric fields in a liquid crystal display cell and by properties of the material in the liquid crystal display cell such as repulsive/attractive forces of spacers. Consequently, a disclination having configuration different from those shown in FIGS. 13A–13D and 18B may appear in other type of the display cells. Even in that case, a shield pattern having a different shape may be employed to cover the disclination subjected to the factors as described above.

Embodiment 17

Figure 19A:
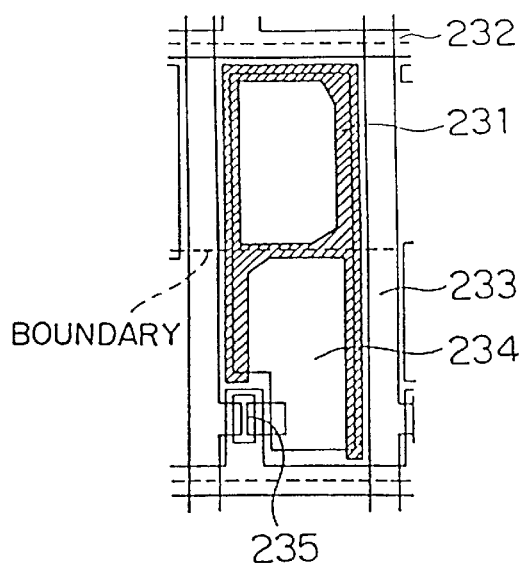
FIGS. 19A and 19B are schematic plan views showing a pixel of a liquid crystal display cell according to Embodiment 17 of the present invention similarly to FIGS. 12A and 12B, respectively.

FIGS. 19A and 1913 are schematic plan views showing a configuration of a liquid crystal display cell according to the present embodiment. The liquid crystal display cell according to the present embodiment includes, similarly to Embodiment 15, a first shield pattern 231, a gate bus line 232, drain bus lines 233, a pixel electrode 234, a TFT 235, all of which are formed on a TFT substrate, and a second shield pattern 236 formed on a color filter substrate. Constituent elements designated by reference numerals 231–236 in the liquid crystal display cell of the present embodiment correspond to constituent elements designated by reference numerals 201–206 in the liquid crystal display cell of Embodiment 15.

As shown in FIG. 19A, the TFT substrate has the first shield pattern 231 including a first portion which is similar to the shield pattern 201 of Embodiment 15 and a second portion which is similar to the shield patterns 221 of Embodiment 16 with an exception of the central portion corresponding to the boundary. The shield pattern 231 extends in alignment with the boundary dividing sub-pixel domains, extends in the vicinities of the gate bus line 232 extending along the upper edge of pixel electrode 234 opposite to the other edge adjacent to the TFT 235 and of the drain bus lines 232 located on both side edges of the pixel electrode 234. With this configuration, the shield pattern 231 covers disclinations which will generate and deform in the vicinities of the boundary and the four side edges of the image pixel electrode.

Figure 19B:
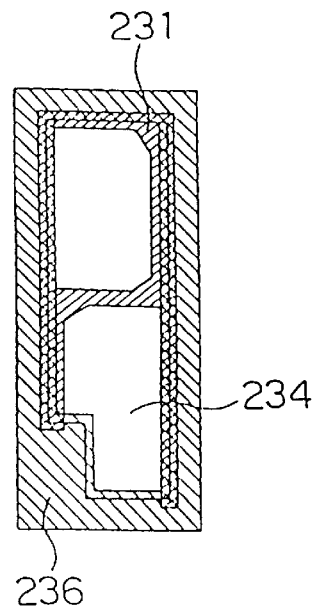

FIG. 19B shows a configuration wherein the shield pattern 231 formed on the TFT substrate is combined with the shield pattern 236 formed on the color filter substrate. The constituent elements of the liquid crystal display cell are arranged in a similar manner to that of Embodiment 15 shown in FIG. 14 except for the shape of the shield pattern 231.

Manufacturing procedures and overall functions of the liquid crystal display cell according to the present embodiment are similar to those of Embodiment 15. Functions and advantages specific to the present embodiment will be described below:

1) Even if an alignment error arises during adhering the TFT substrate with the color substrate, the position of the shield pattern 231 adjacent to the drain bus lines 233 will cover disclinations which cannot be covered by the second shield pattern 236 formed on the color substrate. Namely, even in this case, excellent images can be obtained because the edge portions of the pixel electrode 234 which are susceptible to a distortion in optical transmittance is shielded at any time by the shield film 231.

2) Because of functions and effects as described above, the width of shield pattern 236 formed on the color substrate, which is designed to provide a large margin in the conventional liquid crystal display cell, can be reduced as small as requested. Hence, with the liquid crystal display cell according to the present embodiment, it is possible to attain a high opening rate, so that a high luminance can be obtained.

Embodiment 18

A liquid crystal display cell according to the present embodiment includes a shield pattern covering vicinities of a boundary dividing sub-pixel domains, of a gate bus line and of signal lines formed on a TFT substrate. The shield pattern also acts as a storage capacitor for storing electric charges on the pixel electrode.

A TFT array and shield patterns are similar to those of Embodiment 15 shown in FIG. 14. A Cr film is provided for the shield pattern and for a capacitor electrode forming a storage capacitor together with the pixel electrode, with an insulating film disposed therebetween. Practically, a TFT substrate equipped with a shield pattern made of a Cr film is employed and subjected to a plural-orientation alignment before assembly of a liquid crystal display cell.

Additionally to functions and effects similar to those of Embodiment 15, the liquid crystal display cell according to the present embodiment provides specific advantages of reduction in number of process steps and of improvement in holding time characteristics of an image display because of a bifunctional capacitor electrode acting as a shield pattern.

Although a Cr film is used as a material for shield patterns in the present embodiment, other materials having both conductivity and opaqueness such as an aluminium or titan film may be used as a shield pattern and a capacitor electrode.

Furthermore, various modifications are applicable to a shape of the shield pattern as described in connection with Embodiment 15. Our experiments clarified that a shield pattern such as shown in FIGS. 12A and 12B and acting as a capacitor electrode provided a high image quality.

Embodiment 19

Figure 20A:
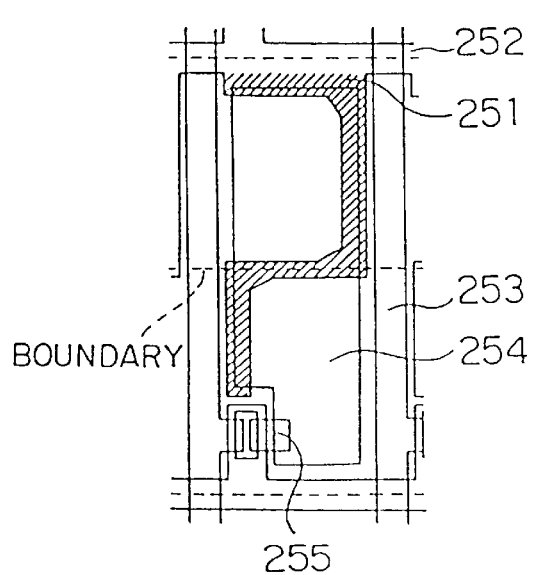
FIGS. 20A and 20B are schematic plan views showing a pixel of a liquid crystal display cell according to Embodiment 19 of the present invention.
Figure 20B:
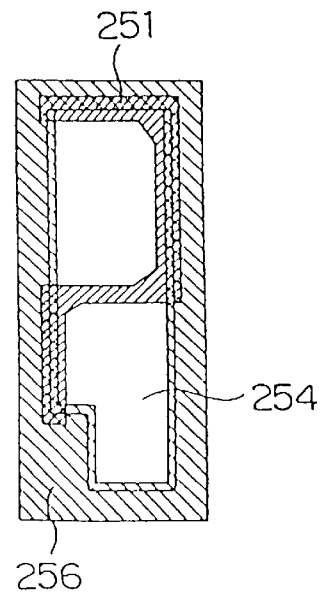

FIGS. 20A and 20B show a liquid crystal display cell according to the present embodiment. The liquid crystal display cell includes a gate bus line 252 for each raw of pixels, a portion of which constitutes a first shield pattern 251, a drain bus line 253 for each column of pixels, a pixel electrode 254 and a TFT 255 for each pixel, all of which are formed on a TFT substrate, and a second shield pattern 256 formed on a color substrate. The constituent elements of the liquid crystal display cell shown in FIGS. 20A and 20B designated by reference numerals 253–256 correspond to those of Embodiment 15 designated by reference numerals 203–206 shown in FIGS. 12A and 12B.

As shown in FIG. 20A, the TFT substrate of the present embodiment has a conductive film constituting a first shield portion for a boundary dividing sub-pixel domains, a scan line similar to the gate bus line 202 of Embodiment 15 and a second shield portion 251 protruding from the gate bus line 252. In other words, the gate bus line also acts as a shield pattern at its portion.

FIG. 20B shows a combination of the first shield pattern implemented by a portion 251 of the gate bus line 252 which is formed on the TFT substrate and the second shield pattern 256 which is formed on the color substrate. The TFT array in the present embodiment is arranged similarly to Embodiment 15 shown in FIG. 14. A Cr film is used as a material for the gate bus line 252 acting as a portion of the first shield pattern. The procedure for the plural-orientation alignment is performed similarly to that of Embodiment 15.

Figure 21A:
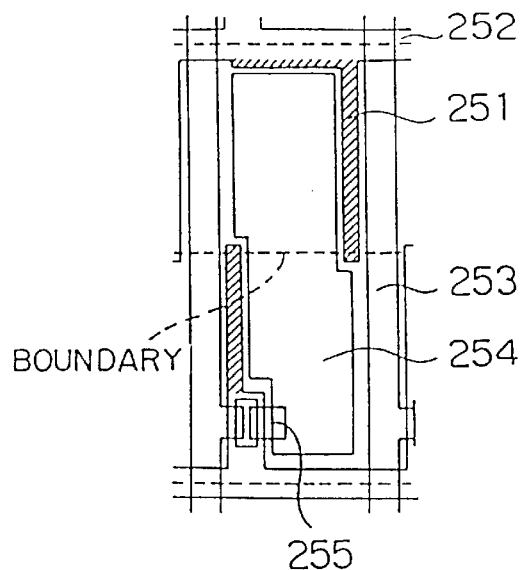
FIGS. 21A and 21B are schematic plan views showing a pixel of a modified example of the shield pattern of FIGS. 20A and 20B.
Figure 21B:
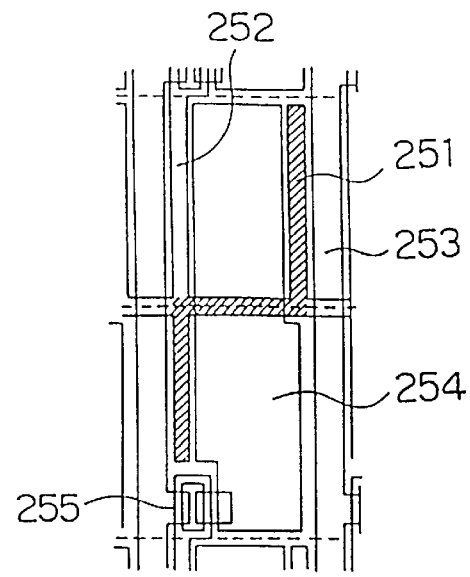

The gate bus line 252 acting as a shield pattern may be modified as shown in FIGS. 21A and 21B. In FIG. 21A, the central portion of the shield pattern is omitted at the boundary dividing sub-pixel domains. The shield pattern 251 is comprised of two branches, one of which protrudes upwards from the gate bus line 252 driving the TFT 255 concerned and the other of which protrudes downwards from the gate bus line 252 driving the adjacent row of TFTs.

FIG. 21B shows a gate bus line 252 in which the gate bus line for driving one of the adjacent TFT rows is provided at the center of the pixel for shielding the disclination generated at the boundary dividing sub-pixel domains. The gate bus line 252 is further modified to cover the disclination which will generate in the vicinity of the side edges of the pixel electrode 254.

The shield portion 251 of the gate bus line 252 shown in FIG. 21B covers only the disclination generated in the vicinity of the drain bus lines 253 and of the boundary dividing sub-pixel domains. The shield pattern 251 does not include a shield portion shielding the peripheral region between two adjacent rows of pixels. Our experiments revealed that a liquid crystal display cell shown in FIG. 21B shielded disclinations generated in the vicinity of the gate bus line, which frequently appear in the conventional liquid crystal display cell, and obtained excellent image displays.

Embodiment 20

A liquid crystal display cell of the present embodiment has a first shield pattern acting as a gate bus line similarly to Embodiment 19 of FIGS. 20A and 20B. The shield pattern further acts as a storage capacitor electrode similarly to Embodiment 18.

A gate bus line driving a row of pixels other than the row including the pixel electrode concerned has an extended portion acting as a shield pattern such as shown, for example, in FIG. 20A. The gate bus line 252 opposes the pixel electrode 254 with an insulating film interposed therebetween to form a storage capacitor.

In the present embodiment, a TFT array is arranged similarly to Embodiment 15 of FIG. 14. In this configuration, the gate bus line has a shield pattern portion extending therefrom. The plural-orientation alignment is pursued similarly to Embodiment 15. In the present embodiment, reduction in number of manufacturing steps can be obtained, an extent of reduction being greater than that of Embodiment 15.

Embodiment 21

Figure 22A:
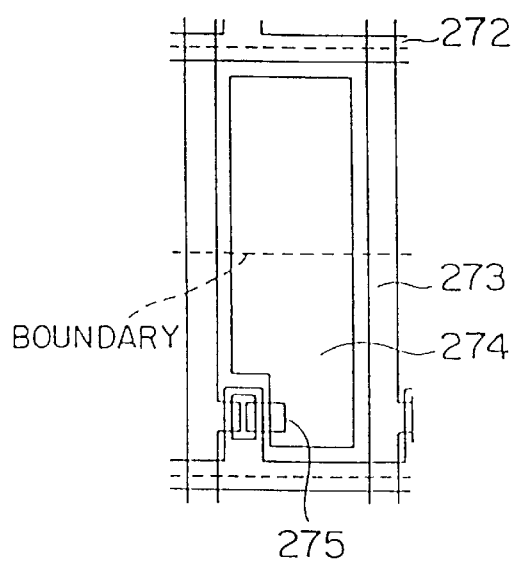
FIGS. 22A and 22B are schematic plan views showing a pixel of a liquid crystal display cell according to Embodiment 21 of the present invention.
Figure 22B:
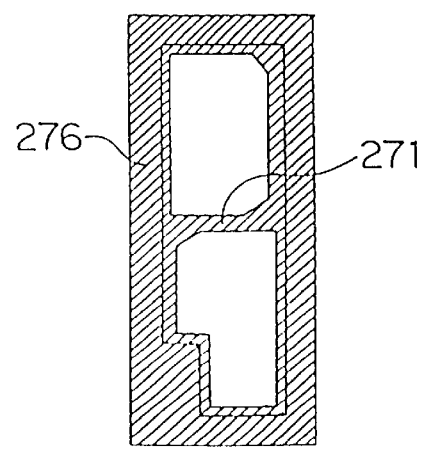
Figure 23:
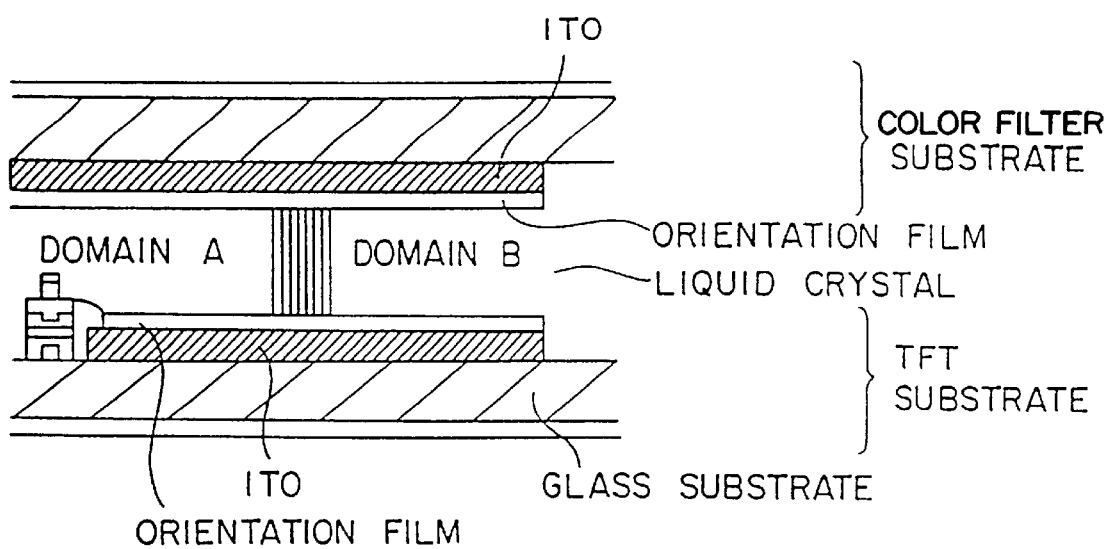
FIG. 23 is a schematic cross-sectional view showing a structure of a conventional liquid crystal display cell.
Figure 24:
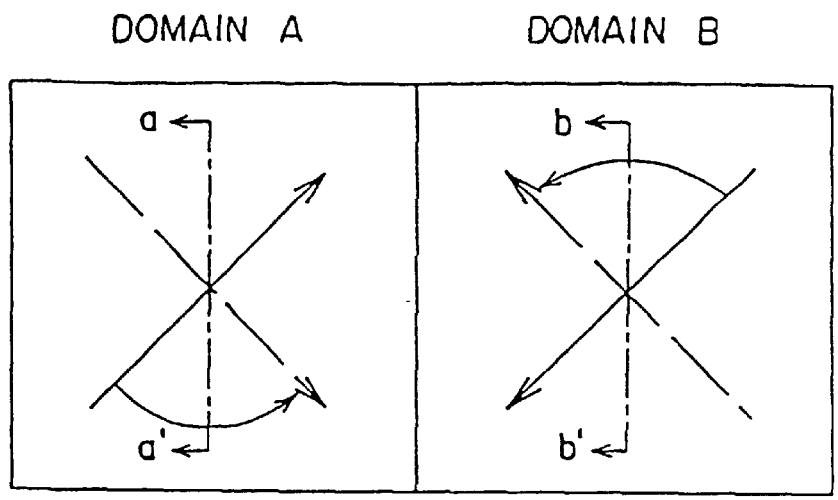
FIG. 24 is a schematic plan view demonstrating a mechanism for a wide viewing angle.
Figure 25:
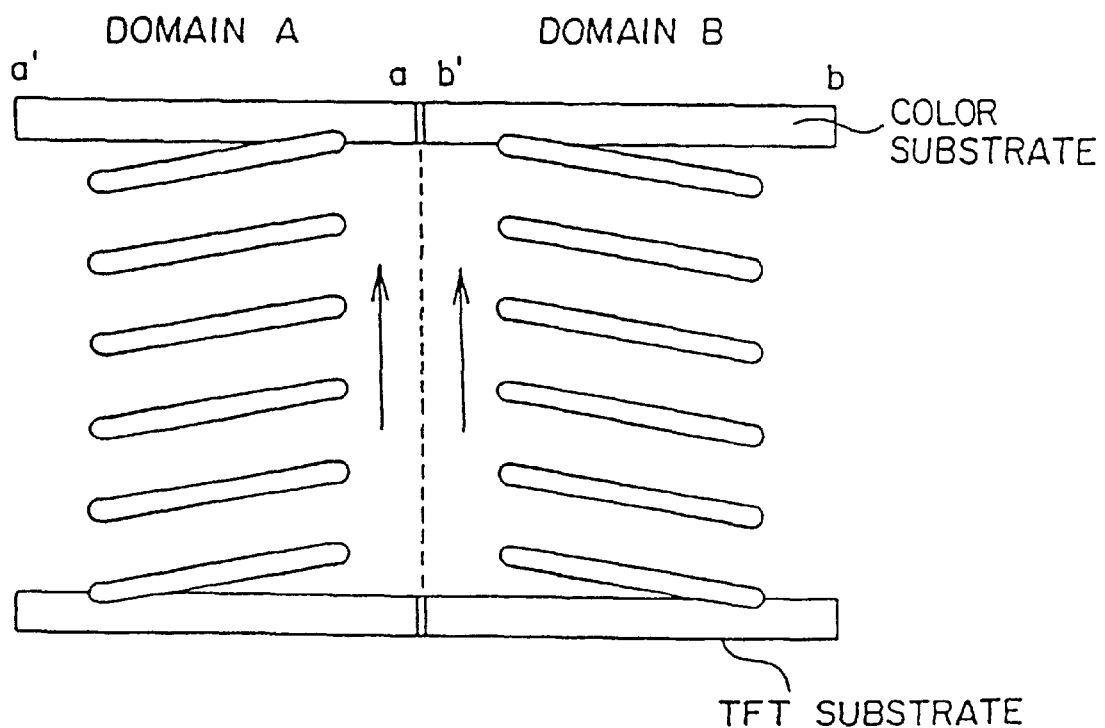
FIG. 25 is a schematic cross-sectional view demonstrating a mechanism for a wide: viewing angle.

FIGS. 22A and 22B show a configuration of a liquid crystal display cell according to the present embodiment. In this embodiment, both a first shield pattern 271 and a second shield pattern 276 are formed on a color filter substrate. The constituent elements designated by reference numerals 272–275 in FIGS. 22A and 22B correspond to the constituent elements designated by 202–205 of Embodiment 15. A shielding film generally provided on a color filter substrate for shielding a TFT in a conventional liquid crystal display cell can be used to implement the shield pattern of the present embodiment. In the present embodiment, a further reduction in number of manufacturing steps can be attained.

As described above, the second aspect of the present invention solves the problem of image failures such as afterimages caused by disclination generated and deformed in liquid crystal display cells.

Now the third aspect of the present invention will be described with reference to preferred embodiments thereof.

Embodiment 22

Figure 27:
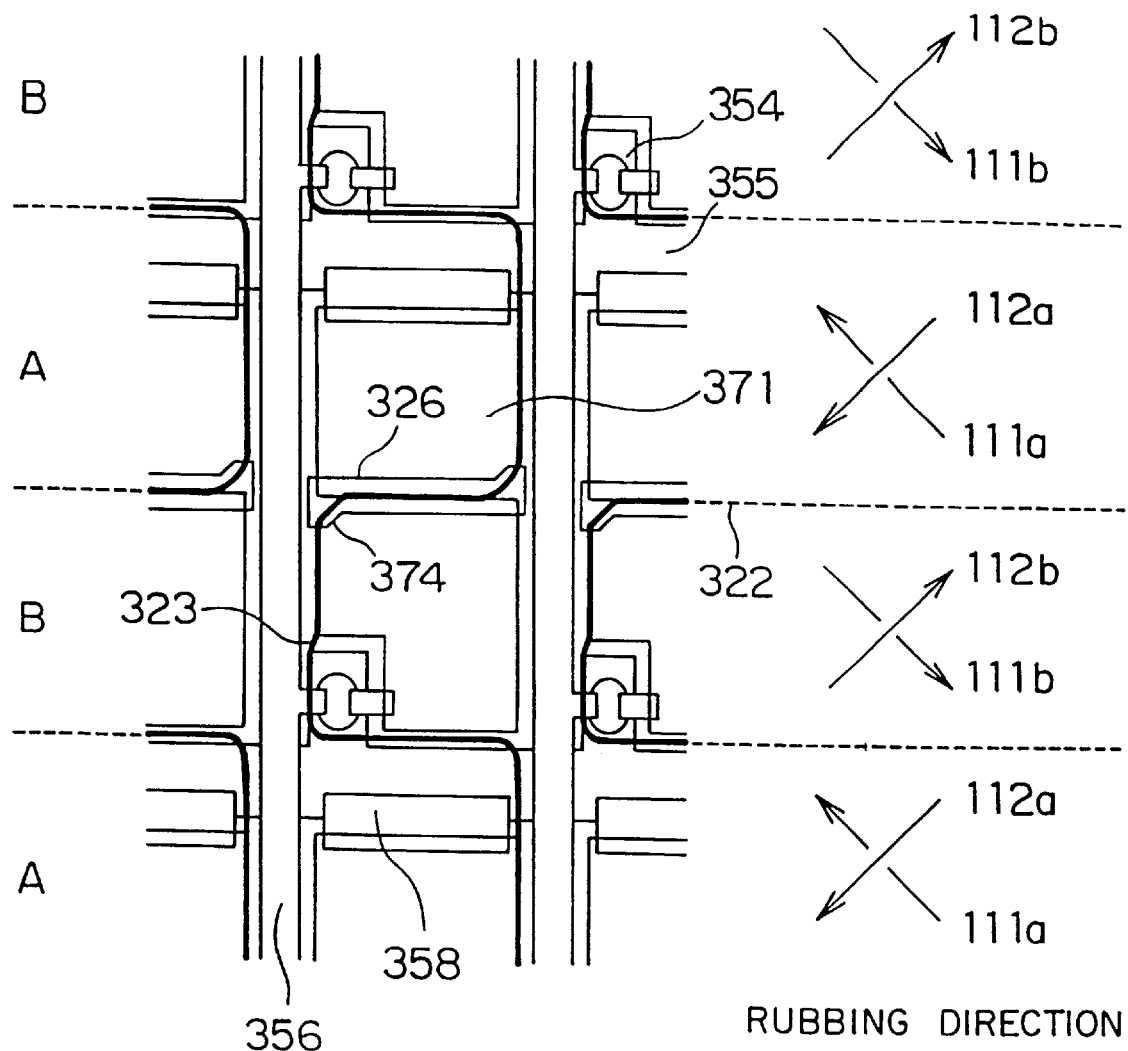
FIG. 27 is a schematic plan view showing the structure of a liquid crystal display cell according to Embodiment 22.

FIG. 27 is a schematic plan view showing a liquid crystal display cell according to Embodiment 22, and FIG. 28 is a sectional view of the liquid crystal display cell of FIG. 27 showing the structure around a gate bus line. The liquid crystal display cell of FIG. 27 has a structure in which a first substrate 311 and a second substrate 312 are combined one on another, and liquid crystal 320 is disposed therebetween. Unillustrated polarizing plates are disposed on the outer sides of the substrates 311 and 312. FIG. 27 is depicted such that the first substrate 311 is located on the rear side of the second substrate 312 in the direction perpendicular to the sheet surface.

On the first substrate or TFT substrate 311, a plurality of parallel gate bus lines extending in the horizontal direction as viewed in FIG. 27, and a plurality of parallel drain lines extending in the upright direction as viewed in FIG. 27 are provided to form a grid or lattice. A pixel electrode 371 is provided in each mesh of the grid surrounded by gate bus lines 355 and drain bus lines 356. Each of the gate bus lines 355 and the drain bus line 356 is made of a thin film of a conductive material such as Cr. Each pixel electrode 371 is composed of a thin film of a transparent conductive material such as indium tin oxide (ITO). In FIG. 28, an insulation layer 357 is formed to provide insulation among the gate bus lines 355, the drain bus lines 356 and the transparent pixel electrodes 371. Each pixel electrode 371 corresponds to one of the pixels. An active element 354 is provided for, selecting a corresponding pixel element 371 to apply a voltage thereto. Typically, a thin-film transistor (TFT) made of amorphous silicon (a—Si) or polycrystalline silicon (p—Si) is used for the active element 354. Each active element 354 has a gate connected to gate bus line 355, a drain connected to drain bus line 356, and a source connected to pixel electrode 371. A storage capacitor terminal 358 is provided for each pixel electrode 371. Each storage capacitor terminal 358 is implemented by the same conductive layer as that constituting the drain bus lines 356 and is connected to a corresponding pixel electrode 371. A part of the storage capacitor terminal 358 extends over an adjacent gate bus line 355, with an insulation layer 357 interposed therebetween, to which active element 354 for driving an adjacent pixel electrode 371 is connected (see FIG. 28). With this arrangement, a storage capacitor section 325 is formed. An orientation film 331 is formed on the innermost surface of the first substrate 311 and contacts the liquid crystal 320.

On the second substrate 312, a common electrode 372 and an orientation film 332 are formed in this order so that the orientation film 332 contacts the liquid crystal 320. The common electrode 372 is composed of a thin film of a transparent conductive material such as indium tin oxide (ITO). Also, unillustrated red, green, and blue filters are provided on the second substrate 312 for covering corresponding pixel electrodes 371. This structure allows the liquid crystal display cell to effect color display. Moreover, an unillustrated shielding layer or shield pattern is provided on the second substrate 312 to cover areas other than the areas corresponding to the pixel electrodes 371.

In the liquid crystal display cell of Embodiment 22, pixel electrodes 371 are arranged in a matrix at a pitch of 67 μm in the direction in which gate bus lines 355 extend and at a pitch of 201 μm in the direction in which drain bus lines 356 extend. The first substrate 311 and the second substrate 312 are combined one on another with a gap of about 6 μm.

In the present embodiment, minute areas A and B of the first substrate 311 and the second substrate 312 corresponding to sub-pixel domains of the liquid crystal have been subjected to alignment processes in different directions. In detail, the first substrate 311 has been subjected to alignment processes in the directions indicated by arrows 111a and 111b in FIG. 27, and the second substrate 312 has been subjected to alignment processes in the directions indicated by arrows 112a and 112b in FIG. 27. It is noted that arrows 111a and 111b are opposite in direction while arrows 112a and 112b are opposite in direction. Further, arrows 111a and 112a are normal to each other while arrows 111b and 112b are normal to each other. Boundaries between the areas A and B (illustrated by chain lines) are straight lines which are parallel to the direction in which gate bus line 355 extend. Each of the boundaries is alternately located at a position where it passes through the central portion of pixel electrode 371 and a position where it passes between pixel electrode 371 and gate bus line 355 to which active element 354 for driving pixel electrode 371 is connected.

The process shown FIGS. 29A–29E used to effect orientation alignment processes in different directions for each of minute areas of both the substrates 311 and 312 is similar to that described with reference to FIG. 2. In the present embodiment, SE-7210 (0621) of Nissan Chemical Corp. was used as the alignment agent in an ordinary manner, an ordinary positive photoresist was used for a resist pattern, and acetone was used for removing the resist.

In the present embodiment, ZLI-4792 supplied from E. Merck, Darmstadt Co. was used for the liquid crystal 320. In the liquid crystal 320, a minute amount of a left-hand chiral agent is added to provide counterclockwise rotation. Major axes of liquid crystal molecules are twisted or rotated counterclockwise by about 90° as viewed from the inner surface of the second substrate 312 toward the inner surface of the first substrate 311 according to the function of the chiral agent and the directions of the orientation alignment processes. Also, the major axes of the liquid crystal molecules in the vicinity of the inner surfaces of the first and second substrates 311 and 312 have pre-tilted directions corresponding to the directions of the alignment processes so that they have initially oriented to deviate the substrate surface toward the directions indicated by the arrows 111a, 111b, 112a and 112b. That is, liquid crystal in the sub-pixel domain A and liquid crystal in the sub-pixel domains 13 have different pre-tilt directions before application of a voltage. Accordingly, the liquid crystal molecules in the areas A and B shown in FIG. 27 are urged to stand or tilt in different directions with respect to the substrate upon application of a driving voltage. Alternatively, the liquid crystal molecules may have different pre-tilt angles between in both the domains while the pre-tilt directions in both the domains are the same.

In the liquid crystal display cell of the present embodiment, shield patterns 326 are provided on the first substrate 311, on which pixel electrodes 371 are formed, so as to prevent light from passing through disclination areas. The shield patterns 326 are made of the same conductive layer as that for the gate bus lines, and are provided at positions corresponding to boundaries 322 of the sub-pixel domains wherein each boundary 322 extends across the roughly central portions of pixel electrodes 371 as viewed in upright direction of FIG. 27. The shield patterns 326 are electrically insulated from pixel electrodes 371 by the insulator layer 357.

Each pixel electrode 371 has a cut-away portion 374. The cut-away portion 374 is provided at a location corresponding to a boundary 322 of the divided areas which extends across the roughly central portion of pixel electrodes 371. The cut-away portion 374 has a shape such that each pixel electrode 371 is partly cut away at locations in areas A an B at which reverse tilt domains tend to be generated. In detail, cut-away portions each having a rectangular equilateral triangular shape are formed adjacent to the central portion of the pixel electrode 371 at both sides of the pixel electrodes located at the rear sides of the pre-tilt directions of liquid crystal molecules in the vicinity of the surface of the first substrate 311, i.e., at the sides of each of the divided areas of the pixel electrodes located on the rear sides of arrows 111a and 111b (shown in FIG. 27) which indicate the directions of the alignment processes for the first substrate 311. The oblique side of each triangular cut-away portion intersects with the rubbing direction of the first substrate at approximately right angles. Experiments were performed by selectively forming three kinds of cut-away portions 374 having oblique sides of 6 µm, 12 µm and 18 µm, respectively.

Next, positions at which disclination 323 is generated in the liquid crystal display cell of the present embodiment will be described with reference to FIGS. 27 and 28.

First, a disclination 323 generated along a boundary which extends across the central portion of pixel electrodes 371 will be described with reference to FIG. 27. In the liquid crystal display cell of the present embodiment, disclination has a tendency to generate in an area on each pixel electrode where a reverse tilt domain occurs, i.e., in the vicinity of the intersections of the sides of each pixel electrode 371 and a boundary 322 of the sub-pixel domains. Meanwhile, each pixel electrode 371 is cut away at locations opposite to the pre-tilt directions of liquid crystal molecules in the vicinity of the surface of the first substrate 311. Accordingly, at locations where the pixel electrode 371 has been cut away, tempered lateral electric field acts to the layer of liquid crystals, so that disclination 323 is fixed to the predetermined position, i.e., on the boundary 322 of the sub-pixel domains.

Next, a disclination 323 generated along a boundary which is provided between pixel electrodes 371 and gate bus line 355 will be described with reference to FIG. 28. FIG. 28 is a sectional view taken along a line perpendicularly intersecting with the direction of gate bus lines 355, and shows the portion around boundary 322 of the pixel areas which is defined between pixel electrode 371 and gate bus line 355. In FIG. 28, the direction of electrical field is shown by broken lines. In the liquid crystal display cell, boundary 322 of the pixel areas is set between pixel electrodes 371 and gate bus line 355, and the alignment processes have been performed to urge liquid crystal molecules 321 at edge portion of each pixel area to rotate or tilts in a rotational direction, which is called a pre-tilt direction, such that one of the ends of the major axes of the liquid crystal near the boundary 322 move or stay away from the first substrate 311 on which the gate bus lines 355 are provided, with the other of the ends far from the boundary staying on the surface of the substrate 311. Consequently, the direction of the electric field, shown in FIG. 28, acting to the layer of liquid crystals 320 corresponds to the directions in which the liquid crystal pre-tilts. Thus, disclination 323 is fixed to a predetermined position, i.e., on the boundary 322 of the pixel areas.

It was confirmed that each disclination 323 generated at a boundary is fixed around the boundary 322 of the divided orientation areas, so that a set of disclinations 323 were fixed to predetermined positions over the entire surface, as shown in FIG. 27, that the disclinations 323 did not enter openings for pixels, and that an excellent image quality was provided over the entire surface of the liquid crystal display cell. This was confirmed in all the cases where the three kinds of cut-away portions were formed.

Comparative Example 9

A liquid crystal display cell was manufactured which basically had the same structure as that used in Embodiment 22, except for the planar shape of each pixel electrode 371. That is, each pixel electrode 371 had no cut-away portion so that the pixel electrode 371 had a straight outline extending along drain bus line 356. Remaining portions of the pixel electrodes were the same as those in the liquid crystal display cell of Embodiment 22, as shown in FIG. 30.

Figure 30:
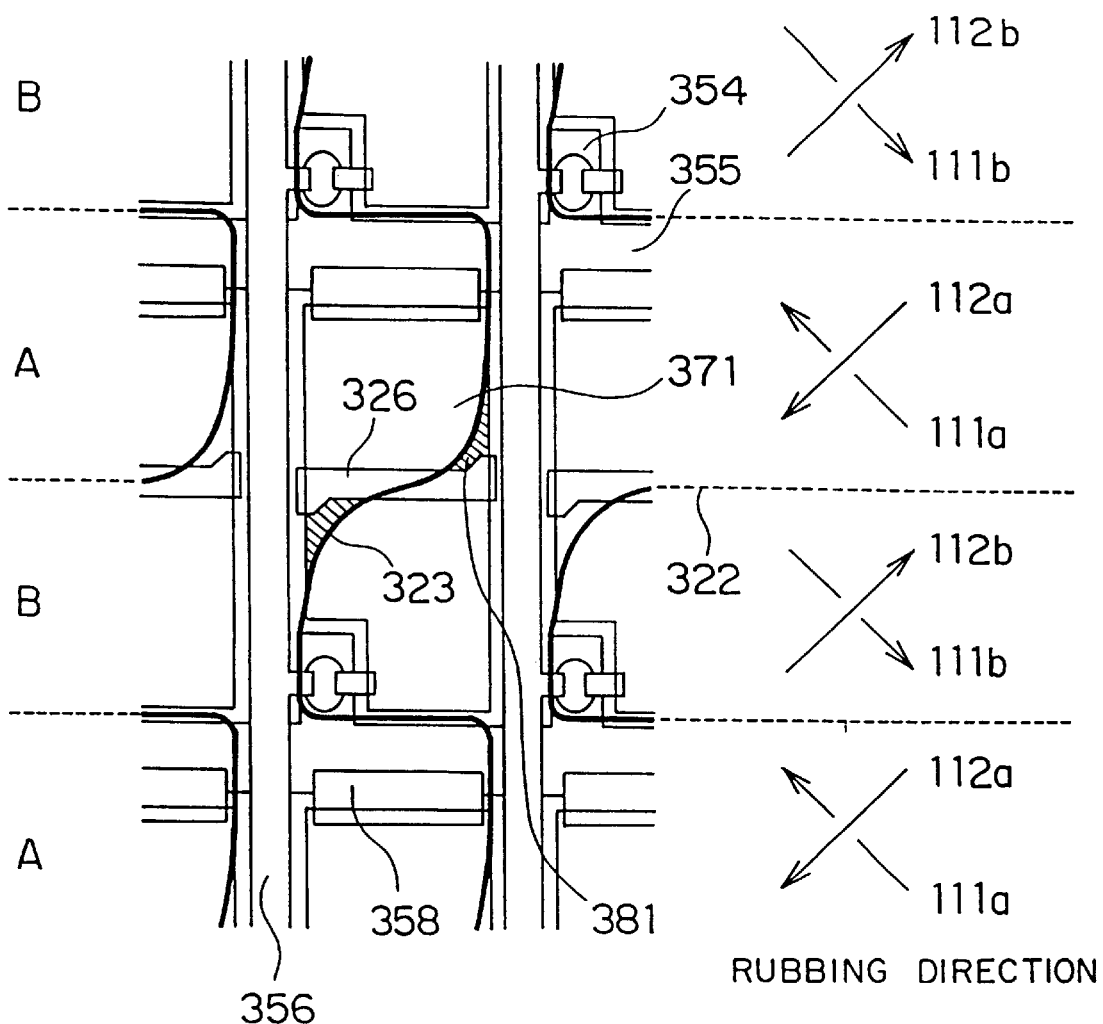
FIG. 30 is a plan view showing the structure of a liquid crystal display cell according to Comparative Example 9.

In the liquid crystal display cell of the present comparative example, it was confirmed that disclination sometimes occurred which deviated from boundary 322 of the sub-pixel domains so that disclination appeared outside shield patterns 326, as shown in FIG. 30. This deteriorated the image quality. FIG. 30 also shows reverse tilt domains 381 which were generated on pixel electrodes. The reverse tilt domains 381 were generated around the boundary of the sub-pixel domains at the side portions of the pixels opposite to the pre-tilt directions of the liquid crystal molecules in the vicinity of the surface of the first substrate 311, i.e., at side portions on the rear sides of arrows 111a and 111b indicating the directions of the alignment processes for the first substrate 311.

Embodiment 23

Figure 31:
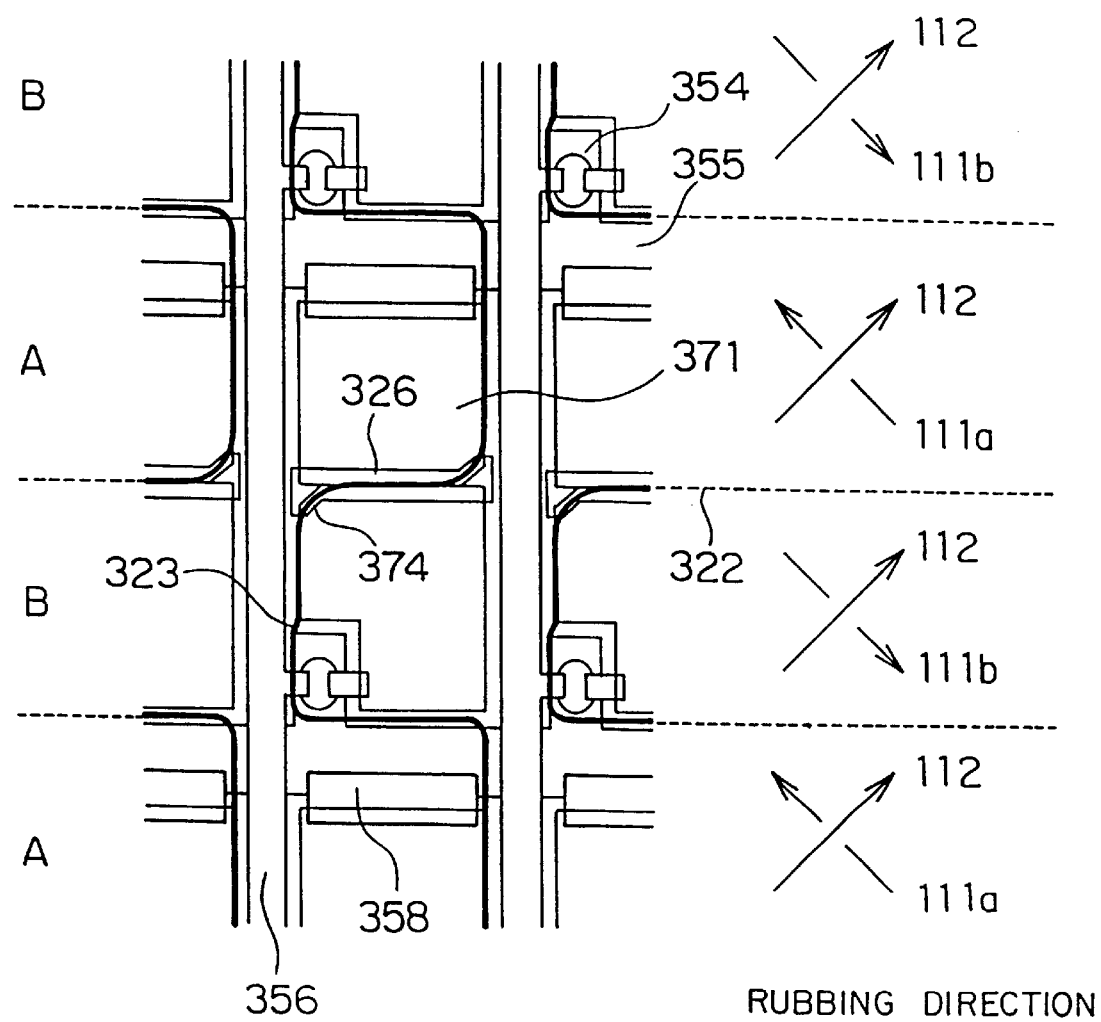
FIG. 31 is a plan view showing the structure of a liquid crystal display cell according to Embodiment 23.

FIG. 31 shows a liquid crystal display cell according to the present embodiment. The liquid crystal display cell of the present embodiment is basically the same as that of Embodiment 22. However, the liquid crystal display cell of the present embodiment is manufactured such that a polyimide providing a large pre-tilt angle is used for the orientation film 331 of the first substrate 311 on which pixel electrodes 371 are provided while a polyimide providing a small pre-tilt angle is used for the orientation film 332 of the second substrate 312 on which the common electrodes 372 is provided, and that the second substrate 312 is subjected to an alignment process in one direction. Namely, only the first substrate 311 is subjected to a plural-orientation alignment process such that the minute areas of each pixel have different alignment orientations. The second substrate 312 is rubbed only in one direction after the formation of the orientation film 332.

When a voltage is applied to the liquid crystal display cell having the structure as described above, major axes of the liquid crystal molecules in the minute areas A and B are aligned in different directions in an area-by-area fashion, thereby providing effects similar to those obtained in Embodiment 22.

It is noted that there are some cases where the liquid crystals in the domains A and the domains B have different pre-tilt angles in the vicinity of the surface of the first substrate 311. In such a case, the direction of the rubbing treatment for the second substrate 312 is determined such that the liquid crystal 320 has a splay-type deformation structure in each of the areas where the larger pre-tilt angle will be provided. In this manner, the liquid crystals can be stably aligned in each of the divided domains.

In FIG. 31, the directions of the rubbing treatments for the first substrate 311 are indicated by arrows 111a and 111b while the direction of the rubbing treatment for the second substrate 312 is indicated by arrow 112. Similarly to Embodiment 22, each of boundaries 322 of minute areas A and B having different alignment directions is a straight line which is parallel to the direction in which gate bus lines 355 extend. The boundaries are alternately located at a position where it passes the central portion of pixel electrodes 371 and a position where it passes between a pixel electrode 371 and a gate bus line 355 to which active element 354 for driving the pixel electrode is connected.

As is the case with Embodiment 22, the liquid crystal display cell of the present embodiment has shield patterns 326 provided on the first substrate 311, on which pixel electrodes 371 are formed, so as to prevent light from passing through disclination areas.

Also, each pixel electrode 371 has a cut-away portion 374. The cut-away portion 374 is provided at a location corresponding to a boundary 322 of the sub-pixel domains which extends across the roughly central portion of pixel electrode 371. The cut-away portion 374 has a shape such that parts of each pixel electrode 371 where reverse tilt domains tend to be generated are removed, i.e., it has the same shape as used in Embodiment 22. Similarly to Embodiment 22, experiments were conducted by selectively forming three kinds of cut-away portions 374 having oblique sides of 6 μm, 12 μm and 18 μm, respectively.

It was confirmed that disclination occurred at a fixed location around boundary of the divided areas, and disclination lines 323 were fixed to predetermined positions over the entire surface, that the disclination lines did not enter openings for pixels, and that an excellent image quality was provided over the entire surface of the liquid crystal display cell. This was confirmed in all the cases where the three kinds of cut-away portions were formed.

Comparative Example 10

A liquid crystal display cell was manufactured which basically had the same structure as that used in Embodiment 23, except for the planar shape of each pixel electrode 371. That is, each pixel electrode 371 had no cut-away portion so that its side portion had a straight line extending along drain bus line 356. The remaining portions of the pixel electrodes were the same as those in the liquid crystal display cell of Embodiment 23.

In the liquid crystal display cell of the present comparative example, it was confirmed that disclination sometimes occurred which deviated from boundary 322 of the divided areas so that disclination appeared outside shield patterns 326, similarly to Comparative Example 9. This deteriorated the image quality.

Embodiment 24

Figure 32:
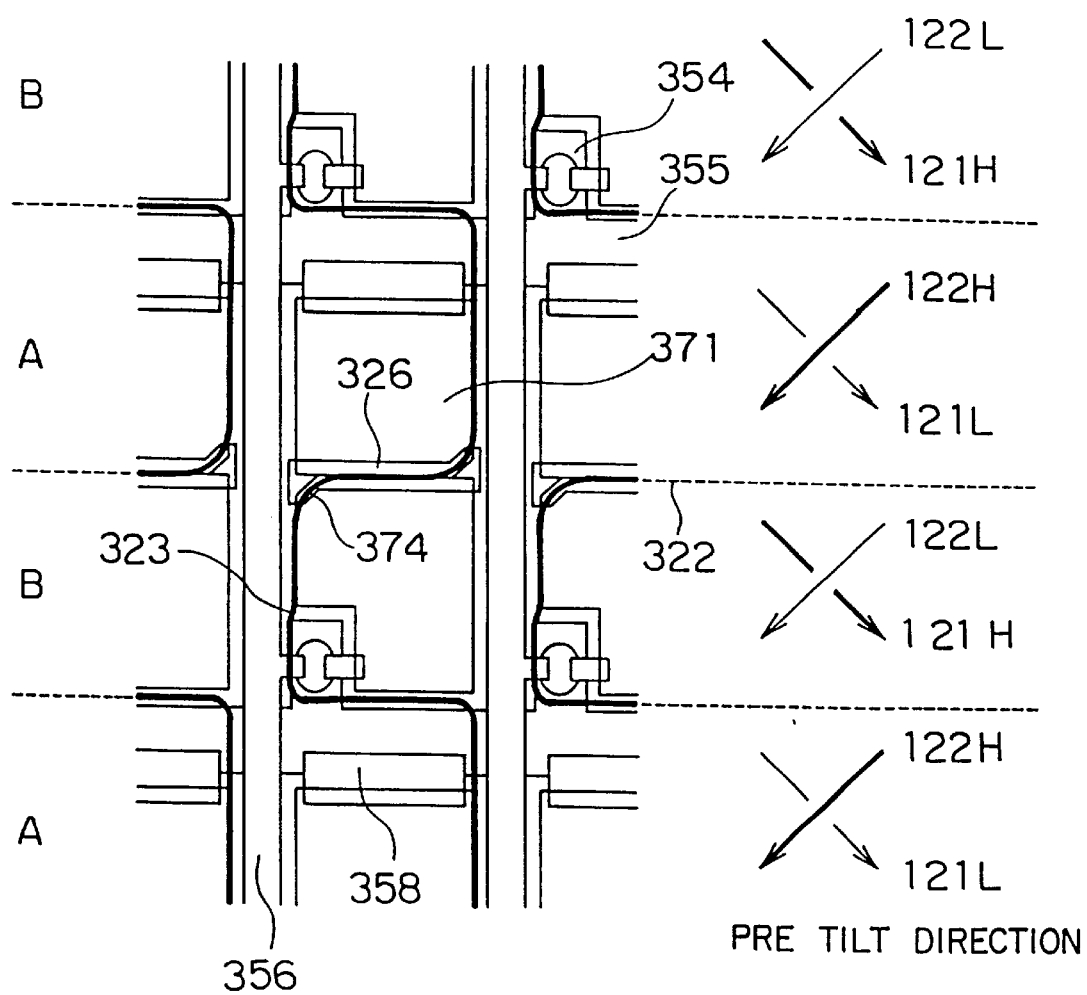
FIG. 32 is a plan view showing the structure of a liquid crystal display cell according to Embodiment 24.
Figure 32:
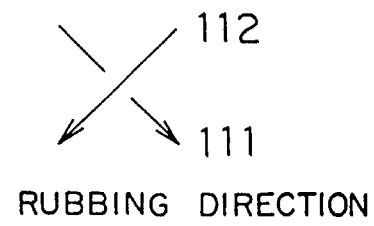

FIG. 32 shows a liquid crystal display cell according to the present embodiment. The liquid crystal display cell of the present embodiment is basically the same as that of Embodiment 22. However, the liquid crystal display cell of the present embodiment differs from the liquid crystal display cell of Embodiment 22 in that the first and second substrates 311 and 312 are subjected to alignment processes such that liquid crystals in the vicinity of the surface of each substrate have the same pre-tilt direction, and liquid crystals in minute areas A and liquid crystals in minute area B respectively have pre-tilt angles different from each other in the vicinity of the surface of each substrate.

In each minute area A, the pre-tilt angle in the vicinity of the inner surface of the second substrate 312 is larger than the pre-tilt angle in the vicinity of the inner surface of the first substrate 311. By contrast, in each minute area B, the pre-tilt angle in the vicinity of the inner surface of the first substrate 311 is larger than the pre-tilt angle in the vicinity of the inner surface of the second substrate 312. Moreover, the directions of the alignment processes are determined such that the liquid crystal 320 has a splay-type deformation structure in each of the minute areas A and B.

When a voltage is applied to the liquid crystal display cell having the structure as described above, the liquid crystal molecules in the minute areas A and B are aligned in different directions in an area-by-area fashion, thereby providing effects similar to those obtained in Embodiment 22.

Another liquid crystal display cell of modified Embodiment 24 may be used in which an alignment process is performed for the first substrate 311 such that liquid crystals in the vicinity of the surface of the substrate have the same pre-tilt direction, and liquid crystal in minute areas A and liquid crystal in minute areas B respectively have pre-tilt angles different from each other -n the vicinity of the substrate surface, and in which the second substrate 312 has an orientation film made of material providing a pre-tilt angle between the pre-tilt angles provided to the minute areas A and B of the first substrate 311, and is subjected to an alignment process in one direction only. With this construction of the liquid crystal display cell, upon application of a voltage, liquid crystal molecules in the minute areas A and B are aligned in different directions in an area-by-area fashion, thereby providing effects similar to those obtained in Embodiment 22. The shape of pixel electrodes may be the same as that of Embodiment 24, which will be described later.

In FIG. 32, the direction of the rubbing treatment for the first substrate 311 is indicated by a numeral 121 of the arrow 121L or 121H while the direction of the rubbing treatment for the second substrate 312 is indicated by a number 122 of the arrow 122L or 122H. Pre-tilt directions of the liquid crystal and relative magnitudes of the pre-tilt angles of the liquid crystal molecules in the minute areas A and B are indicated by arrows 121H and 121L for the first substrate 311 and indicated by arrows 122H and 122L for the second substrate 312. The pre-tilt angle represented by thick arrows 121H and 122H is larger than the pre-tilt angle represented by thin arrows 121L and 122L. Similarly to Embodiment 22, each of boundaries 322 (illustrated by chain lines) of minute areas A and B where different pre-tilt angles are provided to liquid crystal molecules in the vicinity of the surface of each substrate is a straight line which is parallel to the gate bus lines 355 and which is alternately located at a position where it passes the central portion of pixel electrodes 371 and at a position where it passes between pixel electrode 371 and gate bus line 355 to which active element 354 for driving the pixel electrode is connected.

Figure 33A:
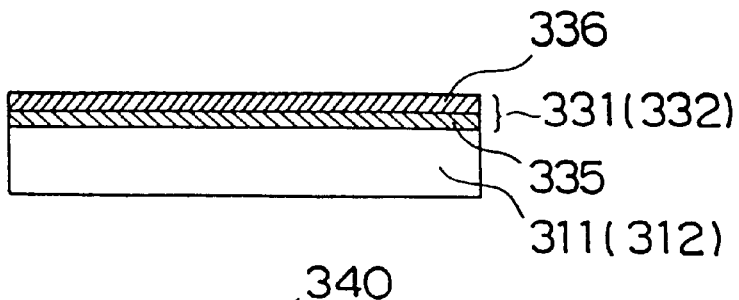
FIGS. 33A–33E are sectional views showing an alignment process performed for the substrates in consecutive steps.
Figure 33B:
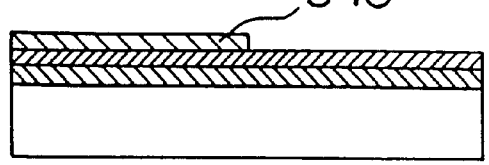

The process shown FIGS. 33A–33E are used to effect alignment processes in different directions for each of minute areas on a single substrate. First, as shown in FIG. 33A, an orientation film 331 (332) which is composed of a first alignment agent layer 335 made of an inorganic material and providing a small pre-tilt angle and a second alignment agent layer 336 made of an organic alignment agent and providing a large pre-tilt angle is formed on the substrate 311 (312). Next, a resist 340 is then applied onto the orientation film 331 (332), as shown in FIG. 33B, and a predetermined photoresist pattern is formed by photolithography to cover the areas A or the areas B shown in FIG. 32.

Figure 33C:
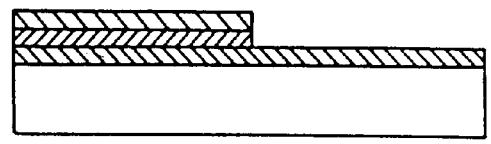
Figure 33D:
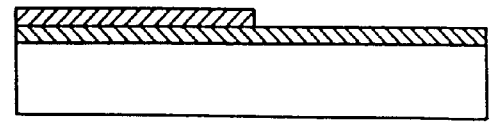
Figure 33E:
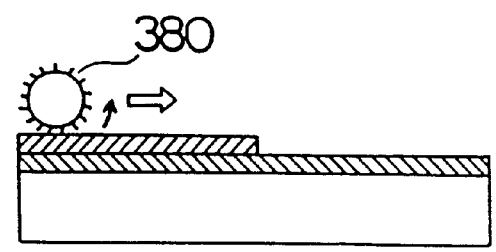

Subsequently, as shown in FIG. 33C, the second alignment agent layer 336 made of an organic material is partly removed in accordance with the resist pattern so that the first alignment agent layer 335 made of an inorganic material is exposed to the outside. Then, the photoresist pattern is removed, as shown in FIG. 33D. Finally, the orientation film 331 332) is subjected to a rubbing treatment in a predetermined direction, as shown in FIG. 33E. In this manner, the substrates 311 and 312 can be obtained which have minute areas A and B providing different pre-tilt angles in the vicinity of the surfaces of the substrates.

As is the case with Embodiment 22, the liquid crystal display cell of the present embodiment has shield patterns 326 provided on the first substrate 311, on which pixel electrodes 371 are formed, so as to prevent light from passing through disclination areas.

Next, locations at which disclination is generated on each pixel electrode of the liquid crystal display cell of the present embodiment will be described. When a voltage is applied to the liquid crystal display cell of the present embodiment, liquid crystals in minute areas A between the substrates tilt in the direction opposite to arrow 121L which represents the pre-tilt direction having a smaller pre-tilt angle in the vicinity of the surface of the first substrate 311, and liquid crystals in minute areas B between the substrate tilt in the direction of arrow 121H which represents the pre-tilt direction having a larger angle in the vicinity of the surface of the first substrate 311. Accordingly, the "substantial pre-tilt direction" at the surface of the first substrate 311 coincides with the direction opposite to the direction of arrow 121L in the areas A and coincides with the direction of arrow 121H in the areas B. Accordingly, reverse tilt domains tend to occur at locations on the forward side of arrow 121L and on the rear side of arrow 121H in each of the minute areas.

Also, each pixel electrode 371 has a cut-away portion 374. The cut-away portion 374 is provided at a location corresponding to a boundary 322 of sub-pixel domains which extends across the roughly central portion of pixel electrodes 371. The cut-away portion 374 has a shape such that parts of each pixel electrode 371 where reverse tilt domains tend to be generated are removed, i.e., it has substantially the same shape as used in Embodiment 22.

Similarly to Embodiment 22, experiments were performed by selectively forming three kinds of cut-away portions 374 having oblique sides of 6 µm, 12 µm and 18 µm, respectively. It was observed that disclination generated around each boundary of the divided areas was fixed to a predetermined position, similarly to Embodiment 22. Also, it was confirmed that disclination lines were fixed to predetermined positions over the entire surface, that the disclination lines did not enter openings for pixels, and that an excellent image quality was provided over the entire surface of the liquid crystal display cell. This was confirmed in all the cases where the three kinds of cut-away portions were formed.

Comparative Example 11

A liquid crystal display cell was manufactured which basically had the same structure as that used in Embodiment 24, except for the planar shape of each pixel electrode 371. That is, each pixel electrode 371 had no cut-away portion so that its side portion had a straight line extending along drain bus line 356. The remaining portions of the pixel electrodes were the same as those in the liquid crystal display cell of Embodiment 24.

In the liquid crystal display cell of the present comparative example, it was confirmed that disclination sometimes occurred which deviated from boundary 322 of the sub-pixel domains so that disclination appeared outside the shield patterns 326, similarly to Comparative Example 9. This deteriorated the image quality.

Embodiment 25

Figure 34:
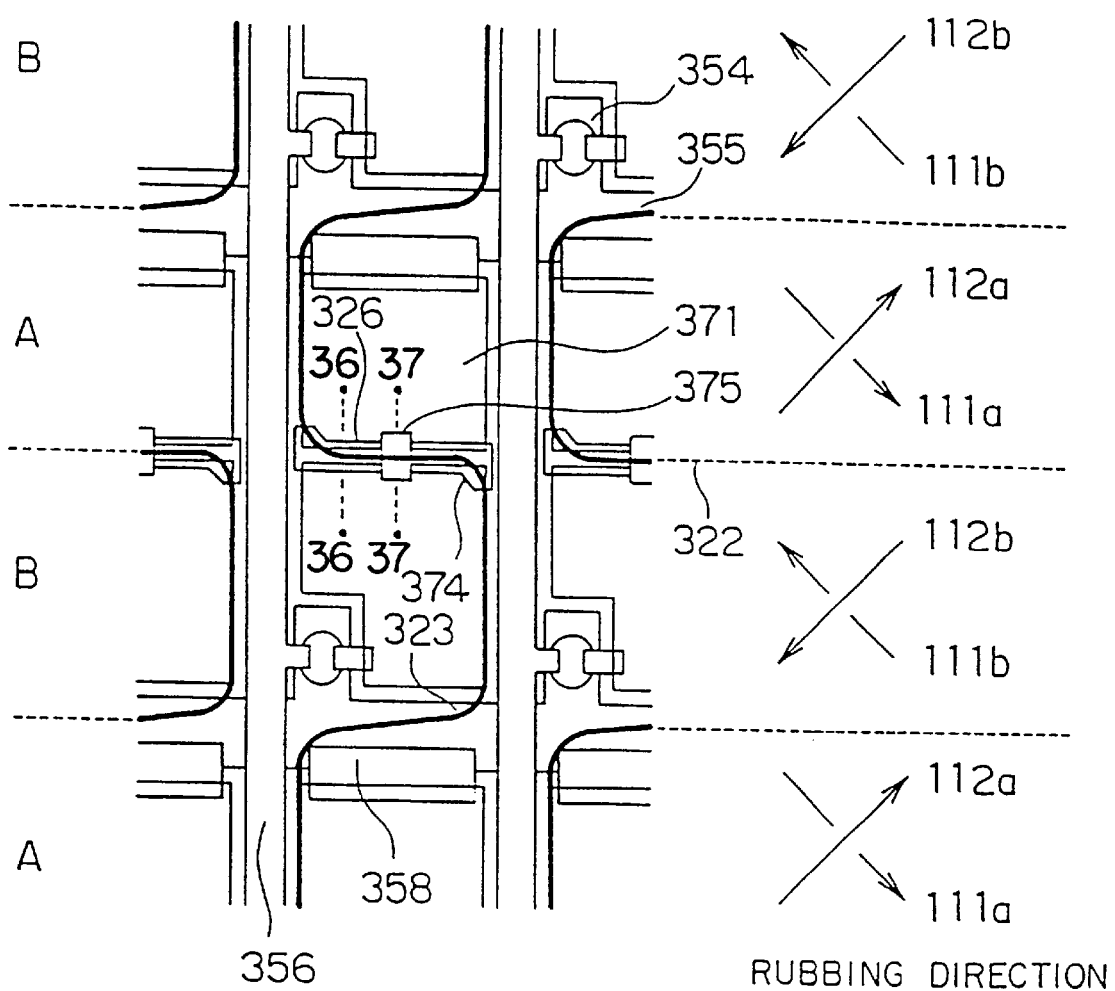
FIG. 34 is a plan view showing the structure of a liquid crystal display cell according to Embodiment 25.
Figure 35:
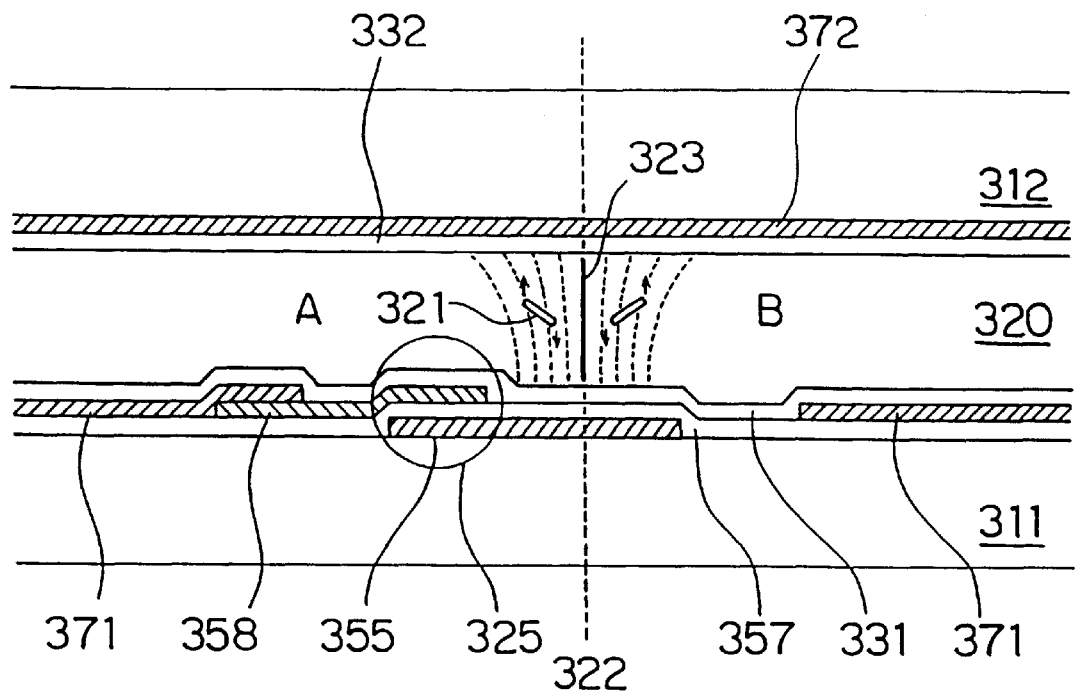
FIG. 35 is a sectional view of the liquid crystal display cell of Embodiment 25 which shows the structure around a gate bus line.
Figure 36:
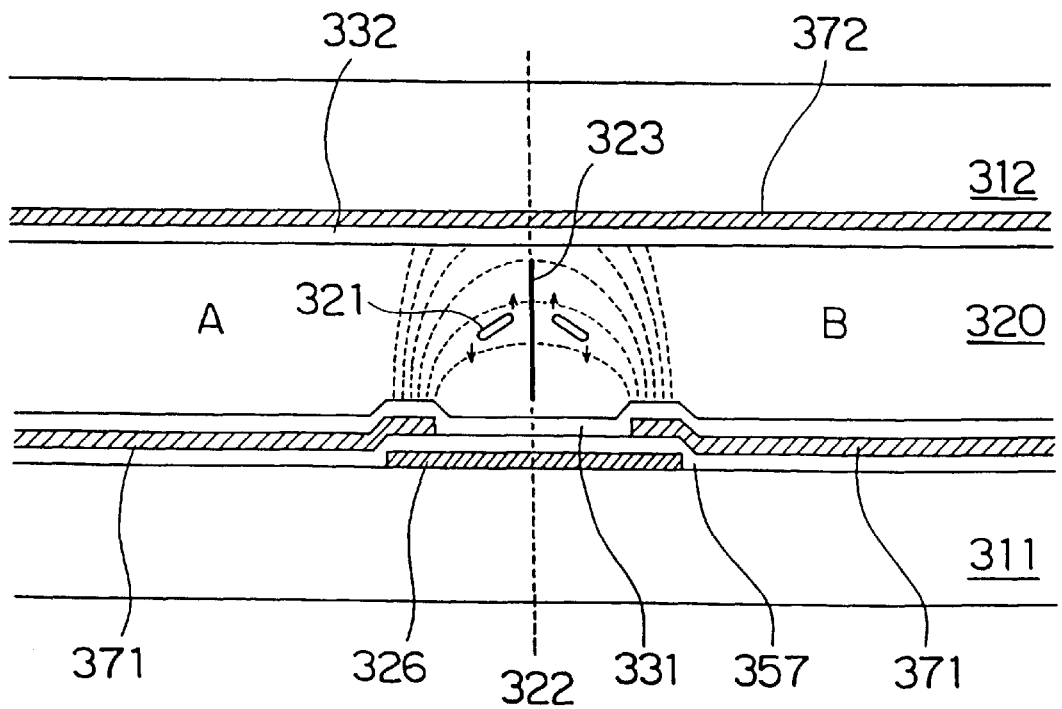
FIG. 36 is a sectional view of the liquid crystal display cell of Embodiment 25 taken along line 36—36 in FIG. 34.
Figure 37:
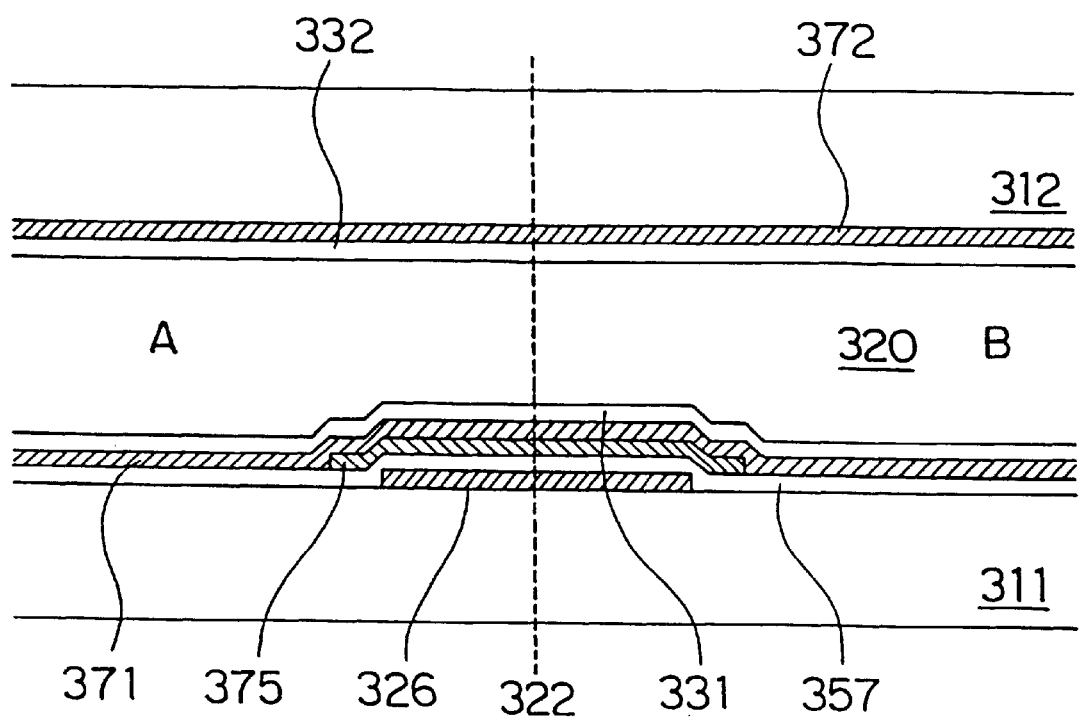
FIG. 37 is a sectional view of the liquid crystal display cell of Embodiment 25 taken along line 37—37 in FIG. 34.

FIG. 34 is a plan view showing the structure of a liquid crystal display cell according to the present embodiment. FIGS. 35, 36 and 37 are all sectional views in the direction perpendicular to the direction in which gate bus lines 355 extend. FIG. 35 shows the structure around a gate bus line 355. FIG. 36 is a sectional view taken along line 36—36 in FIG. 34 while FIG. 37 is a sectional view taken along line 37—37 in FIG. 34. The construction of the liquid crystal display cell of the present embodiment is basically the same as that of Embodiment 22 except for the directions of the rubbing treatments for minute areas A and B of the first and second substrates 311 and 312, the positions of boundaries between the areas A and the areas B, and the planar shape of each pixel electrode 371.

The first substrate 311 is subjected to alignment processes in the directions indicated by arrows 111a and 111b in FIG. 34, and the second substrate 312 is subjected to alignment processes in the directions indicated by arrows 112a and 112b in FIG. 34. Boundaries 322 between the areas A and B (illustrated by chain lines) are straight lines parallel to the gate bus lines 355 and are alternately located at a position where it crosses the central portion of each pixel electrode 371 and a position where it bisects a rectangular area of gate bus line 355 in the widthwise direction wherein the rectangular area is roughly determined by omitting portions where drain bus line 356 and storage capacitor terminal 358 overlap with or oppose the gate bus line 355 from the gate bus line 355.

In a liquid crystal display cell having no storage capacitor terminal or a liquid crystal display cell in which no storage capacitor terminal overlaps with or opposes gate bus line, the boundaries 322 of different orientation areas are straight lines parallel to the direction in which gate bus lines 355 extend and the boundaries are alternately located at a position where it crosses the central portion of each pixel electrode 371 and a position where it passes through the laterally central portion of gate bus line 355. In the present embodiment, the manufacturing process can be simplified by combination use of two different orientation films providing different pre-tilt angles similarly to Embodiment 23, or by use of orientation films each including two layers similarly to Embodiment 24.

As is the case with Embodiment 22, the liquid crystal display cell of the present embodiment has shield patterns 326 provided on the first substrate 311, on which pixel electrodes 371 are formed, so as to prevent light from passing through disclination areas (see FIGS. 36 and 37). The shield patterns 326 are made of the same conductive layer as that for gate bus lines 355, and are electrically isolated from pixel electrodes 371 by a insulator layer 357.

Also, each pixel electrode 371 has a pair of cut-away portions 374 at a location corresponding to boundary 322 of sub-pixel domains which extends across the roughly central portion of pixel electrodes 371. That is, each pixel electrode 371 is cut away from both sides to form the cut-away portions 374 of a strip shape extending along the boundary 322. The lateral center of each cut-away portion 374 corresponds to the boundary 322. Experiments were performed by selectively forming three kinds of cut-away portions 374 having lateral widths of 3 µm, 6 µm and 9 µm, respectively. To prevent pixel electrode 371 from being broken at the narrowed portion formed by the cut-away portions 374 which would otherwise cause a defect, each pixel electrode 371 is reinforced by a reinforcement terminal 375 at the narrowed portion formed by the cut-away portions 374. The reinforcement terminal 375 is made of the same conductive layer as that for drain bus lines 356, and is electrically connected to a corresponding pixel electrode 371 (see FIG. 37).

Next, positions at which disclination is generated in the liquid crystal display cell of the present embodiment will be described with reference to FIGS. 34, 35 and 36. FIGS. 35 and 36 are both sectional views in the direction perpendicular to the direction in which gate bus lines 355 extend. FIG. 35 shows the portion including a boundary 322 of the diferent orientation areas which extends along gate bus line 355, while FIG. 36 shows the portion including a boundary 322 of different orientation areas which is located at a position where it crosses the roughly central portion of pixel electrode 371. In FIGS. 35 and 36, the direction of electric field is indicated by broken lines.

Disclination generated along boundary 322 which extends along the gate bus line 355 will be described with reference to FIG. 35. In the liquid crystal display cell, boundary 322 of the adjacent pixel areas is set at a position where it bisects a rectangular area of gate bus line 355 in the widthwise direction wherein the rectangular area is roughly determined by omitting portions where drain bus line 356 and storage capacitor terminal 358 overlap with the gate bus line 355 from the area of the gate bus line. Also, alignment processes have been performed to urge liquid crystal molecules 321 at both edges of each divided area to pre-tilt such that one of the ends of the major axes of the liquid crystal near the boundary 322 stays away from the first substrate 311 on which gate bus lines 355 are provided while the other end of the major axes far from the boundary stay on the surface of the first substrate 311.

Consequently, the direction of the electric field is, as shown in the drawing, acting to the layer of liquid crystals coincides with the pre-tilt directions of the liquid crystals. Hence, disclination 323 is fixed to a predetermined position, i.e. , fixed onto the boundary 322 of the pixel areas.

Next, disclination generated along a boundary which extends across the central portion of pixel electrode 371 will be described with reference to FIG. 36. In the liquid crystal display cell of the present embodiment, cut-away portions are formed in alignment with the boundary which crosses the roughly central portion of pixel electrode 371, and a plural-orientation alignment process is performed to urge liquid crystal molecules 321 at both edges of sub-pixel domains to pre-tilt such that one of the ends of the major axes of the liquid crystal near the boundary 322 stay away from the surface of the first substrate 311 on which gate bus lines 355 are provided, while the other end of the major axes far from the boundary stay on the surface of the first substrate. Consequently, the direction of the electric field applied to the layer of liquid crystals coincides with the pre-tilt directions of the liquid crystals. Hence, disclination 323 is fixed to a predetermined position, i.e., on boundary 322 of the sub-pixel domains.

It was confirmed that each disclination 323 occurred at a fixed location around boundary 322 of the divided areas, that a set of disclinations 323 were fixed to predetermined positions over the entire surface, as shown in FIG. 34, that the disclinations did not enter openings for pixels, and that an excellent image quality was provided over the entire surface of the liquid crystal display cell. This was confirmed in all the cases where the three kinds of cut-away portions were formed.

Comparative Example 12

A liquid crystal display cell was manufactured which basically had the same structure as that used in Embodiment 25, except for the planar shape of each pixel electrode 371. That is, each pixel electrode 371 had no cut-away portion so that its side portion had a straight line extending along drain bus line 356. The remaining portions of the pixel electrodes were the same as those in the liquid crystal display cell of Embodiment 25.

Figure 38:
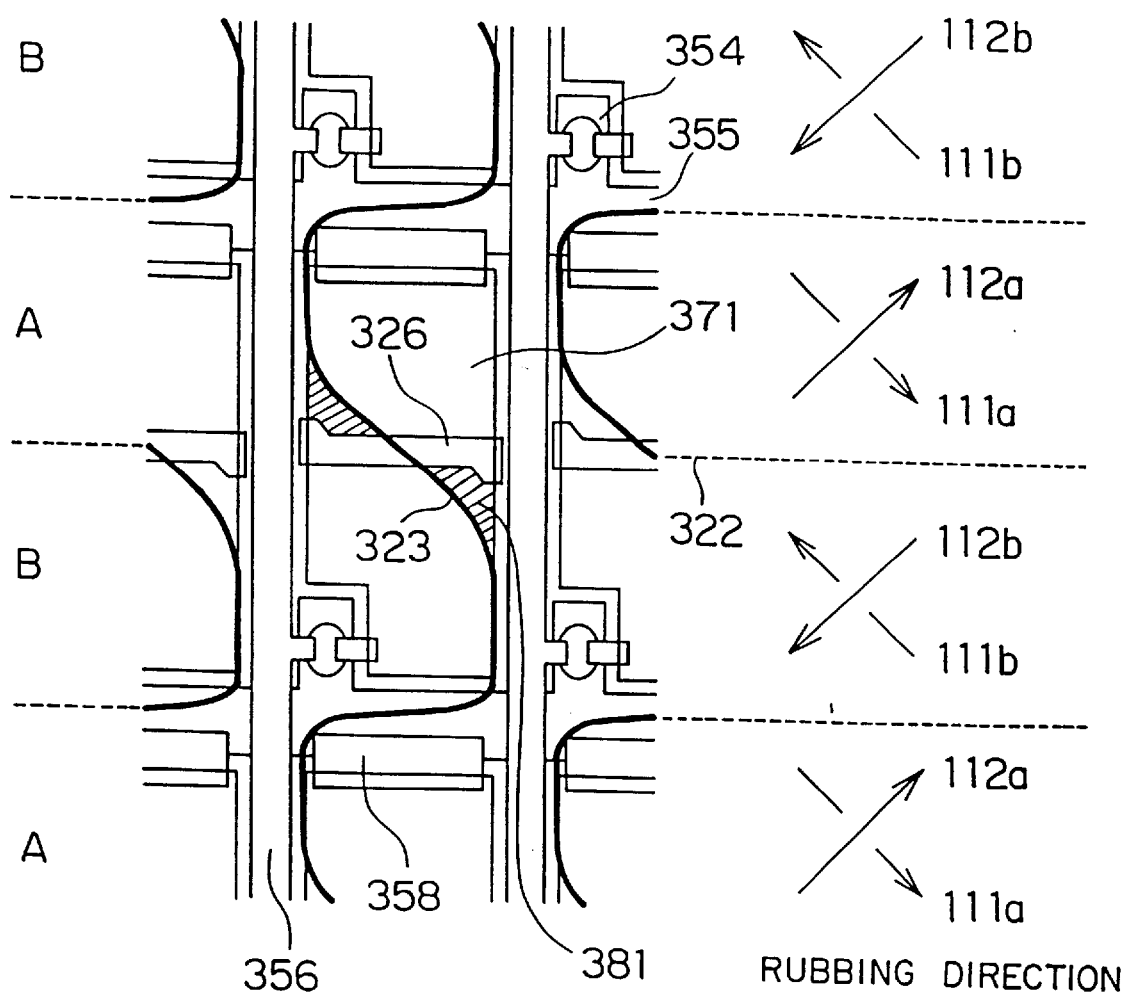
FIG. 38 is a schematic plan view showing the structure of a liquid crystal display cell according to Comparative Example 12.

In the liquid crystal display cell of the present comparative example, it was confirmed that disclination 323 sometimes occurred which deviated from boundary 322 of the divided areas so that disclination appeared outside the shield patterns 326, as shown in FIG. 38. This deteriorated the image quality. Also, reverse tilt domains 381 which were generated on pixel electrodes at this time are shown in FIG. 38. The reverse tilt domains 381 were generated at corners which were located near the intersections of the sides of pixel electrode 371, extending along drain bus lines 356 and each boundary 322, and which did not coincide with the pre-tilt directions of liquid crystal molecules in the vicinity of the surface of the first substrate 311 at both ends of each divided area. That is, the corners are located 0 the lateral side of arrows 111a and 111b (shown in FIG. 38) indicating the directions of the alignment processes for the first substrate 311.

Embodiment 26

Figure 39:
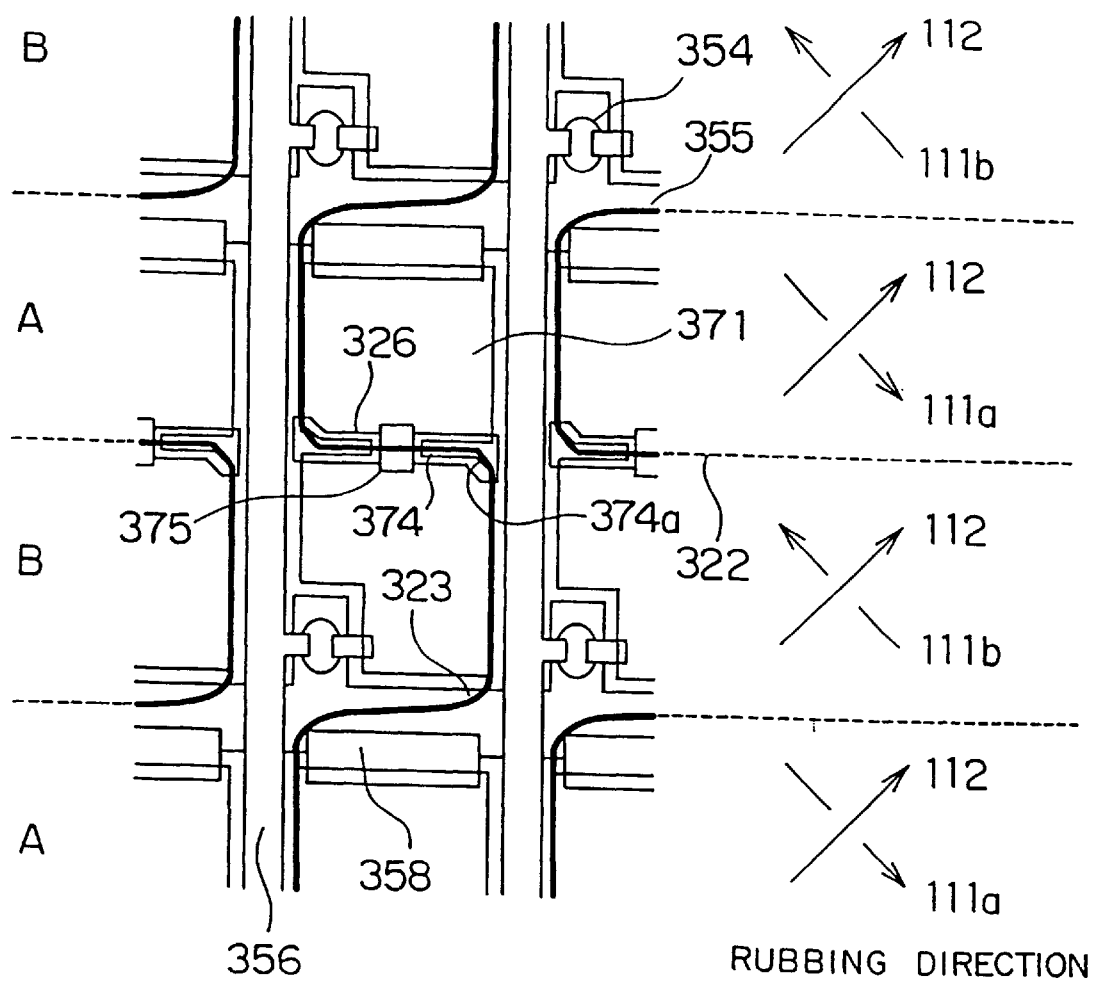
FIG. 39 is a schematic plan view showing the structure of a liquid crystal display cell according to Embodiment 26.

FIG. 39 shows the structure of a liquid crystal display cell according to the present embodiment. The construction of the liquid crystal display cell of the present embodiment is basically the same as that of Embodiment 25. However, the liquid crystal display cell of the present embodiment has a structure which is simplified by combination use of different orientation films, similarly to Embodiment 23. That is, a material providing a large pre-tilt angle is used for the orientation film 331 of the first substrate 311 on which pixel electrodes 371 are provided while a material providing a small pre-tilt angle is used for the orientation film 332 of the second substrate 312 on which the common electrodes 372 is provided, and that the second substrate 312 has undergone an alignment process in one direction only.

In FIG. 39, the directions of the rubbing treatments for the first substrate 311 are indicated by arrows 111a and 111b while the direction of the rubbing treatment for the second substrate 312 is indicated by arrow 112. Similarly to Embodiment 25, each of boundaries 322 (illustrated by chain lines) of minute areas A and B having different alignment directions is a straight line which is parallel to the gate bus lines 355 and which is alternately located at a position where it passes the central portion of pixel electrodes 371 and a position where it passes through gate bus line 355 in the longitudinal direction.

The liquid crystal display cell of the present embodiment partly differs from the liquid crystal display cell of Embodiment 25 in the planar shape of pixel electrode 371. That is, as shown in FIG. 39, the cut-away portions 374 has a strip portion formed by cutting away pixel electrode 371 from both sides thereof along a boundary of the divided areas which is located at a position where it crosses the pixel electrode 371. Further, each of the cut-away portions has a chamfer 374a formed at the corner of the pixel electrode 371 which are adjacent to the cut-away strip portion and at which reverse tilt domains tend to be generated. Such corners where reverse tilt domains tends to be generated correspond to corners which do not coincide with the directions of arrows 111a and 111b, i.e., lateral sides of the arrows 111a and 111b indicating the directions of the alignment processes for the first substrate 311 in the minute areas A and B. As shown in FIG. 39, the chamfers 374a are formed in a substantially triangular shape. Experiments were performed by selectively forming two kinds of chamfers having oblique sides of 3 μm and 6 μm, respectively.

In the liquid crystal display cell of the present embodiment, as shown in FIG. 39, chamfers 374a are formed at selected ones of the corners adjacent to the strip portions of the cut-away portion 374, to which corners disclination would deviate from boundary 322 crossing pixel electrode 371 if the structure of the liquid crystal display cell of Embodiment 25 is employed. The disclination 232 was fixed to each boundary of the divided areas in more accurate manner as compared to the liquid crystal display cell of Embodiment 25. Thus, it was confirmed that the disclinations did not enter openings for pixels, and that an excellent image quality was provided over the entire surface of the liquid crystal display cell. This was confirmed in both the cases where the two kinds of chamfers 374a were formed. Similar effects are expected even when the chamfers have an arcuate shape or the like.

Embodiment 27

Figure 40:
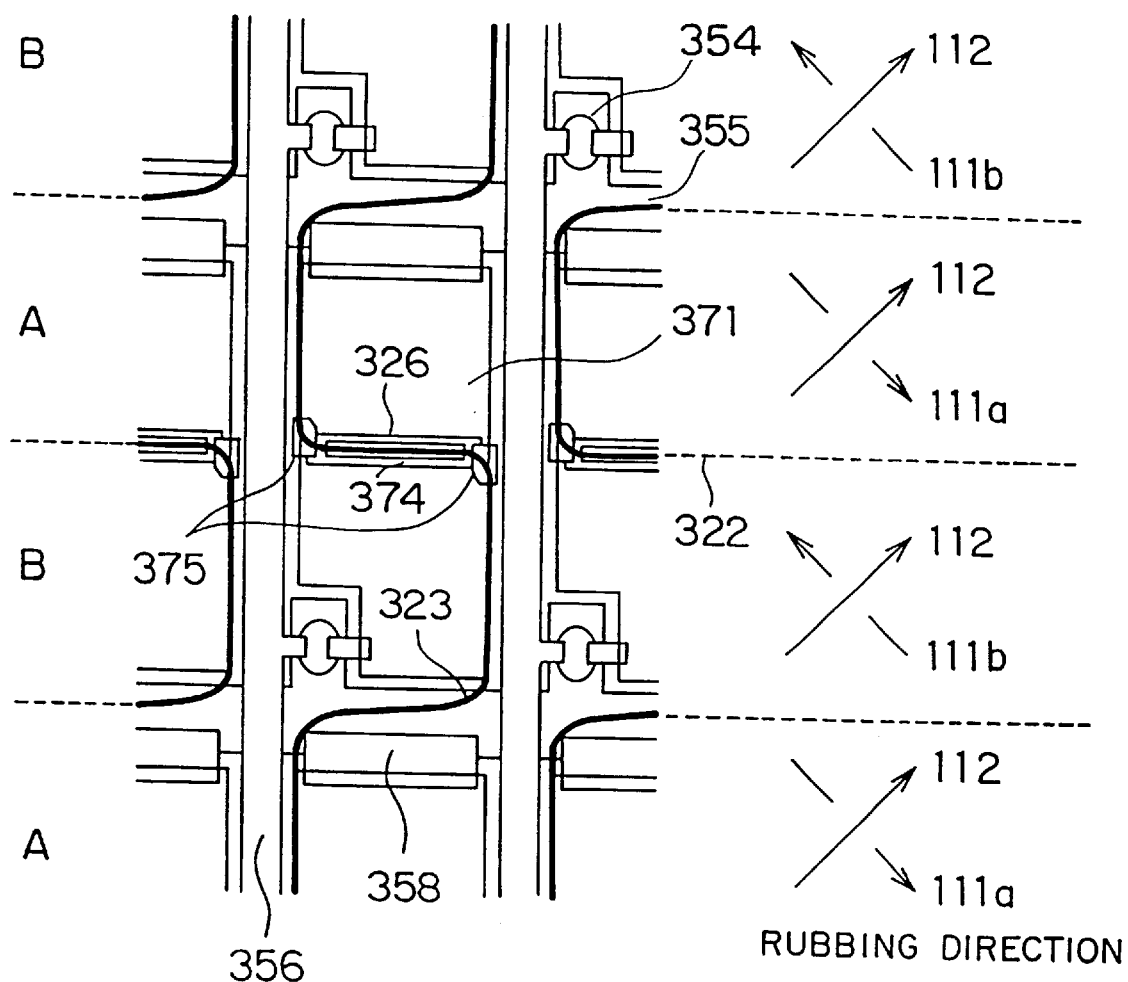
FIG. 40 is a schematic plan view showing the structure of a liquid crystal display cell according to Embodiment 27.

A liquid crystal display cell was manufactured which has the same structure as that of Embodiment 26 except for the shape of the cut-away portion 374 of each pixel electrode 371. In the present embodiment, an elongated hole is formed as a cut-away portion 374, as shown in FIG. 40, such that it extends along boundary 322 of the divided areas which is located at a position to cross pixel electrode 371. Two reinforcement terminals 375 are provided for side portions of each pixel electrode at narrowed portions formed due to the cut-away portion 374. Parts of the reinforcement terminals 375 serves as shield patterns for covering disclination areas as well as electrical connection for a pixel electrode. The remaining portions are the same as those of the liquid crystal display cell of Embodiment 26.

In the structure of present embodiment, disclination 332 generated along each boundary of the divided areas was fixed to the predetermined position, as shown in FIG. 40. Thus, it was confirmed that the disclination lines did not enter openings for pixels, and that an excellent image quality was provided over the entire surface of the liquid crystal display cell.

Embodiment 28

Figure 41:
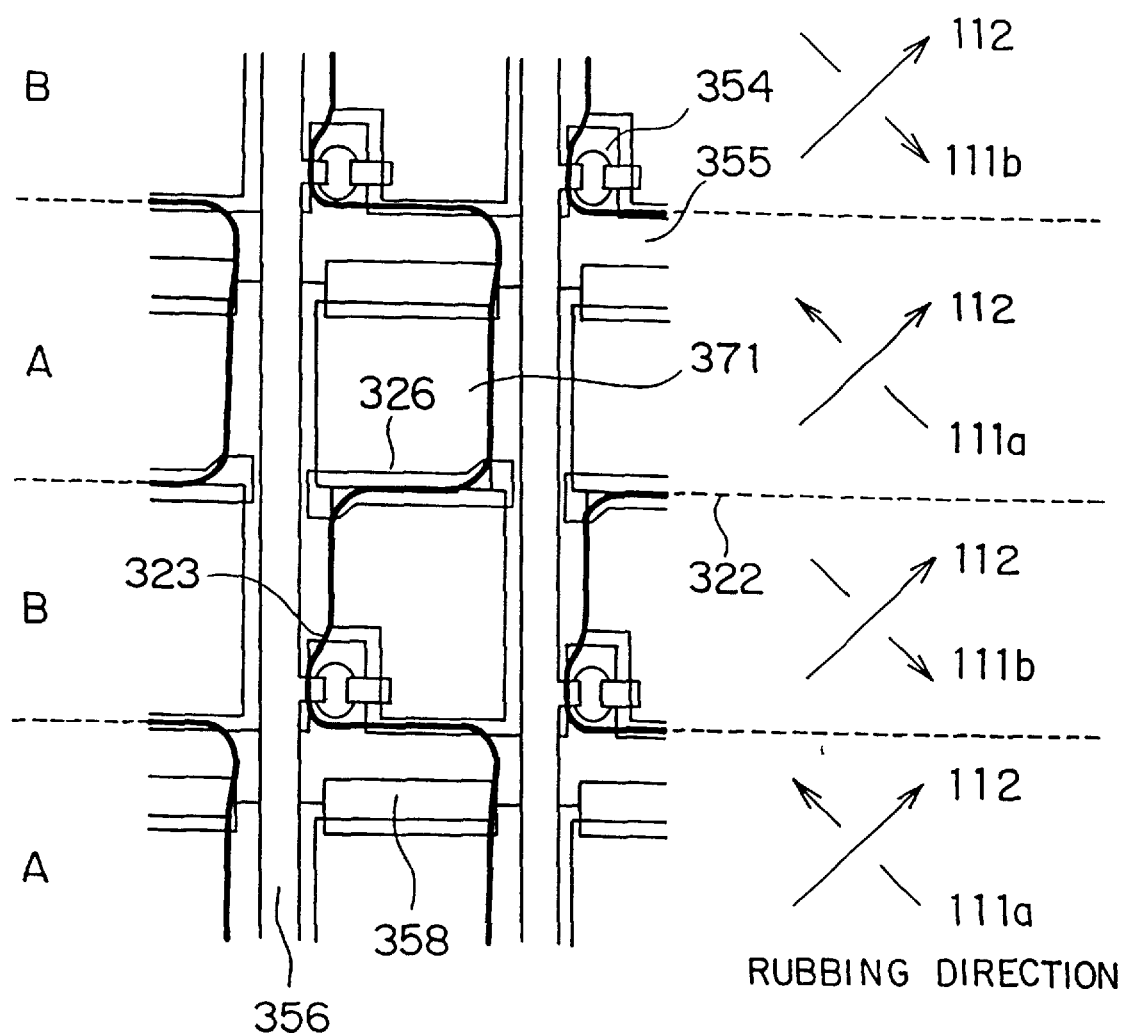
FIG. 41 is a schematic plan view showing the structure of a liquid crystal display cell according to Embodiment 28.

A liquid crystal display cell of FIG. 41 was manufactured which has the same structure as that of Embodiment 23 except for the shape of the cut-away portion 374 of each pixel electrode 371. In the present embodiment, each pixel electrode 371 is formed such that the gap between the upper half of the pixel electrode 371 and corresponding one of the drain bus lines 356 is different in size from the gap between the lower half of the pixel electrode 371 and the corresponding one of the drain bus lines 356, at both sides of each of the pixel electrodes 371. In other words, the pixel electrode has an offset at the boundary of the sub-pixel domains offsetting in a direction of the boundary such that the offset provides a large gap located at the rear side of the pre-tilted direction 111a or 111b of the liquid crystal in each of the sub-pixel domains. The remaining portions are the same as those of the liquid crystal display cell of Embodiment 23. The gap between pixel electrode 371 and drain bus line 356 has 8 μm and 5 μm in the large gap portion and small gap portion, respectively.

With the structure as described above, the large gap portions are located in the sub-pixel domains where reverse tilt domains tend to be generated. The lateral electric field generated at the large gap portions are tempered, so that disclination 323 was generated at a fixed position along the boundary of the divided areas. It was confirmed that the disclination lines did not substantially enter openings for the pixels, and that an excellent image quality was provided over the entire surface of the liquid crystal display cell.

Embodiment 29

Figure 42:
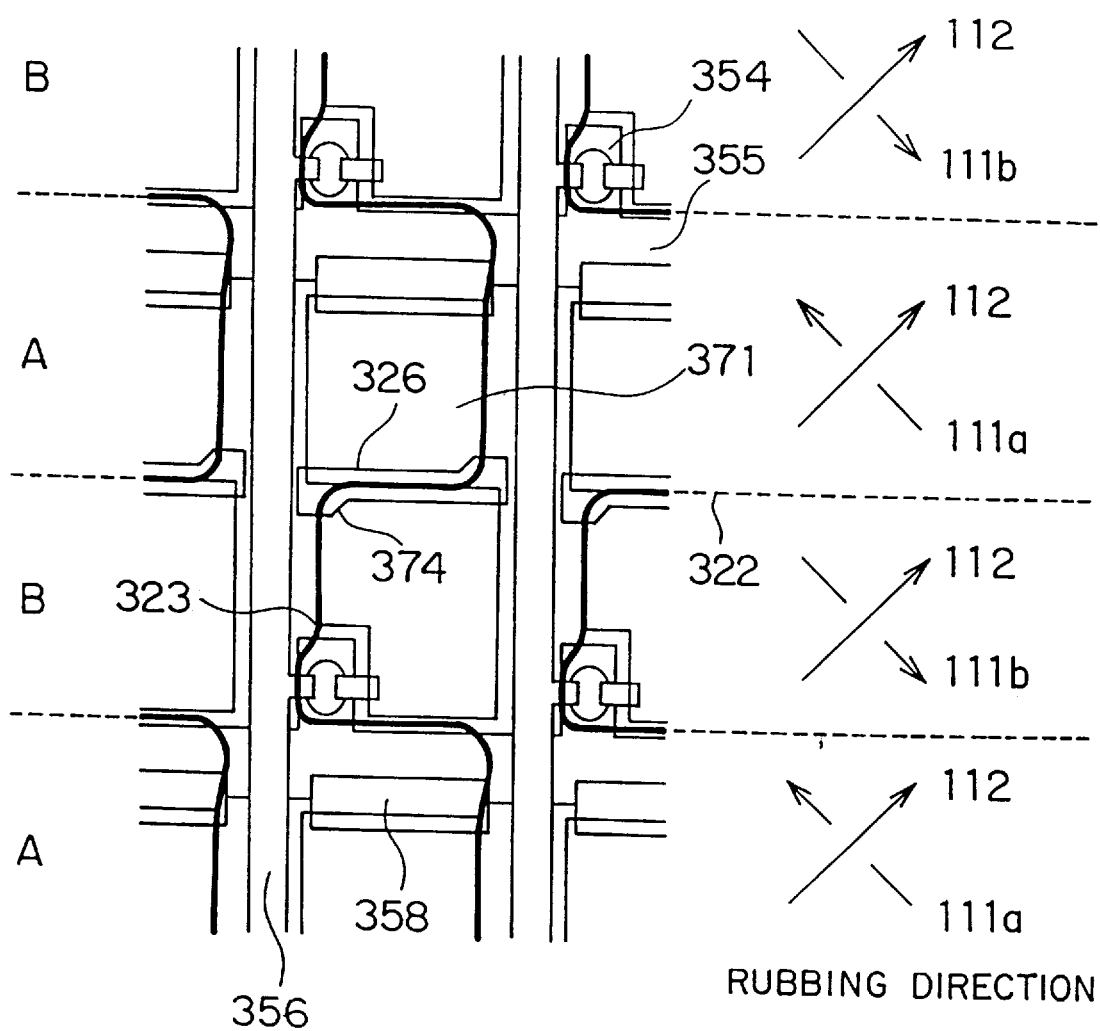
FIG. 42 is a schematic plan view showing the structure of a liquid crystal display cell according to Embodiment 29.

A liquid crystal display cell was manufactured which has the same structure as that of Embodiment 23 except for the shape of the cut-away portion 374 of each pixel electrode 371. In the present embodiment, as shown in FIG. 42, each pixel electrode has a cut-away portion 374 which is similar to that used in Embodiment 23. Also, each pixel electrode 371 is formed such that the gaps between the pixel electrode 371 include large gap portions and small gap portions similarly to that of Embodiment 28. The remaining portions are the same as those of the liquid crystal display cell of Embodiment 23. The size of each cut-away portion was determined such that the oblique side was 8 μm, and the gap between the pixel electrode and the gate bus lines is 8 μm and 5 μm in the large gap portion and the small gap portion, respectively.

In the structure of the present embodiment, the large gap portion and the cut-away portion were located where reverse tilt domains tend to be generated. The lateral electric field acting at these locations were tempered at the large gap potion and the cut-away portion, so that disclination 323 was fixed to the predetermined position along the boundary of the divided areas in more stably manner as compared to Embodiment 23. It was confirmed that the disclination lines did not enter openings for pixels, and that an excellent image quality was provided over the entire surface of the liquid crystal display cell. While in the present embodiment, the pixel electrode is offset in the direction in which the gate bus lines extend, other configuration may be employed in which the pixel electrode is offset in the direction in which the drain bus lines extend.

Embodiment 30

Figure 43:
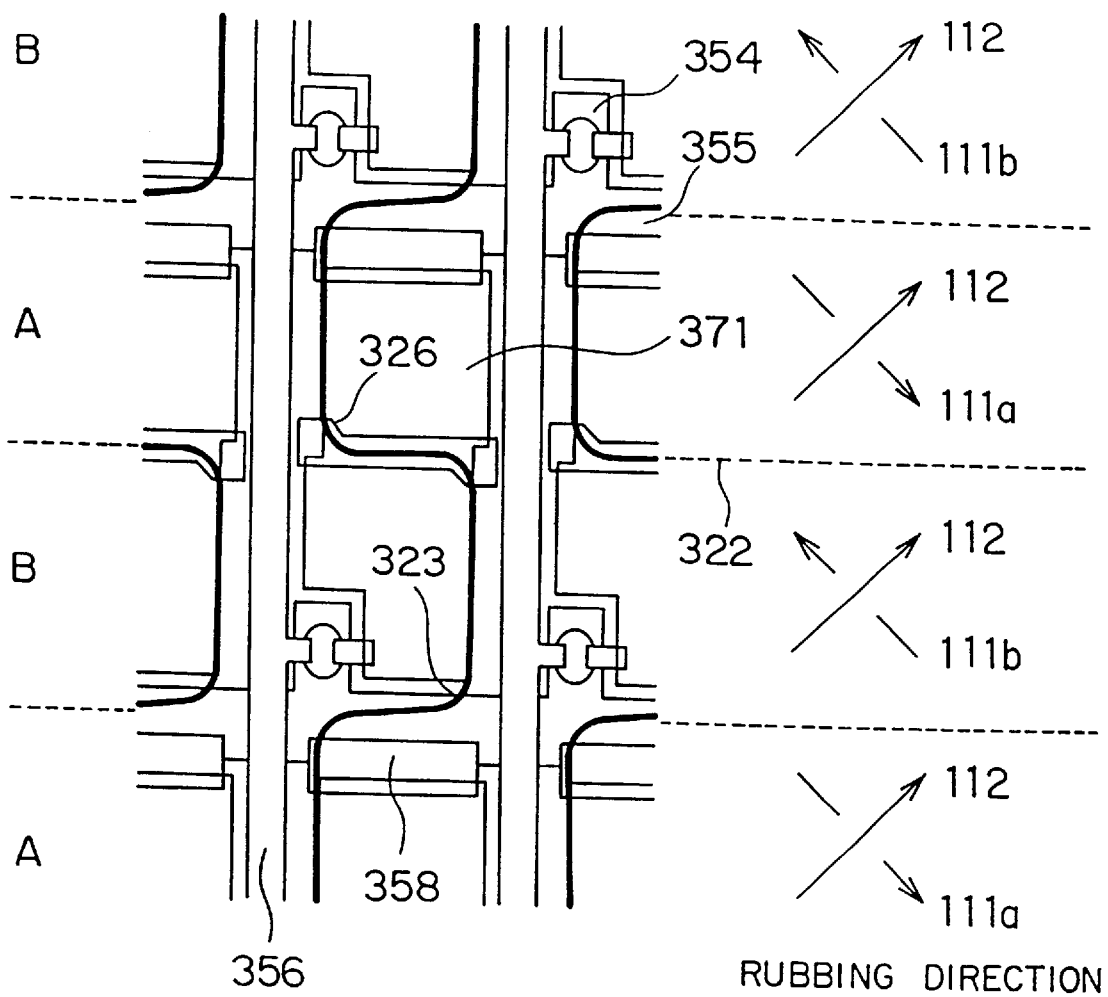
FIG. 43 is a schematic plan view showing the structure of a liquid crystal display cell according to Embodiment 30.

A liquid crystal display cell was manufactured which has the same structure as that of Embodiment 26 except for the shape of the cut-away portion 374 of each pixel electrode 371 and directions of orientation alignments. In the present embodiment, as shown in FIG. 43, the arrows 111a and 111b showing pre-tilt directions of the liquid crystal in the vicinity of the first substrate is reversed from Embodiment 26 and each pixel electrode 371 has an offset to provide different gap portions between the pixel electrode 371 and adjacent drain bus lines 356 including a large gap portion and a small gap portion which are reversed from those of Embodiment 28 in the locations where the large gap portions and the small gap portions are located with respect to the pixel electrodes 371. In other words, the large gap portion is located at the rear sides of the arrows 111a and 111b indicating the orientation alignments for the first substrate. The remaining portions are the same as those of the liquid crystal display cell of Embodiment 26. The gap between pixel electrode 371 and drain bus line 356 was 8 μm and 5 μm in the large gap portion and the small gap portion, respectively.

With the structure as described above, the large gap portions are located where reverse tilt domains tend to be generated. The lateral electric field acting at these locations are tempered due to the large gap portion, so that disclination 323 was generated at a fixed position along the boundary of the divided areas in more stable manner. It was confirmed that the disclination lines did not enter openings for pixels, and that an excellent image quality was provided over the entire surface of the liquid crystal display cell.

Embodiment 31

Figure 44:
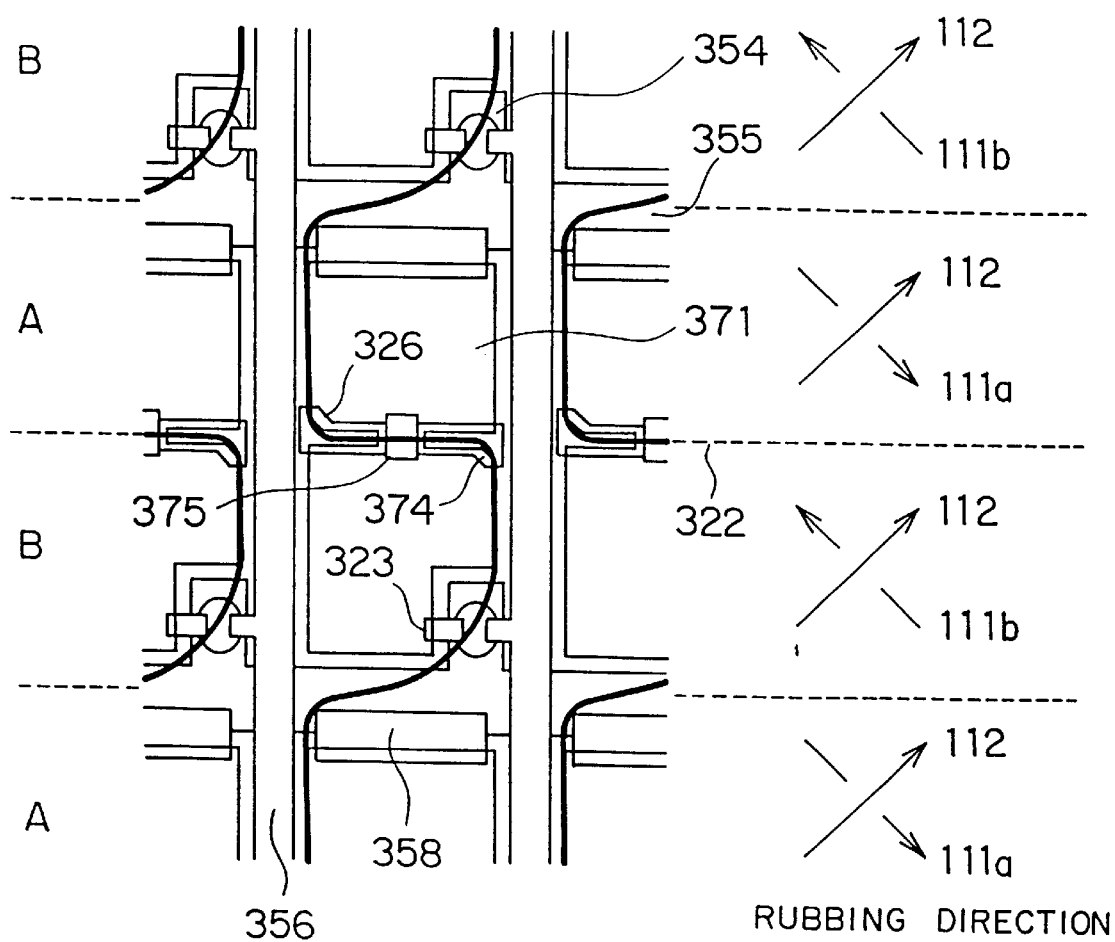
FIG. 44 is a schematic plan view showing the structure of a liquid crystal display cell according to Embodiment 31.

FIG. 44 shows a liquid crystal display cell according to the present embodiment. The construction of the liquid crystal cell of FIG. 44 is the same as that of Embodiment 26 except for the arrangement of the TFT array with respect to the pixel electrode. TFT active elements 354 are located adjacent to one of the sides of the corresponding pixel electrodes 371, the one of the sides being located at the rear sides of the arrows 111b indicating the orientation of the liquid crystal in the vicinity of the first substrate and in the the sub-pixel domains B adjacent to the TFT active element 354.

Figure 45:
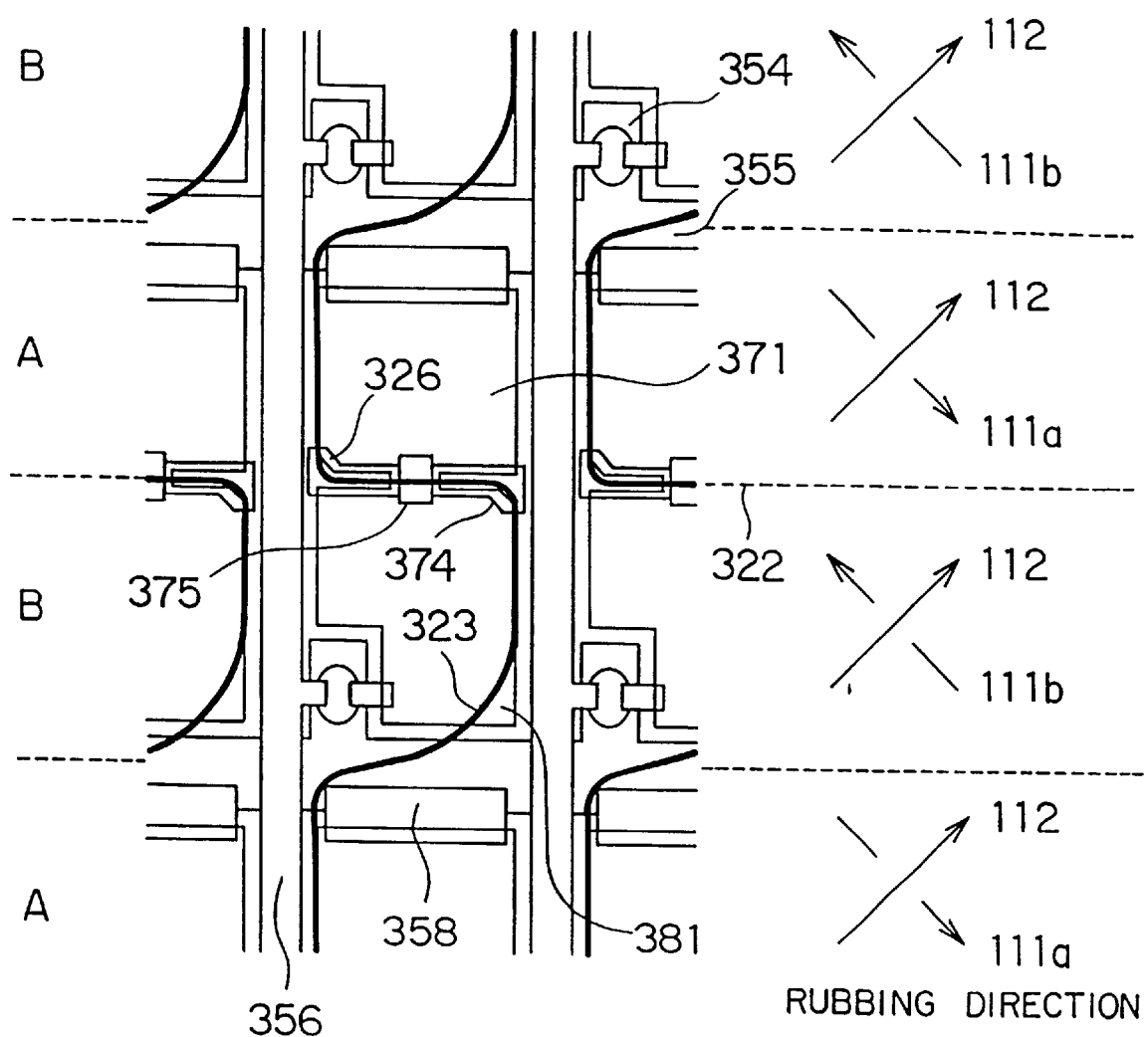
FIG. 45 is a schematic plan view showing the function of a liquid crystal display cell of Embodiment 31.

With the arrangement as described above, suppose that Embodiment 31 has a structure such that the TFT active elements 354 are differently located at the location where reverse tilt domains are generated, such as shown in FIG. 45. In this example, the reverse tilt domains frequently occur at the corners of the pixel electrodes at the rear sides of the pre-tilt directions in the vicinity of the first substrate. In the present embodiment, however, the reverse tilt domains can be shielded by employing shield patterns (not shown in the drawing) provided on the second substrate correspondingly to the locations of the TFT active elements 40. Accordingly, an excellent image quality can be obtained in the liquid crystal cell of the present embodiment.

Embodiment 32

Figure 46:
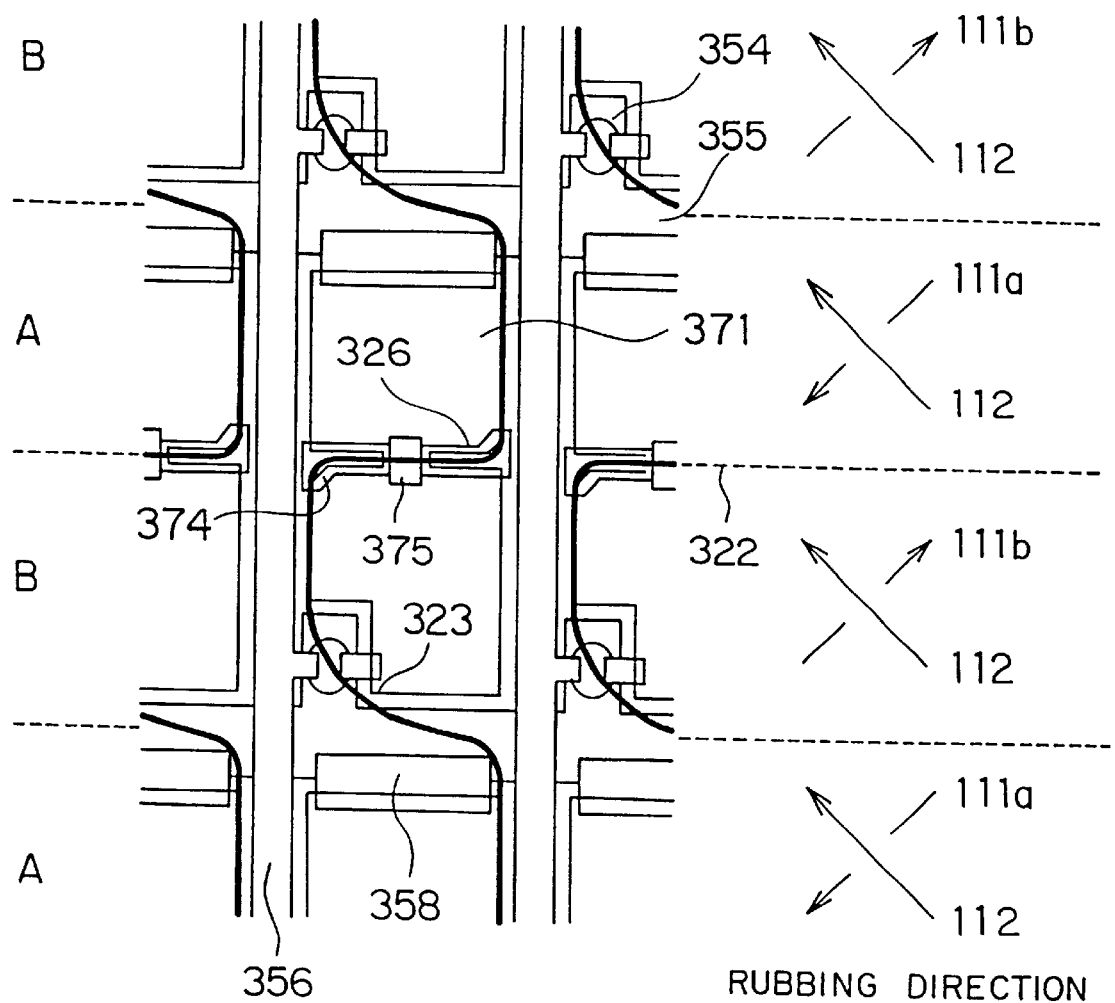
FIG. 46 is a schematic plan view showing the structure of a liquid crystal display cell according to Embodiment 32.

FIG. 46 shows a liquid crystal cell according to the present invention. The structure of the liquid crystal cell of FIG. 46 is the same as that of Embodiment 26 except for the directions of the orientation alignment for both the first and the second substrates and direction of the rotation or twist of the liquid crystal. The first substrate has been subjected to orientation alignment in directions 111a and 111b in the sub-pixel domain A and sub-pixel domain B, respectively. The second substrate has been subjected to an orientation alignment 112 in one direction in both the sub-pixel domains A and B. The liquid crystal is added by a minute amount of a right-hand chiral agent for clockwise rotation of the liquid crystal, so that the liquid crystal rotates in a clockwise direction by about 90° from the surface of the front, second substrate toward the surface of the rear, first substrate due to the function of the chiral agent and the orientation alignments performed to the substrates. Moreover, the configurations of the cutaway 374 of the pixel electrodes 371 and the shield pattern 326 are reversed from those of Embodiment 26.

With the present embodiment, the active elements 354 are arranged at the locations where the reverse tilt domains tend to occur. Accordingly, the reverse tilt domains can be shielded by a shield pattern formed on the second substrate correspondingly to the locations of the active elements 354, as is the case with Embodiment 31.

As described above, in the third aspect of the present invention, each pixel electrode has a cut-away portion or offset formed in alignment with the boundary of the sub-pixel domains which crosses the pixel electrode. Accordingly, lateral electric field can be tempered which would otherwise affect the direction in which liquid crystal molecules on each pixel electrode are oriented upon the application of a voltage. Alternatively, such lateral electric field can be utilized so as to accurately fix disclination to a predetermined position, thereby allowing liquid crystals in divided areas to be stably aligned. As a result of the configuration, disclinations scarcely enter openings for pixels, so that an excellent image quality can be provided over the entire surface of the liquid crystal display cell.

Since the disclinations are accurately fixed to predetermined positions, the areas of shield patterns covering the disclination areas can be made smaller, thereby reducing the decrease in the opening for each pixel due to the shield patterns. This makes it possible to provide a liquid crystal display cell which is bright and improves properties for providing a wider viewing angle. Also, those excellent effects can be obtained simply by modifying the shape of each pixel electrode without adding a new step to the manufacturing process.

Even when shield patterns for covering disclination lines and/or cut-away portions of each pixel electrode, and reinforcement terminals for reinforcement of pixel electrodes are formed, these can be formed by using an existing conducive thin film technology. Since it is unnecessary to add a new step to the manufacturing process, the liquid crystal display cell according to the third aspect of the present invention is preferable in terms of costs and yield.

Before describing embodiments of the fourth aspect of the present invention, construction of a conventional liquid crystal display cell and disadvantages thereof in connection with the fourth aspect will be described for the sake of understanding of the fourth aspect.

Figure 47:
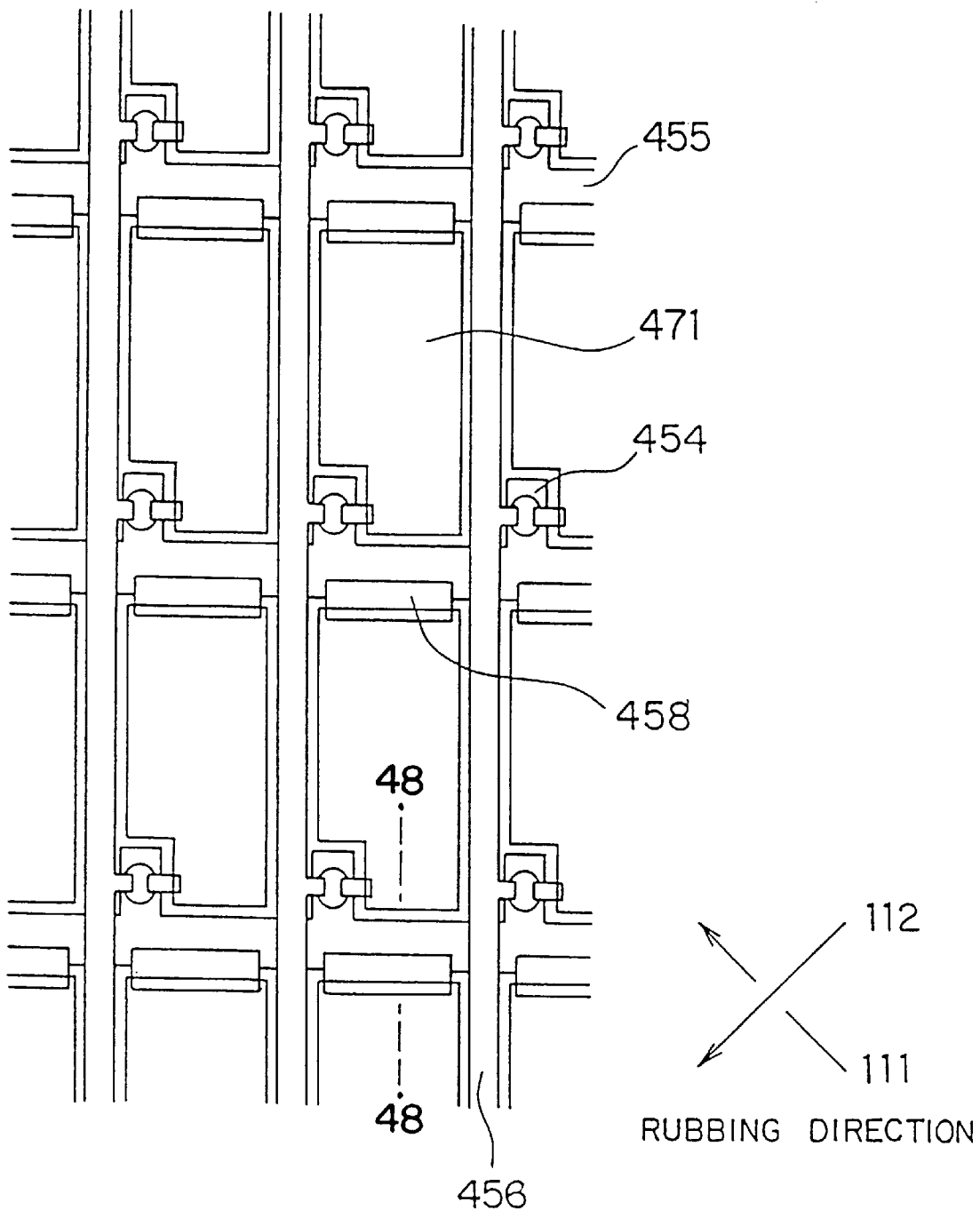
FIG. 47 is a plan view showing the structure of a conventional liquid crystal display cell and of a third aspect of the present invention.
Figure 48:
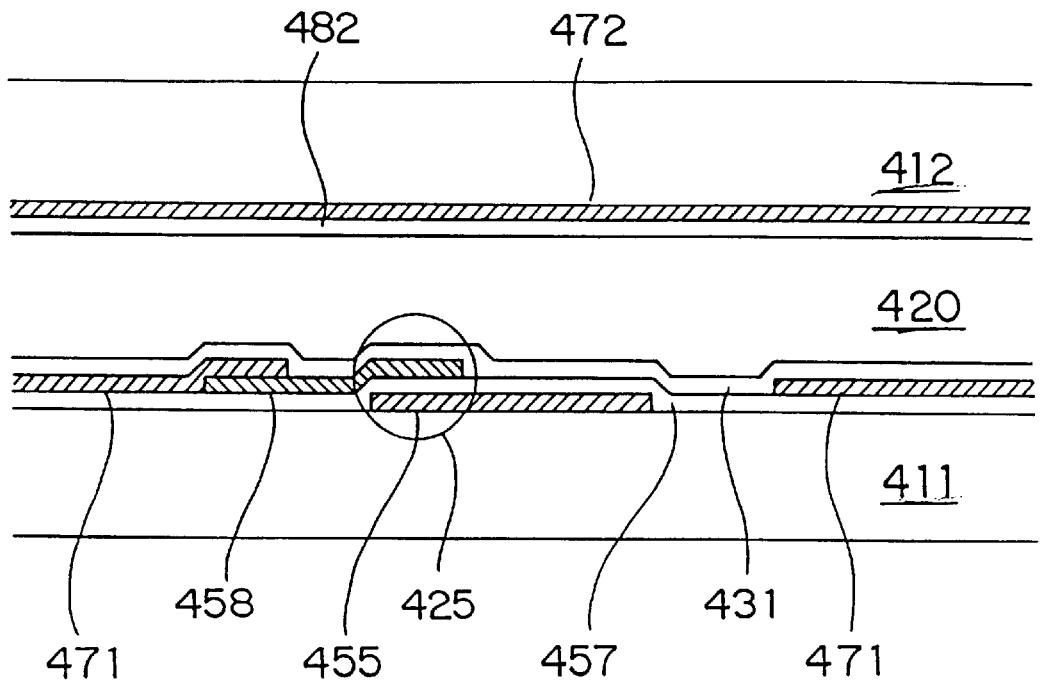
FIG. 48 is a sectional view of the liquid crystal display cell shown in FIG. 47.

FIG. 47 is a schematic plan view showing the structure of a conventional liquid crystal display cell, and FIG. 48 is a sectional view taken along line 48—48 in FIG. 47 and showing the structure in the vicinity of a gate bus line 455 and a storage capacitor terminal 458 of the liquid crystal display cell of FIG. 47. The liquid crystal display cell has a structure in which a first substrate 411 and a second substrate 412 are adhered to each other, and a liquid crystal 420 is disposed therebetween. Unillustrated polarizing plates are disposed on the outer surfaces of the substrates 411 and 412. FIG. 47 is depicted such that the first substrate 411 is located on the rear side of the second substrate 412 in the direction perpendicular to the sheet surface.

On the first substrate 411, a plurality of parallel gate bus lines 455 extending in the horizontal direction as viewed in FIG. 47, and a plurality of parallel drain lines 456 extending in the vertical direction as viewed in FIG. 47 are provided to form a grid or grating, with an insulator film disposed therebetween. A pixel electrode 471 is provided in each unit area surrounded by adjacent gate bus lines 455 and adjacent drain bus lines 456. Each pixel electrode 471 corresponds to one picture element or pixel for display. An active element 454 is provided for each pixel electrode 471. The active element 454 is a switching element for selecting a corresponding pixel element 471 to apply a voltage thereto. Typically, a thin-film transistor (TFT) made of amorphous silicon (a—Si) or polycrystalline silicon (p—Si) is used for the active element 454. Each active element 454 has a gate electrode connected to corresponding one of the gate bus line 455, a drain electrode connected to corresponding one of the drain bus line 456, and a source electrode connected to corresponding one of the pixel electrode 471.

In FIG. 48, a storage capacitor terminal 458 is provided for each pixel electrode 471 and is connected thereto. A portion of the storage capacitor terminal 458 extends over an adjacent gate bus line 455, with an insulation layer 457 interposed therebetween. Active element 454 for driving an adjacent pixel electrode 471 is connected to adjacent one of gate bus lines 455. With this arrangement, a storage capacitor section 425 is implemented by the storage capacitor terminal 458 and a portion of the gate bus line 455 in each of pixels as shown in a circle of FIG. 48. An orientation film 431 is formed as overlying the first substrate 411 and contacts the liquid crystal 420.

On the second substrate 412, a common electrode 472 and an orientation film 432 are consecutively formed so that the orientation film 432 contacts the liquid crystal 420. The common electrode 472 is implemented as a thin film made of a transparent conductive material such as indium tin oxide (ITO). Also, unillustrated red, green, and blue filters are provided on the second substrate 412 for covering corresponding pixel electrodes 471. This structure allows the liquid crystal display cell to effect color display. Moreover, an unillustrated shield film is provided on the second substrate 412 to cover areas other than the areas corresponding to the pixel electrodes 471 to form an opening for each pixel area.

In the conventional crystal display cell, the first substrate 411 has been subjected to an alignment process in the first direction indicated by an arrow 111 in FIG. 47, while the second substrate 412 has been subjected to an alignment process in the second direction indicated by an arrow 112 and extending substantially perpendicular to the first direction.

In the liquid crystal 420, a minute amount of a left-hand chiral agent is added to provide counter-clockwise rotation for the major axes of the liquid crystal molecules. Liquid crystal molecules are twisted counterclockwise by about 90° along an optical path from the inner surface of the second substrate 412 toward the inner surface of the first substrate 411 due to the effect of the chiral agent and to the orientation alignment performed to the orientation films of the substrates. Also, liquid crystal molecules disposed in the vicinity of the inner surfaces of the orientation film 431 and 432 are pre-tilted along the arrows 111 and 112 indicating the orirentations in accordance with the orientation alignment performed to the orientation film 431 and 432.

Figure 49:
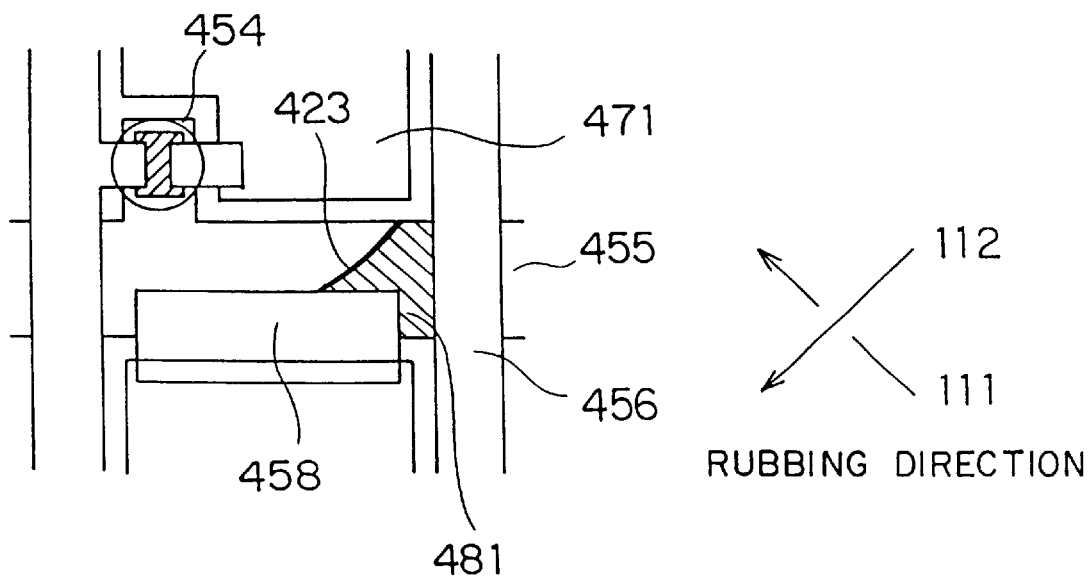
FIGS. 49 and 50 are views showing the problems of the conventional liquid crystal display cell in connection with the third aspect of the present invention.
Figure 50:
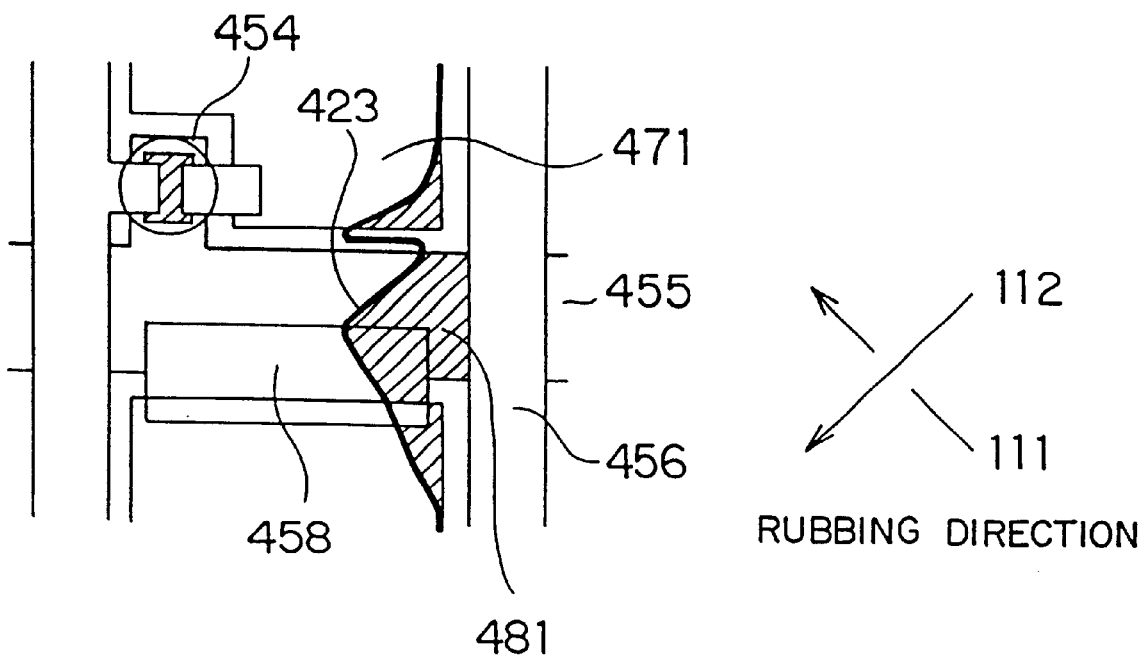

FIG. 49 is an enlarged view of the liquid crystal display cell. This figure shows a reverse tilt domain generated on one of the gate bus lines 455 when no voltage was applied to the pixel electrodes 471. In this situation as exemplified in FIG. 49, disclination 423 has been fixedly generated at a boundary between the reverse tilt domain 481 and a normal area on the gate bus line 455. The disclination 423 along with the reverse tilt domain is drawn to the central portion of the pixel electrode by the potential of the storage capacitor terminal 458, as depicted in FIG. 50. As a result, a defective stable condition has been established in which a large reverse tilt domain is formed in the area of the gate bus line 455. When a voltage is applied to the pixel electrode 471, disclination defect appears in the pixel area due to the reverse tilt domain 481 on the gate bus line 455, deteriorating an image quality on the liquid crystal display cell.

In general, a planar shape of storage capacitor sections 425 causes formation of a reverse tilt domains 481 in the area of gate bus lines 455, which in turn generates disclination failure in the pixel areas during operation of the liquid crystal display cell. In the conventional structure, each storage capacitor section 425 is formed by extending one of the edges of each pixel electrode 471 such that the capacitor terminal opposes to a gate bus line 455. In such a structure, reverse tilt domains 481 are formed during operation, and disclination 423 is fixed to the capacitor electrode 458 such that the disclination line is drawn by the storage capacitor terminal 458 to the central portion of the pixel electrode as viewed in the direction of in which the gate bus lines extend.

Even in the structure described on page 594 of "SID 94 Digest" published in the U.S.A., in which each storage capacitor terminal 458 has a small width center portion, reverse tilt domains are often formed as large domains, causing appearance of disclination failure in the pixel areas. Also, even in the liquid crystal display cell disclosed in Publication No. JP-A-88-106624, in which liquid crystals in minute areas are aligned to exhibit different orientations to enlarge the viewing angle of she display cell, the orientations of liquid crystals in the pixel areas tend to be disturbed due to the affection by reverse tilt domains on the gate bus lines.

Publication No. JP-A-92-289823 describes an improved liquid crystal display cell in which the pre-tilt angle of liquid crystal in the area of bus lines is larger than the pre-tilt angle of liquid crystal in the pixel areas so as to avoid formation of reverse tilt domains around bus lines, which would otherwise disturb the orientations of liquid crystals in the pixels. Although this configuration can prevent formation of reverse tilt domains in the vicinity of the bus lines without affecting the viewing angles of the pixel sections, it is not preferable from the viewpoint of costs and yield of the liquid crystal display cell, because the steps for forming orientation films and alignment step in a manufacturing process are complicated.

As described above, in the case where reverse tilt domains are formed on gate bus lines and therefore disclination lines are fixedly drawn to the central area by the peripheral portions of the storage capacitor terminals, reverse tilt domains are also generated in the pixel sections. The conventional liquid crystal display cell therefore has the problem of deterioration of the image quality, such as variation in brightness and reduced contrast. Accordingly, liquid crystal display cells are preferable in which no reverse tilt domain is formed. Moreover, it is preferable that such a structure be obtained without increasing the complexity of the manufacturing process. Now, embodiment of the third aspect of the present invention will be described below.

Embodiment 33

Figure 51A:
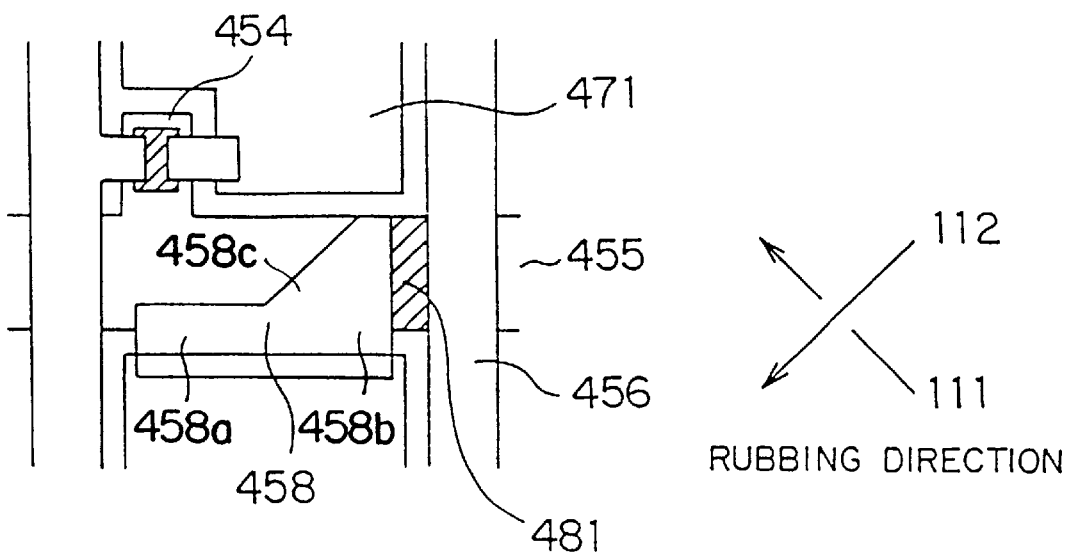
FIGS. 51A–54B are views showing various configurations of a storage capacitor terminal of a liquid crystal display cell according to Embodiment 33.
Figure 51B:
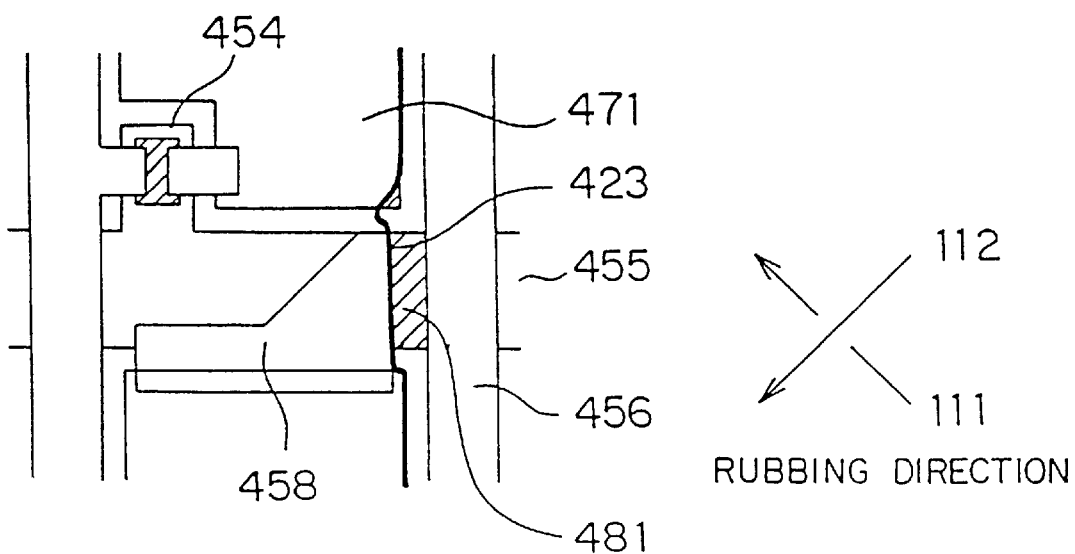

FIGS. 51A, 51B., 52A, 52B, 53A, 54A and 54B are partial plan views showing various configurations and functions of storage capacitor terminals for use in liquid crystal display cells according to the present embodiment. The overall structures of the liquid crystal display cells are similar to those of the conventional liquid crystal display cell as shown in FIG. 47 except for the configurations of storage capacitor terminals 458.

Figure 52A:
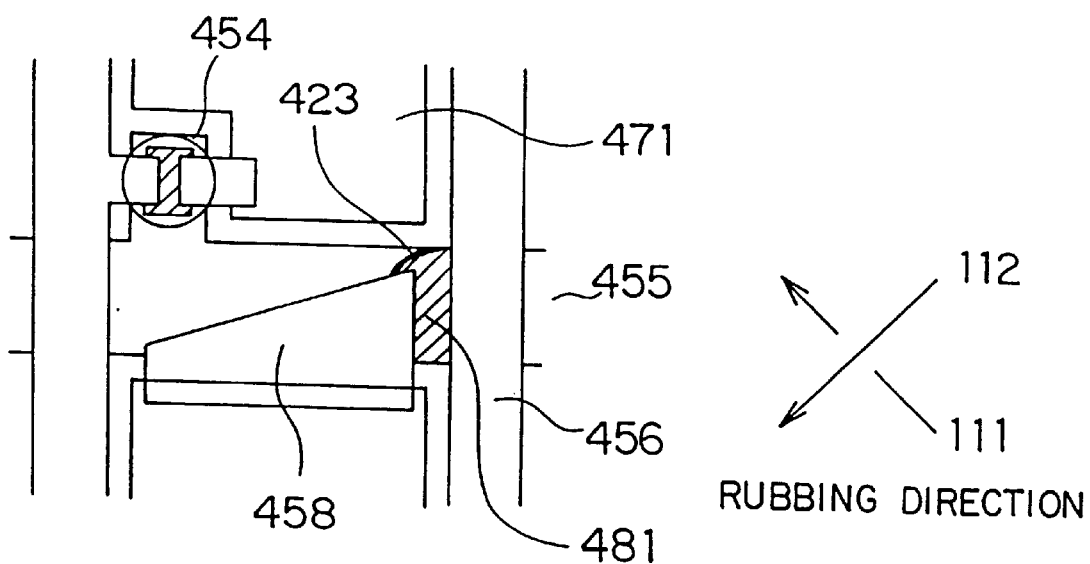
Figure 52B:
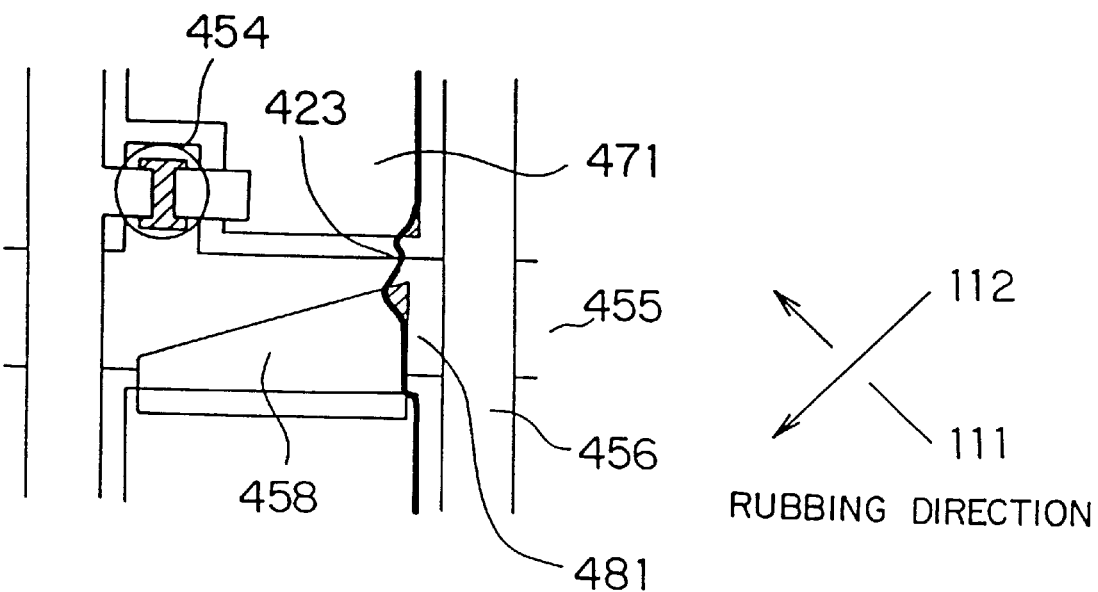
Figure 53A:
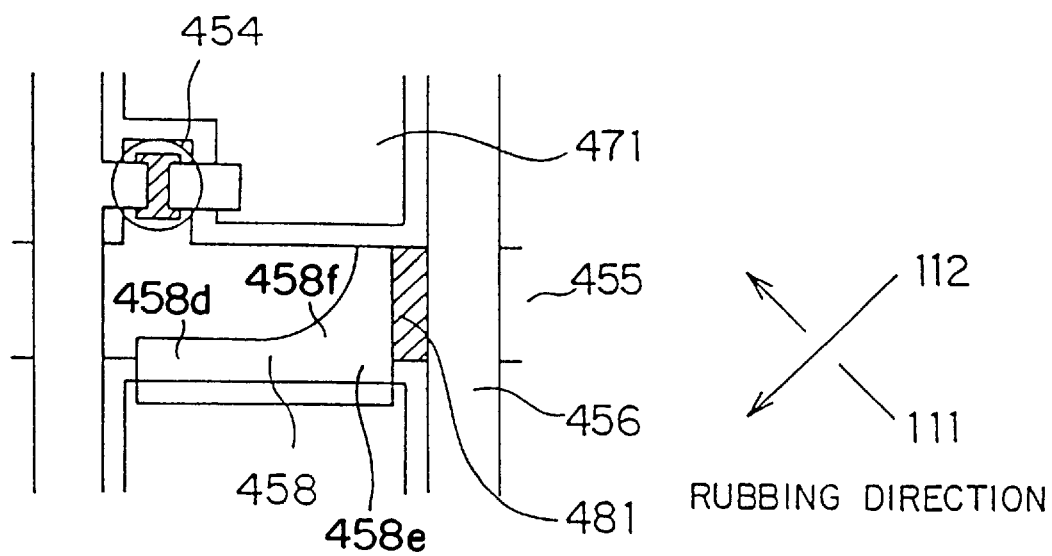
Figure 53B:
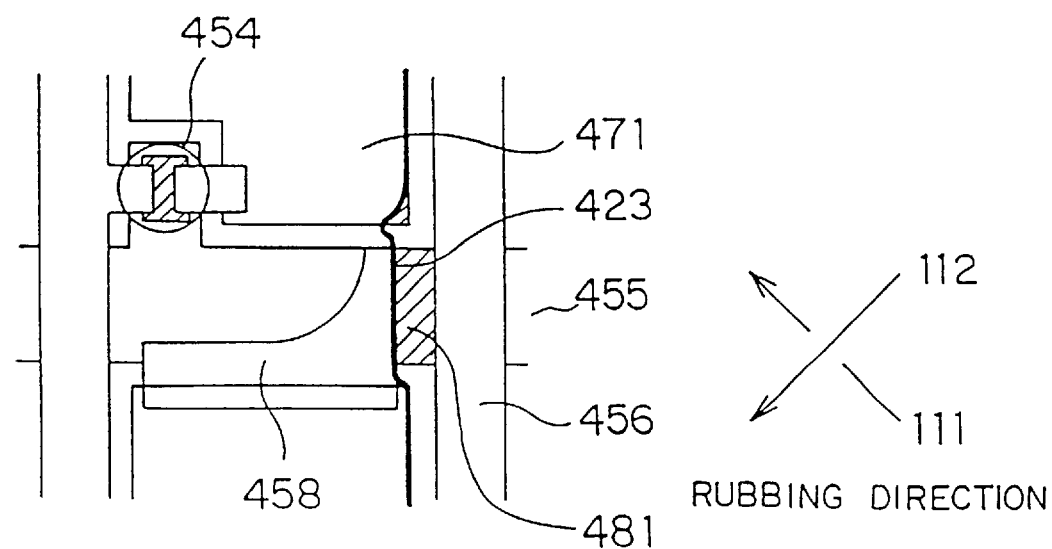
Figure 54A:
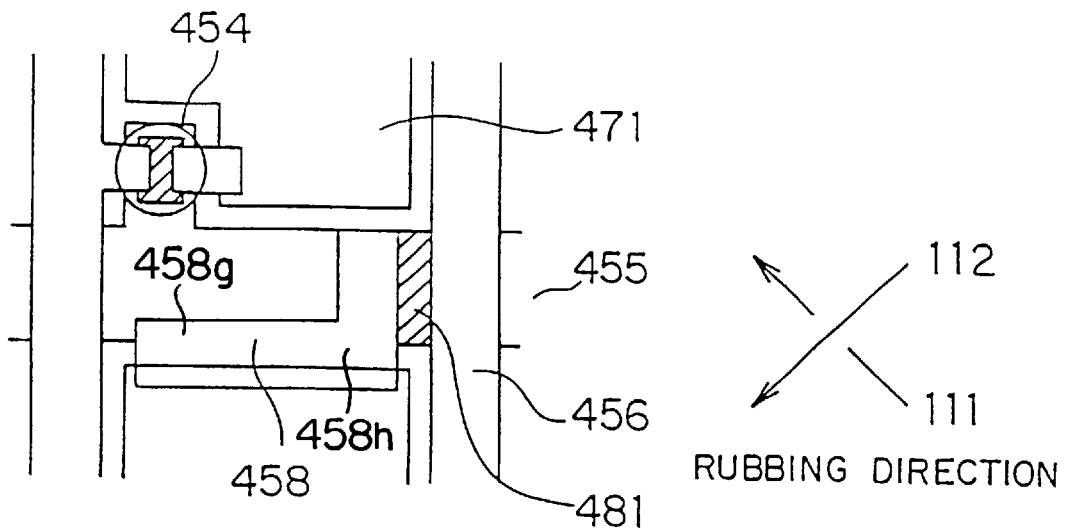
Figure 54B:
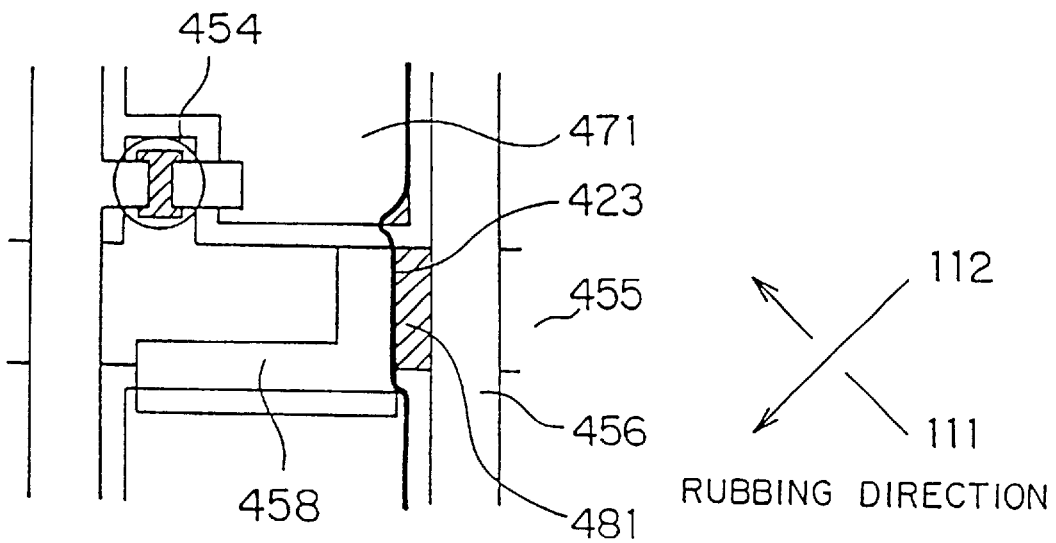

In FIG. 51A, storage capacitor terminal 458 has a rectangular small width portion 458a and a rectangular large width portion 458b and a taper portion 458c connecting both the small width portion 458a and the large width portion 458b. In FIG. 52A, the storage capacitor terminal 458 is of a trapezoid having a diagonal side opposing to the gate bus line 455. In FIG. 53A, the storage capacitor terminal 458 has a rectangular small width portion 458d and a rectangular large width portion 458e and an arcuate taper portion 458f connecting both the small width portion 458d and the large width portion 458e. In FIG. 54A, the storage capacitor terminal 458 has a small width portion 458g and a large width portion 458h connected in a shape of a character "L". Each of the large width portions in FIGS. 51A, 52A, 53A and 54A has an edge flush with the edge of the gate bus lines 455 opposing to the capacitor terminals, the edge of the gate bus lines being located at the far side of the gate bus line with respect to the pixel electrode 471. With this configuration the storage capacitor electrode 458 has an edge portion opposing the gate bus line such that a first angle between the edge portion and the orientation 111 of the liquid crystal in the vicinity of the first substrate 411 is larger than a second angle between the edge of the gate bus line 455 and the orientation 111 of the liquid crystal in the vicinity of the first substrate 411.

Each of FIGS. 51A, 52A, 53A and 54A shows a reverse tilt domain 481 generated on the gate bus line when no voltage was applied to a pixel electrode, while each of FIGS. 51B, 52B, 53B and 54B shows, additionally to each of the configurations shown in FIGS. 51A, 52A, 53A and 54A, a disclination line appearing during operation of the display cell. The directions of the rubbing process are the same as those of the conventional cell shown in FIG. 47.

As shown in FIGS. 51A, 52A, 53A and 54A, reverse tilt domain 481 was observed only in a small part of the area on a gate bus line 455, extending along a drain bus line 456. As a result, as shown in FIGS. 51B, 52B, 53B and 54B, even when a voltage was applied to the pixel, disclination was generated only along the edge of the pixel, and reverse tilt domain 481 was scarcely observed in the area of the pixel electrode. Thus, it was confirmed that an excellent image quality can be obtained over the entire surface of the liquid crystal display cell.

Embodiment 34

Figure 55A:
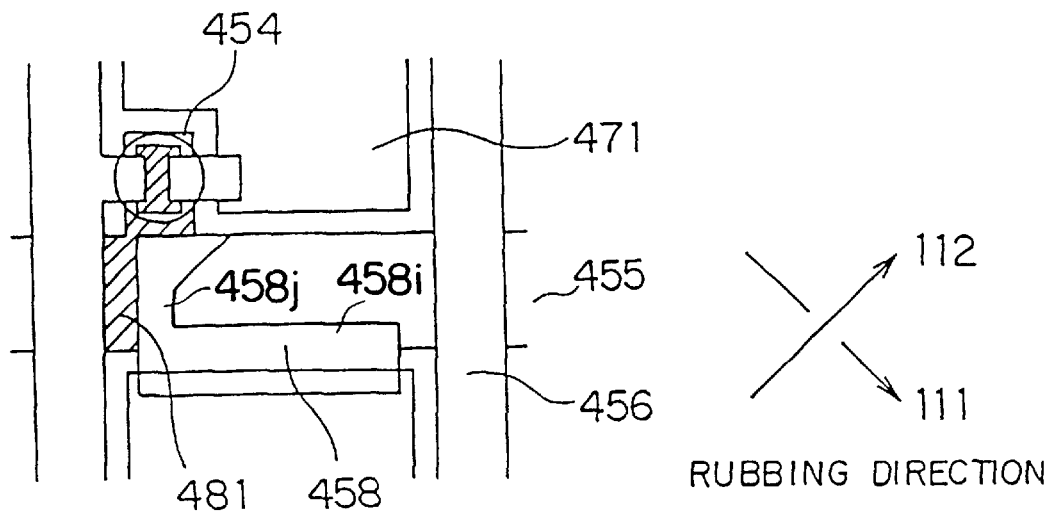
FIGS. 55A and 55B are views showing a configuration of a storage capacitor terminal of a liquid crystal display cell according to Embodiment 34.

FIG. 55A is a partial plan view showing a storage capacitor terminal of a liquid crystal display cell according to the present embodiment, while FIG. 551B shows the configuration of the storage capacitor of FIG. 55A during operation thereof. In the present embodiment, both of the direction 111 of the alignment process for the first substrate or TFT substrate 411 and the direction 112 of the alignment process for the second substrate or color filter substrate 412 are opposite to those in the conventional liquid crystal display cell or Embodiment 33 as shown in FIG. 47. The overall configuration of the liquid crystal display cell is similar to that of the conventional liquid crystal display cell except for the directions of the alignment processes and the configuration of the storage capacitor terminal 458. The capacitor terminal 458 has small width rectangular portion 458$i$, a large width portion 458$j$ having an edge which is substantially flush with one of the edges of the gate bus line 455 far from the pixel electrode and longer than the width of the other portion.

Figure 55B:
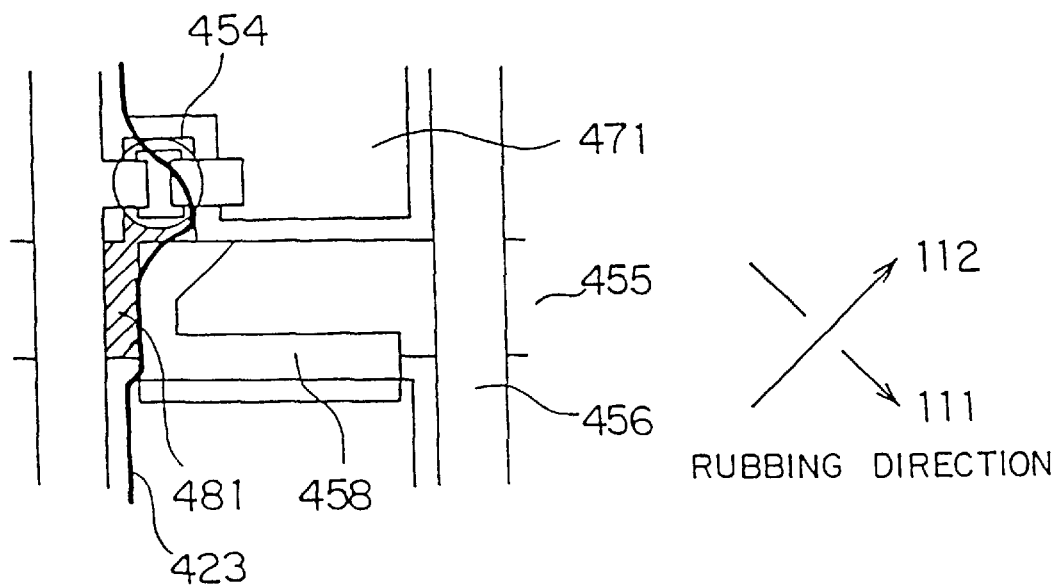

FIGS. 55A and 55B show generation of a reverse tilt domain 481 at the time when no voltage was applied to a pixel electrode and disclination lines 423 at the time when a voltage was applied to the pixel electrode, respectively. As shown in FIGS. 55A and 55B, no reverse tilt domain was generated on the pixel electrode. Thus, it was confirmed that an excellent image quality can be uniformly obtained over the entire surface of the liquid crystal display cell of the present embodiment.

Embodiment 35

Figure 56:
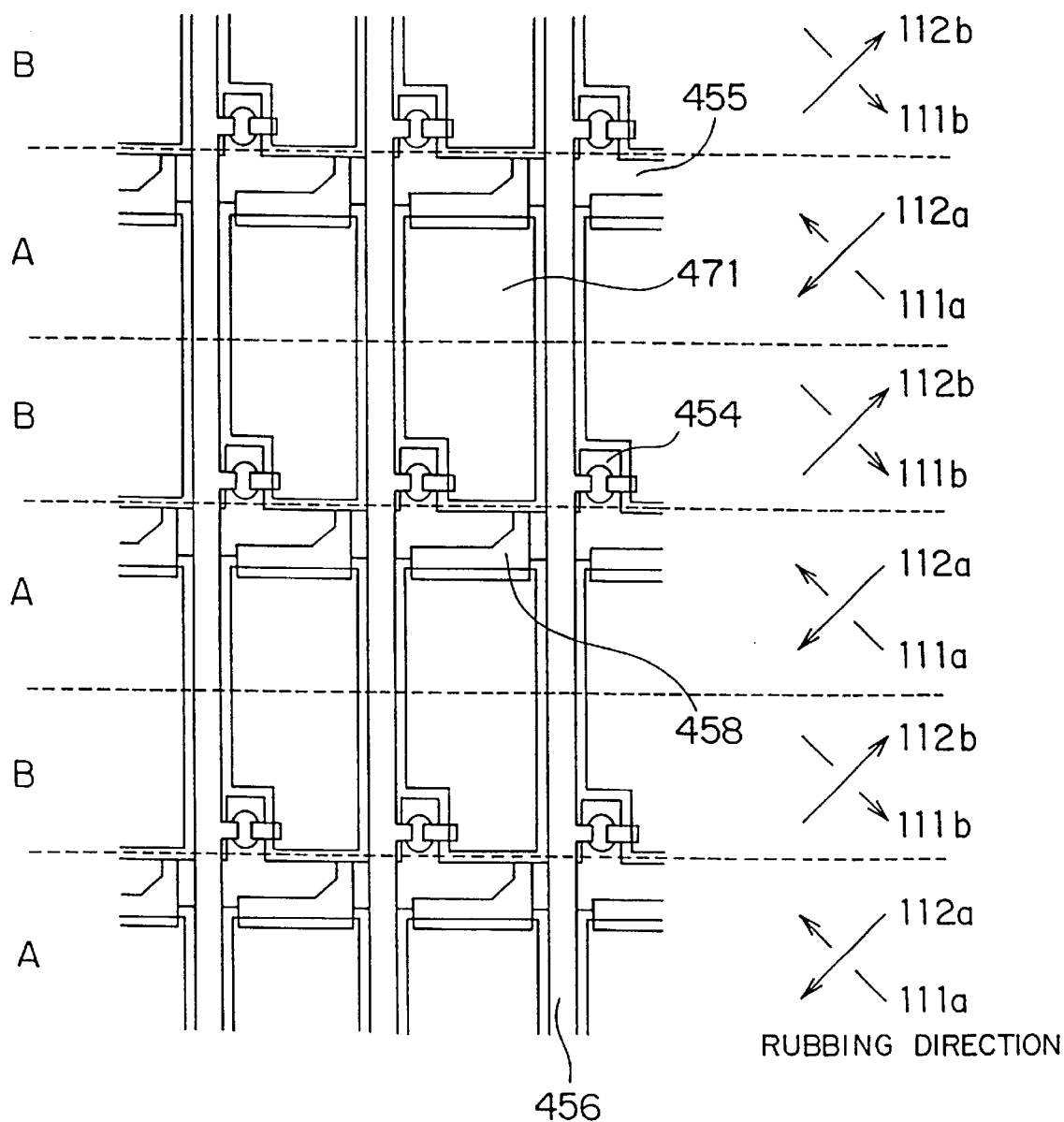
FIG. 56 is a plan view showing the structure of a liquid crystal display cell according to Embodiment 35.

FIG. 56 is a plan view showing a liquid crystal display cell according to the present embodiment. In this embodiment, both the first substrate 411 and the second substrate 412 have been subjected to plural-orientation alignment processes in orientation films thereof to provide liquid crystal in minute domains of each of pixels with different orientations, thereby enlarging the viewing angle of the display panel. The first portion and second portion of the first substrate 411 has been subjected to alignment processes in the directions 111$a$ and 111$b$, respectively, which are opposite to each other as shown in FIG. 56, and the first and the second portions of the second substrate 412 has been subjected to alignment processes in the directions 112$a$ and 112$b$, respectively, which are opposite to each other as shown in FIG. 56. Boundaries between the domains A and B include first straight lines each of which passes through the central portion of pixel electrode 471 and which is parallel to gate bus line 455, and second straight lines each of which passes between pixel electrode 471 and gate bus line 455 to which active element 454 for driving pixel electrode 471 was connected and which is parallel to gate bus line 455.

Figure 57A:
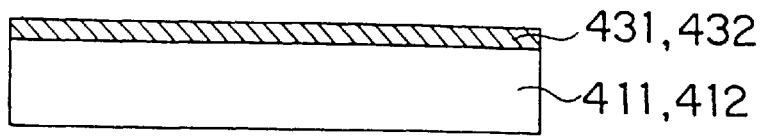
FIGS. 57A–57E are sectional views showing the steps of an alignment process performed for the substrates of Embodiment 34.
Figure 57B:
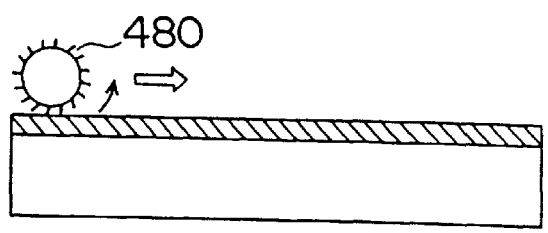
Figure 57C:
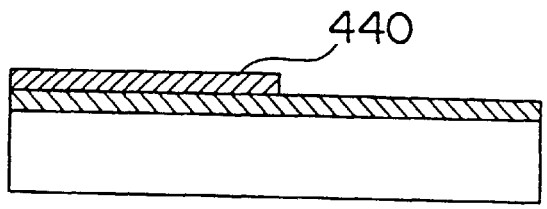
Figure 57D:
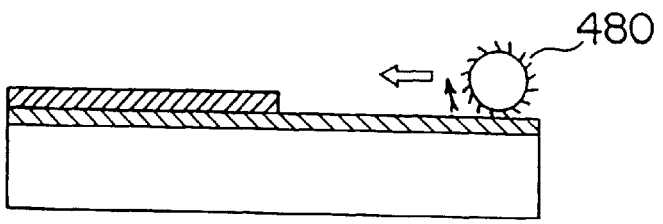
Figure 57E:
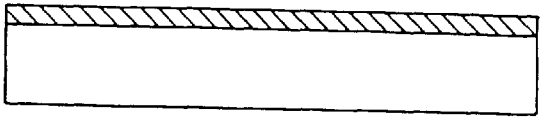

The process shown in FIGS. 57A–57E are used to effect alignment processes in different directions for each of minute areas of each of the substrates 411 and 412. First, as shown in FIG. 57A, an orientation film 431 or 432 made of an organic alignment agent such as polyimide is formed on the substrate 411 or 412. Subsequently, the orientation film 431 or 432 is rubbed from the left to the right as shown in FIG. 57B, with the rubbing roller 480 rotating in a counter-clockwise direction. During the rubbing process, a rubbing roller 480 having a buffing cloth such as rayon cloth wound therearound is advanced on the substrate 411 or 412 while being rotated. A resist 440 is then applied onto the orientation film 431 or 432, as shown in FIG. 57C, and the layer of the resist 440 is exposed to a light through a mask having a predetermined pattern corresponding to minute areas to be defined. The layer of resist 440 is then developed in a developing solution to form the predetermined pattern. Subsequently, as shown in FIG. 57D, the orientation film 431 or 432 is rubbed in the direction from the right to the left as shown in FIG. 57B, with the rubbing roller 480 rotating in the clockwise direction. Then, the resist pattern is removed with an organic solvent, as shown in FIG. 57E.

In the liquid crystal 420 of FIG. 56, a minute amount of a left-hand chiral agent is added to provide counter-clockwise rotation. Liquid crystal molecules are twisted counter-clockwise in parallel to the substrate by about 90° along the optical path from the inner surface of the second substrate 412 toward the inner surface of the first substrate 411, due to the function of the chiral agent and the directions of the alignment processes. Also, liquid crystal molecules in the vicinity of the inner surfaces of the substrates 411 and 412 have pre-tilted directions correspondingly to the directions of the alignment processes such that one of the ends of the major axes of the liquid crystal molecules in each of the areas and in the vicinity of the substrate deviates from the corresponding substrate along the direction indicated by the arrows in FIG. 56, with 117 the other end of the major axes staying on the substrate. Accordingly, major axes of liquid crystal in the areas A and those of liquid crystal in the areas B have different pre-tilt directions. Hence, the liquid crystal molecules in the areas A and B shown in FIG. 56 are urged to tilt in different rotational directions upon application of a voltage.

Figure 58A:
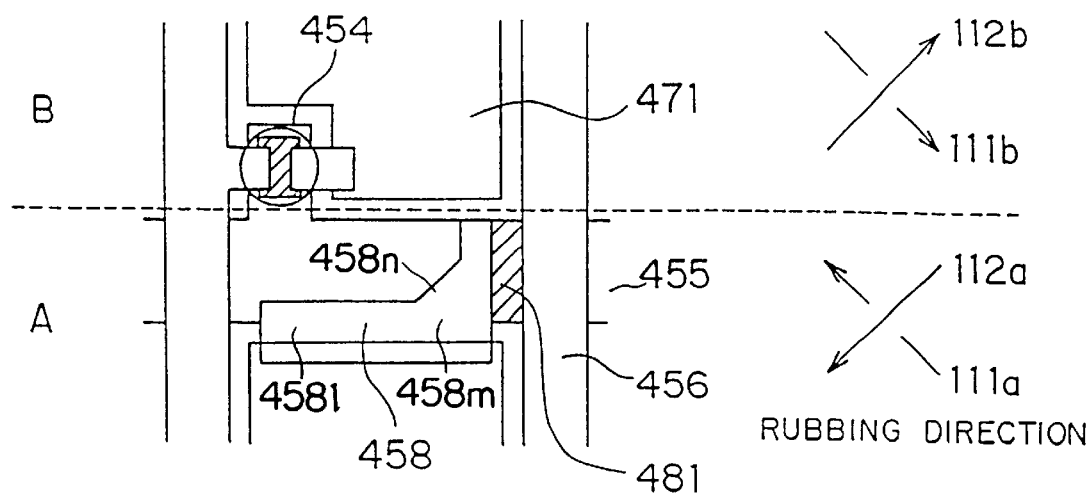
FIGS. 58A and 58B are views showing a configuration of a storage capacitor terminal of the liquid crystal display cell according to Embodiment 35.
Figure 58B:
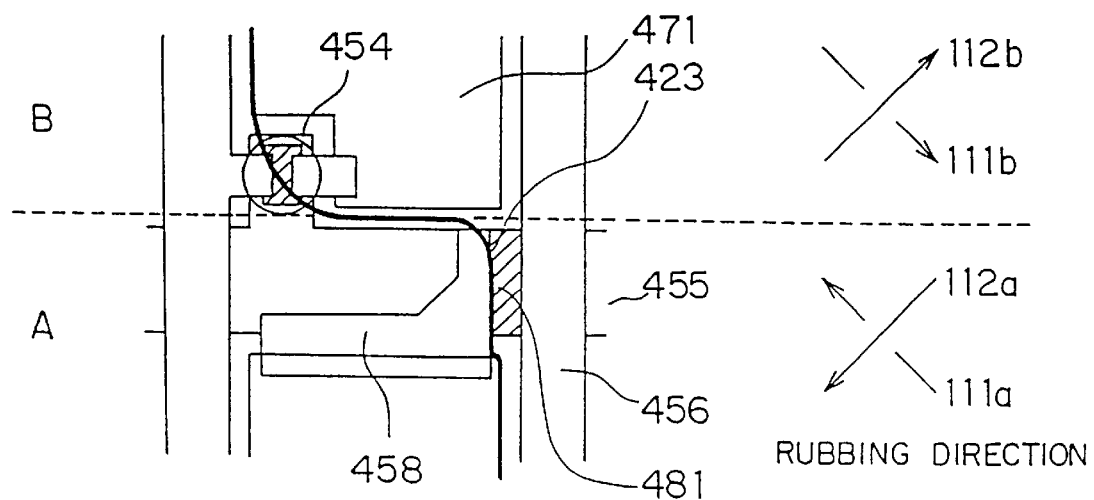

FIGS. 58A and 58B are partial plan views for showing a storage capacitor terminal of a liquid crystal display cell according to the present embodiment. The capacitor electrode 458 has a small width rectangular portion 458$l$, a large width rectangular portion 458$m$ and a tapered portion 458$n$ connecting the small width rectangular portion 458$l$ and the large width rectangular portion 458$m$. The large width rectangular portion 458$m$ has an edge flush with the far edge of the gate bus lines 455 far from the pixel electrode 471. FIGS. 58A and 58B show generation of a reverse tilt domain at the time when no voltage was applied to a pixel electrode, and disclination line at the time when a voltage was applied to the pixel electrode. As shown in those figures, substantially no reverse tilt domain appeared in the region of the pixel electrode. Thus, it was confirmed that excellent image quality was obtained over the entire surface of the liquid crystal display cell.

Embodiment 36

Figure 59:
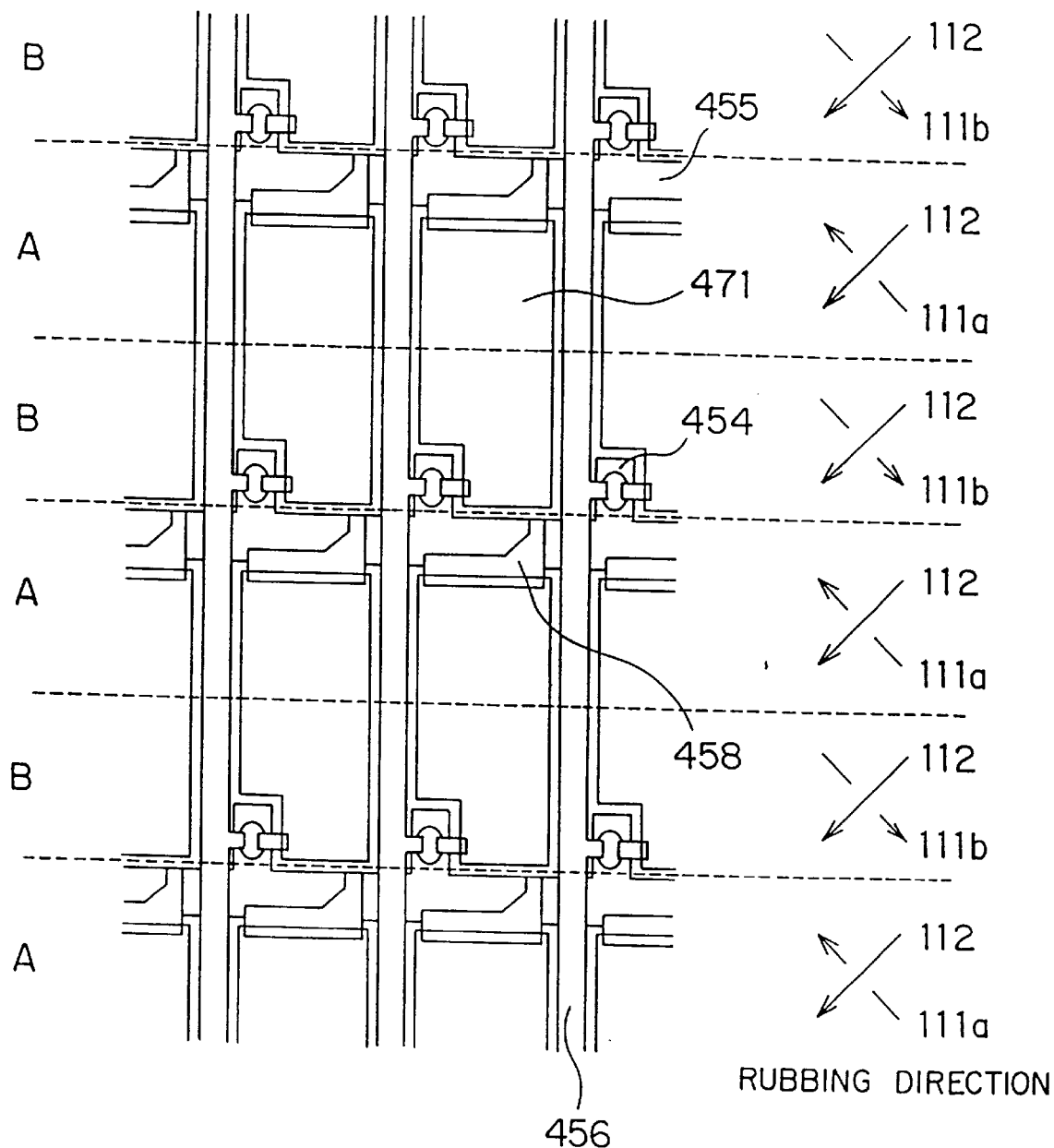
FIG. 59 is a plan view showing a liquid crystal display cell according to Embodiment 36.

FIG. 59 shows a schematic plan view of a liquid crystal display cell according to the present embodiment. This liquid crystal display cell is similar to that of Embodiment 35 except that a polyimide providing a higher pre-tilt angle is used for the orientation film 431 of the first substrate 411 on which pixel electrodes 471 are formed while another polyimide providing a lower pre-tilt angle is used for the orientation film 432 of the second substrate 412 on which a common electrodes 472 is provided, and that the second substrate 412 has been subjected to an alignment process in a single direction. Namely, only the first substrate 411 has been subjected to a plural-orientation alignment process in which minute areas of each pixel have different alignment directions. The second substrate 412 is rubbed only in one direction after the formation of the orientation film 432. When a voltage is applied to this type of liquid crystal display cell, the major axes of the liquid crystal in the areas A and B stand in different directions in an area-by-area fashion, thereby providing effects similar to those obtained in Embodiment 33.

It is noted that the areas A and the areas B may have different pre-tilt angles in the vicinity of the surface of the first substrate 411. In such a case, the direction of rubbing treatment for the second substrate 412 is determined such that the liquid crystal 420 has a splay-type deformation structure in the areas where the larger pre-tilt angle is provided. In the splay-type deformation structure, the pre-tilt direction in the vicinity of the inner surface of the first substrate differs from the pre-tilt direction of the liquid crystal in the vicinity of the inner surface of the second substrate. In this manner, the liquid crystals has a stable operation provided by the configuration of a plural-orientation alignment.

Figure 60A:
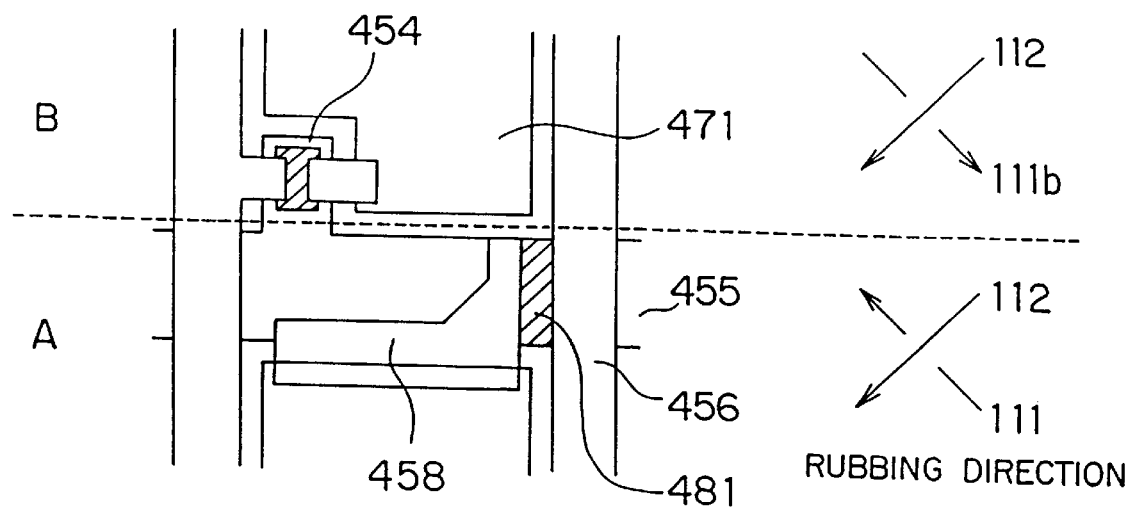
FIGS. 60A and 60B are views showing a configuration of a storage capacitor terminal of the liquid crystal display cell according to Embodiment 36.
Figure 60B:
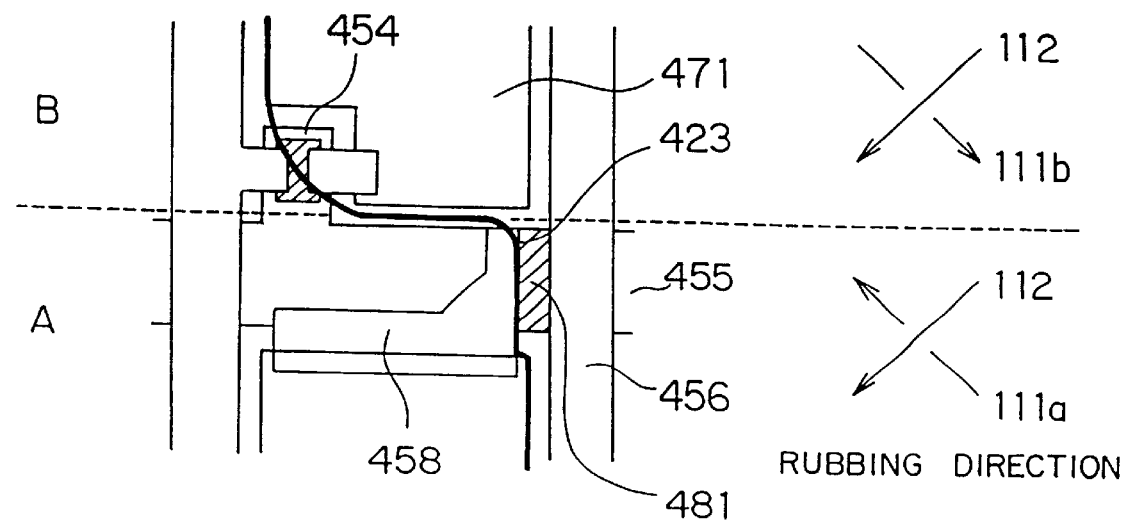

FIGS. 59 shows a part of the storage capacitor terminal 458 of the liquid crystal display cell according to the present embodiment. FIG. 60A and FIG. 60B show generation of a reverse tilt domain 481 at the time when no voltage was applied to a pixel electrode and disclination at the time when a voltage was applied to the pixel electrode. As will be understood from FIGS. 60A and 60B, substantially no reverse tilt domain was generated in the region of the pixel electrode. Thus, it was confirmed that an excellent image quality can be obtained over the entire surface of the liquid crystal display cell of the present embodiment.

In each of the areas for above the gate bus lines, an edge defining the planar shape of an end portion of a pixel electrode or a storage capacitor terminal has:

(1) at least one oblique straight line portion including a straight line which is not parallel or perpendicular to the direction in which the gate bus lines extend;

(2) at least one curved or arcuate portion; or (3) a crossing portion extending from one edge to the other edge of the gate bus line.

In the case where the edge defining the planar shape of an end portion of a pixel electrode or a storage capacitor terminal has a oblique straight line portion, effects of the fourth aspect of the present invention can be obtained by making a first angle between the direction of the inclined straight line and a projection, on the surface of the first substrate, of the major axes of liquid crystal molecules in the vicinity of the surface of the first substrate on the gate bus lines greater than a second angle between the direction in which the gate bus lines extend and the projection, on the surface of the first substrate, of the major axes of liquid crystal molecules in the vicinity of the surface of the first substrate on the gate bus lines.

In the case where the edge defining the planar shape of an end portion of a pixel electrode or a storage capacitor terminal has an arcuate portion or curved portion, effects of the third aspect of the present invention can be obtained by making the first angle between the direction of a tangential line of the arc portion and a projection, on the surface of the first substrate, of the major axes of liquid crystal molecules in the vicinity of the surface of the first substrate on the gate bus lines greater than the second angle between the direction in which the gate bus lines extend and the projection, on the surface of the first substrate, of the major axis of liquid crystal molecules in the vicinity of the surface of the first substrate on the gate bus lines.

Whether the edge as described above includes an inclined straight line portion or an arcuate portion, it is preferred that crystal liquid in the vicinity of the inclined straight line portion or the arcuate portion, in the vicinity of the first substrate, adjacent to the gate bus line and outside the storage capacitor electrode has a pre-tilted direction such that one of ends of major axes of the liquid crystal far from the edge portion stay away from the first substrate. In addition, more stable effects can be obtained when the edge has a crossing portion extending from one edge to the other edge of the gate bus line.

Similar effects can be obtained in a liquid crystal display cell in which at least one of the first and second substrates is subjected to a plural-orientation alignment process in which liquid crystals in each of minute areas are aligned in different directions in each cell to form sub-pixel domains. In this case, it is preferred that the boundary dividing each pixel into sub-pixel domains extend in the direction in which the gate bus lines extend, that each of at least a part of the boundaries be located between a pixel electrode and a gate bus line to which an active element for driving the pixel electrode is connected, and that the alignment process be performed such that liquid crystal molecules located in the vicinity of the center of the first and the second substrates "stand" in both of the sub-pixel domains such that one end of each major axis of the liquid crystal molecules near the boundary dividing the sub-pixel domains stays away from the first substrate with the other end of the major axis, which is far from the boundary staying on the substrate surface, upon application of a driving voltage between the electrodes.

With those configurations as described above, appearance of a disclination is suppressed in which the disclination lines is drawn to the central area of the pixel electrode by the edge portion of the storage capacitor terminals. Thus, it is possible to avoid appearance of defective reverse tilt domains on the gate bus lines. Accordingly, liquid crystal display cells which are free of deterioration of image quality such as variation in brightness and decrease in contrast can be manufactured without increasing the complexity of the manufacture.

Before describing embodiment of the fifth aspect of the present invention, construction and disadvantage of the conventional liquid crystal display will be described in connection with the fifth aspect for the sake of understanding.

Figure 62:
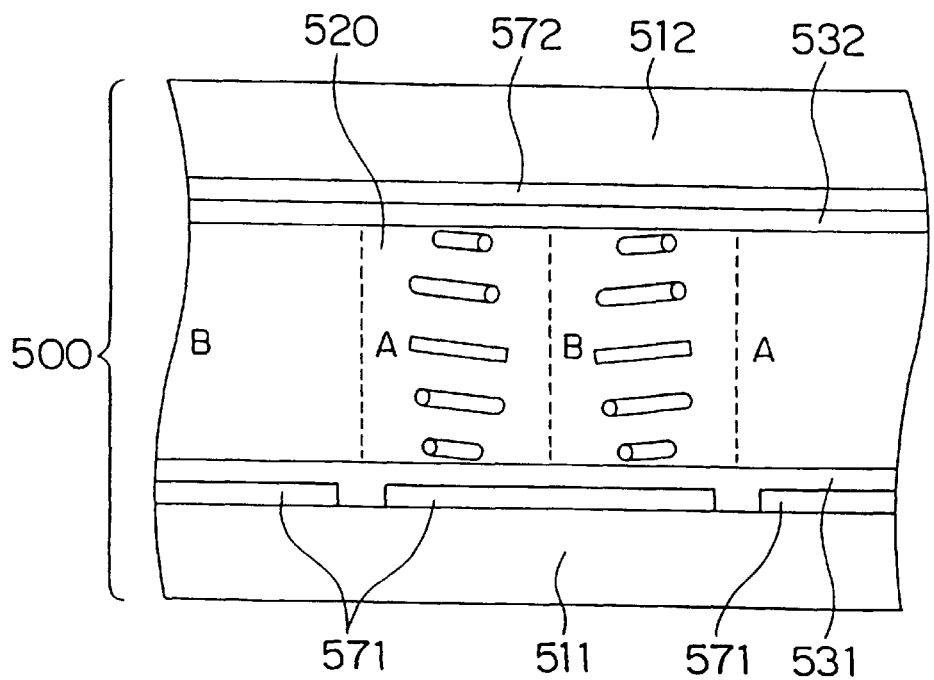
FIG. 62 is a sectional view showing the structure of a first conventional liquid crystal display cell in which liquid crystals are aligned in different directions in each the minute areas.

FIG. 62 shows a sectional view showing a configuration of a liquid crystal display cell disclosed in Publication No. JP-B-83-43723. In FIG. 62, minute areas A and B of the first and the second substrates have been subjected to alignment processes in different directions. As a result, the liquid crystal 520 in the sub-pixel domains A and B are urged to stand in different pre-tilt directions upon application of a voltage. The different viewing angles thus obtained in both the minute areas are averaged on the liquid crystal cell during operation thereof, thereby providing an improved viewing angle characteristic. The two-orientation alignment requests two rubbing processes in opposite directions or different directions during manufacturing the substrate.

Figure 63:
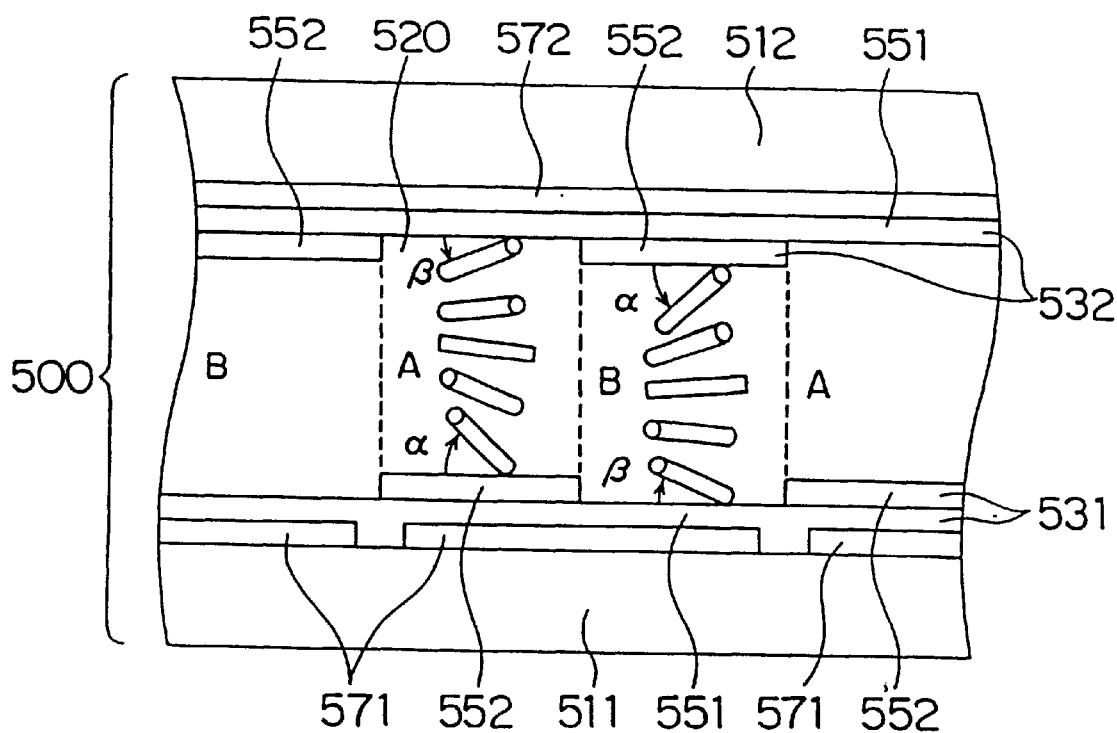
FIG. 63 is a sectional view showing the structure of a second conventional liquid crystal display cell in which liquid crystals are aligned in different directions in each the minute areas.

On the other hand, Publication No. JP-A-93-210099 discloses a structure in which a two-layer structure of an orientation film is formed on portions of a substrate in accordance with a predetermined pattern; so that minute areas A and B providing different pre-tilt angles are formed on a single substrate. In this structure, it is unnecessary to change the direction of the alignment process for each of the minute areas, and a similar effect in improving the viewing angle property can be obtained by a single rubbing process in a substrate. FIG. 63 shows a sectional view showing the structure of the liquid crystal panel disclosed in the publication. As shown in FIG. 63, each of orientation films 531 and 532 of both substrates 511 and 512 has a two-layer structure including a first alignment agent layer 551 and a second alignment agent layer 552.

The second alignment agent layer 552 of the orientation film 531 of the first or lower substrate 511 is removed in minute areas B so that the first alignment agent layer 551 is exposed. Although the directions of alignment and pre-tilt direction of the liquid crystal in the vicinity of the substrate are same in the minute areas A and B, the first alignment agent layer 551 and the second alignment agent layer 552 provide different pre-tilt angles $\alpha°$ and $\beta°$ ($\beta<\alpha$), respectively. Accordingly, in the vicinity of the surface of the orientation film 531 of the first substrate 511, the pre-tilt angle is $\alpha°$ in the minute areas A, while the pre-tilt angle is $\beta°$ in the minute areas B.

Similarly, the second alignment agent layer 552 of the orientation film 532 of the second or upper substrate 512 is removed in minute areas A so that the first alignment agent layer 551 is exposed in the minute areas A. Accordingly, in the vicinity of the surface of the orientation film 532 of the second substrate 512, the pre-tilt angle is $\beta°$ in the minute areas A while the pre-tilt angle is $\alpha°$ in the minute areas B.

In the structure as shown in FIG. 63, the orientation of the liquid crystal 520 in each of the minute areas A and B is gradually twisted, starting from the surface of the orientation film 531 of the first substrate 511 toward the surface of the orientation film 532 of the second substrate 512. Also, the pre-tilted direction of the liquid crystal with respect to the substrates gradually changes in the liquid crystal between the substrates such that a first pre-tilt (rotational) direction as indicated by arrows indicating pre-tilt angles is provided in the vicinity of the inner surface of one of the substrates whereas a second pre-tilt direction opposite to the first pre-tilt direction is provided in the vicinity of the inner surface of the other substrate, i.e. the liquid crystal exhibits a splay deformation. As a whole, the liquid crystal has a splay type TN deformation structure.

When the minute areas A and the minute areas B are compared to each other in themselves, it will be understood that the pre-tilt angles of liquid crystal in the vicinity of the surfaces of the orientation films of the first and second substrates differ from each other. In case of the liquid crystal cell in which the pre-tilt angle in the vicinity of the second substrate differs from the pre-tilt angle in the vicinity of the first substrate, liquid crystals generally stands or tilts in one of the pre-tilt directions which provides a larger pre-tilt angle, upon application of a voltage. Accordingly,' liquid crystals in each of the minute areas A between both the substrates tilt in the pre-tilt direction provided by the orientation film of the first substrate, and liquid crystal in each of the minute areas B between both the substrate tilt in the pre-tilt direction provided by the orientation film of the second substrate upon application of a voltage.

As described above, the liquid crystal in the minute areas A and the liquid crystal in the minute areas B are urged to have different pre-tilt directions upon application of a voltage to provide different viewing angles. The different viewing angles thus obtained in the minute areas are averaged on the liquid crystal cell. In this manner, the structure described in Publication No. JP-A-93-210099 provides an effect similar to that provided by the structure of Publication No. JP-B-83-43723.

Figure 64A:
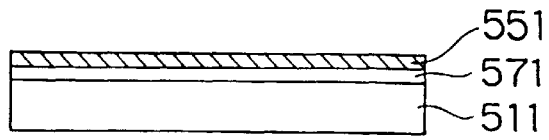
FIGS. 64A through 64E are sectional views showing the steps of an alignment process for the liquid crystal display cell shown in FIG. 63.
Figure 64B:
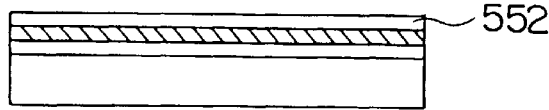
Figure 64C:
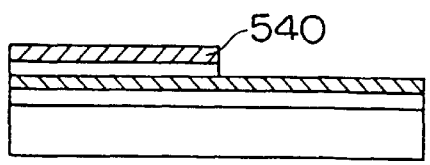
Figure 64D:
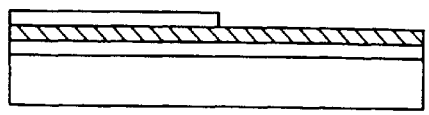
Figure 64E:
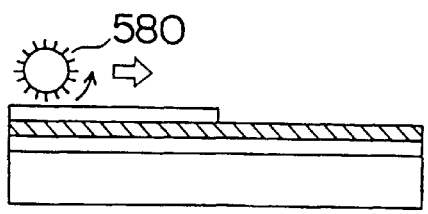

The two-layer structure of an orientation film as described above which provides different pre-tilt angles in the minute areas can be obtained by an alignment process shown in FIGS. 64A through 64E. FIG. 64A shows the step in which a first alignment agent layer 551 is formed, FIG. 64B shows the step in which a second alignment agent layer 552 is formed, FIG. 64C shows the step in which parts of the second alignment agent layer 552 are removed in accordance with a pattern which has been formed by photolithography using a resist material 540, FIG. 64D shows the step in which the photoresist pattern is removed, and FIG. 64E shows the step in which a rubbing treatment is performed.

Figure 67:
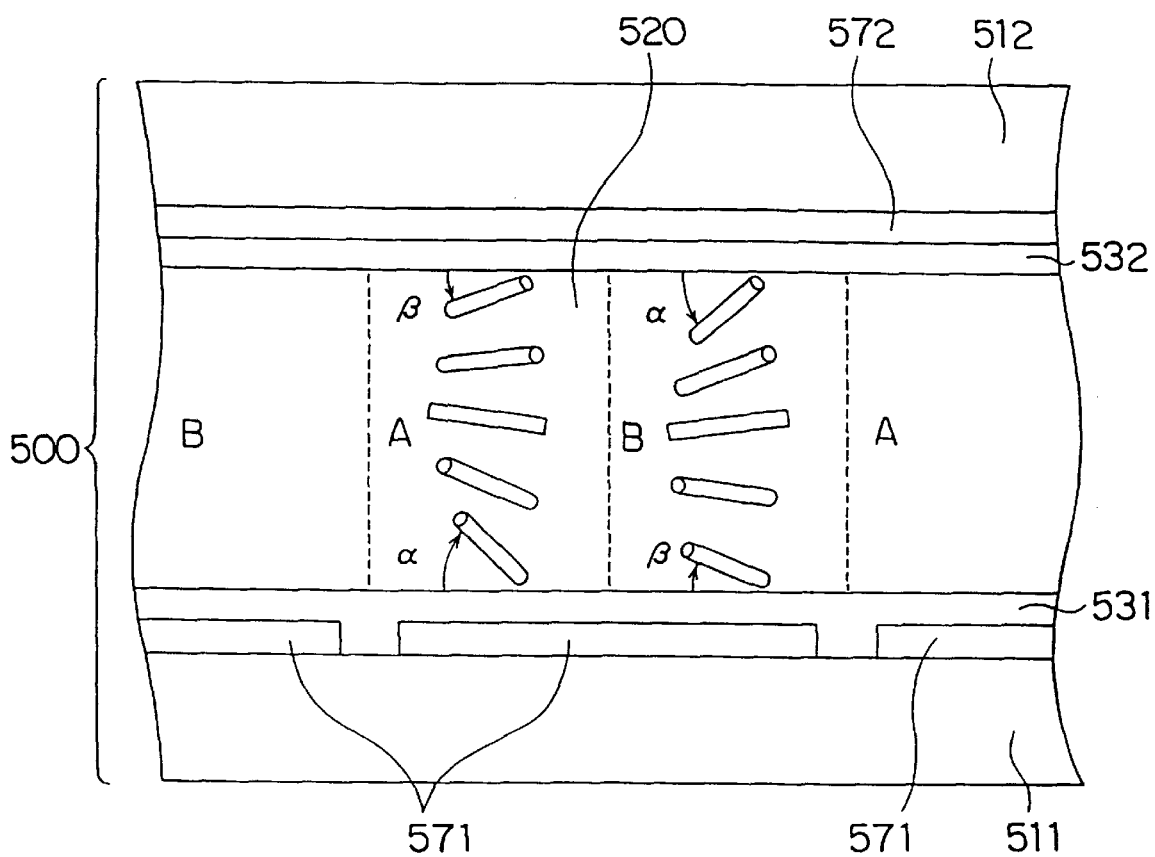
FIG. 67 is a sectional view showing the structure of another conventional liquid crystal display cell in which liquid crystals are aligned in diferent directions in each of minute areas.

Publication No. JP-A-94-148641 describes a liquid crystal cell in which an orientation film for one of the substrates has a partial two-layer structure so as to provide different pre-tilt angles in the minute areas A and B, and another orientation film for the other substrate has a single-layer structure so as to provide a uniform pre-tilt angle. FIG. 67 shows a sectional view showing the structure of the liquid crystal cell of this publication.

In FIG. 67, the orientation film 531 of the first substrate 511 has been subjected to an alignment process in the same manner as applied to the liquid crystal cell shown in FIG. 63. In the vicinity of the surface of the orientation film 531 of the first substrate 511, a pre-tilt angle of $\alpha°$ is provided to the liquid crystal 520 in each of the minute areas A, and a pre-tilt angle of $\beta°$ in each of the minute areas B.

On the other hand, the orientation film 532 of the second substrate 512 has a single layer, and has been rubbed in one direction. In the vicinity of the surface of the orientation film 532 of the second substrate 511, a pre-tilt angle of $\gamma°$ ($\alpha>\gamma>\beta$) is provided to the liquid crystal 520 in each of the minute areas B.

The liquid crystal 520 in FIG. 67 has a splay-type TN deformation structure similarly to the liquid crystal display cell shown in FIG. 63. When the minute areas A and the minute areas B are compared to each other in themselves, it can be found that the pre-tilt angles of liquid crystal in the vicinity of the surfaces of the orientation films of the first and second substrates differ from each other. Upon application of a voltage, liquid crystal 520 in each of the minute areas A stands to be aligned with the pre-tilt direction in the vicinity of the orientation film 531 of the first substrate 511, and liquid crystal in each of the minute areas B stands to be aligned with the pre-tilt direction in the vicinity of the surface of the orientation film 532 of the second substrate 512. Thus, the liquid crystal in the minute areas A and the liquid crystal in the minute areas B are urged to have different orientations upon application of a voltage.

The different viewing angles in the minute areas are averaged on the liquid crystal cell. Accordingly, the structure described in Publication No. JP-A-1994-148641 provides an effect similar to those provided by the structures described in Publication Nos. JP-A-94-210099 and JP-A-1983-43723.

As described above, in the conventional methods for manufacturing liquid crystal display cells, a two-layer structure is formed on at least one of the orientation films such that liquid crystals are differently aligned in minute areas.

Accordingly, the conventional methods require many steps of, e.g., applying a first alignment agent, applying a second alignment agent, forming a predetermined photoresist pattern by photolithography, partly removing the layer of the second alignment agent in accordance with the photoresist pattern, and removing the photoresist pattern.

Now preferred embodiments according to the fifth aspect of the present invention will be described.

Embodiment 37

Figure 61:
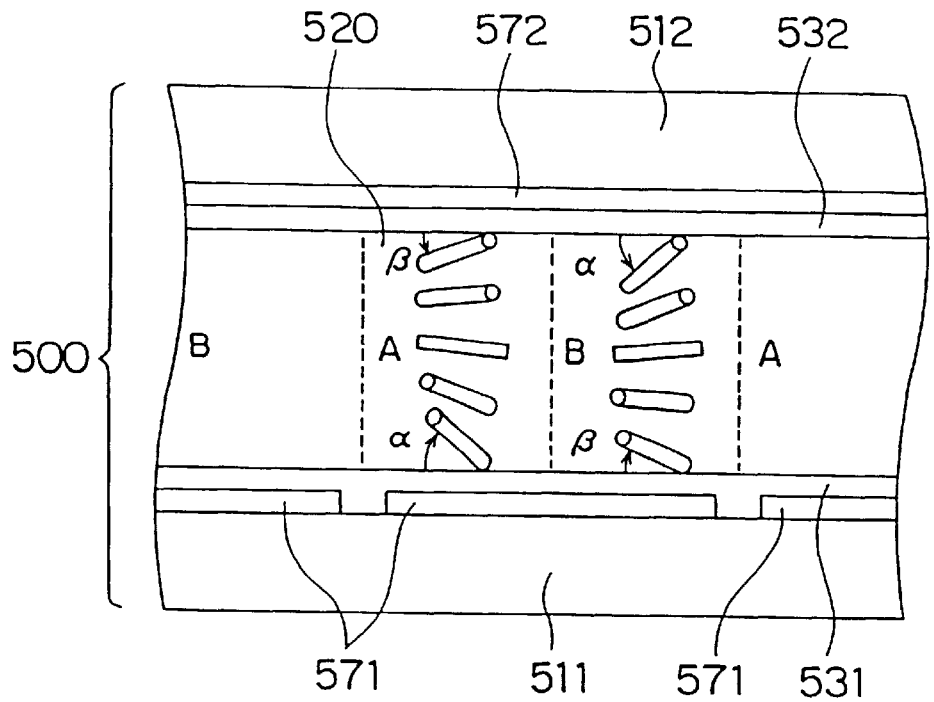
FIG. 61 is a sectional view showing an embodiment according to the fifth aspect of the present invention.

FIG. 61 shows a liquid crystal cell 500 which is to be manufactured by a method according to the fifth aspect of the present embodiment. Unillustrated polarizing cell are disposed on both sides of the liquid crystal cell 500. The liquid crystal cell 500 has a structure such that a liquid crystal 520 is filled between a pair of transparent substrates 511 and 512. Pixel electrodes 571 and an orientation film 531 are provided on the inner surface of the first substrate 511 or lower substrate as viewed in FIG. 61. The pixel electrodes 571 are connected to an unillustrated active matrix circuit. A common electrode 572 of ITO is provided on the inner surface of the second substrate 511 or upper substrate as viewed in FIG. 61. Another orientation film 532 is formed on the common electrode 572.

The method according to the present embodiment will be described with reference to FIGS. 65A through 65E. Although only the substrate 511 is shown in FIGS. 65A through 65E, the substrate 512 is treated in a similar manner, as will be shown by reference numerals in parenthesis.

Figure 65A:
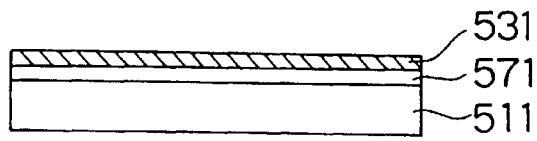
FIGS. 65A through 65D are sectional views showing the steps of an alignment process for the liquid crystal display cell shown in FIG. 61.
Figure 65B:
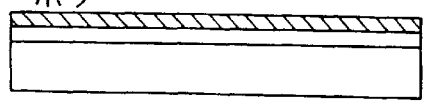
Figure 65C:
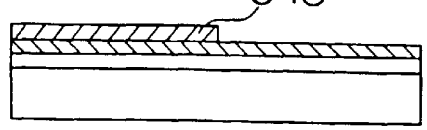
Figure 65D:
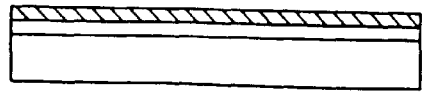

In FIG. 65A, an orientation film 531 (532) made of an organic alignment agent such as polyimide is formed on the substrate 511 (512). Subsequently, the orientation film 531 (532) is subjected to rubbing in a predetermined direction. That is, a rubbing roller 580 having a buffing cloth such as rayon cloth wound therearound is advanced on the substrate 511 (512) from the left to the right as viewed in FIG. 65B while being rotated in a counter-clockwise direction. A photoresist 540 is then applied onto the orientation film 531 (532), as shown in FIG. 65C, and the layer of the photoresist 540 is exposed to light through a mask having a chequered pattern corresponding to minute areas to be defined. The layer of photoresist 540 is then developed with a developing solution to form a chequered photoresist pattern. Subsequently, the photoresist pattern is removed with an organic solvent, as shown in FIG. 65D. In the present embodiment, K-100b of Toray Corp. is used as the alignment agent, while ethyl lactate is used for removing the photoresist pattern.

Figure 66:
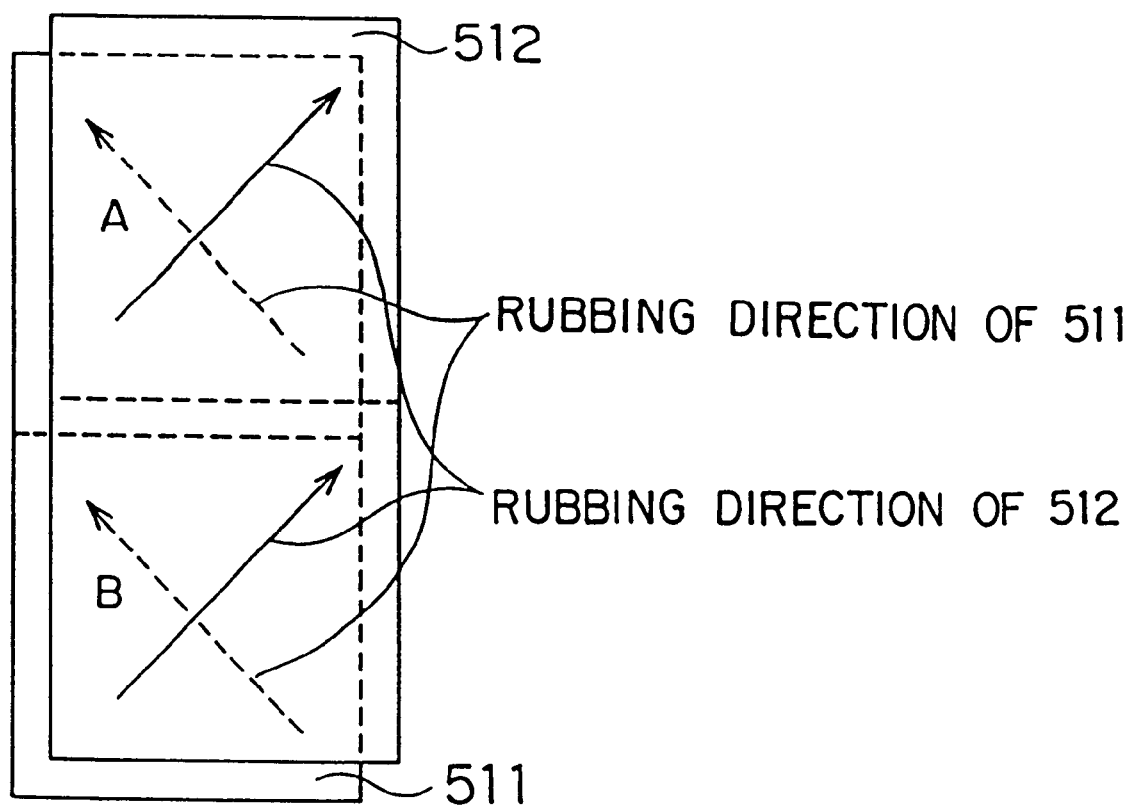
FIG. 66 shows rubbing directions of orientation films shown in FIG. 61.

The substrates which have been subjected to the alignment process as described above are combined with each other such that the directions of the rubbing processes performed on the substrates are substantially perpendicular to each other, as shown in FIG. 66 illustrating rubbing direction of the first and the second substrate. The substrates 511 and 512 are also adhered to each other such that the surface areas of the orientation film 531 covered by the photoresist 540 after the development step oppose to the surface areas of the orientation film 532 not covered by the photoresist 540 after the development step, while the surface areas of the orientation film 531 not covered by the photoresist 540 after the development step oppose to the surface areas of the orientation film 532 covered by the photoresist 540 after the development step. In FIG. 66, solid lines represent the rubbing directions of second substrate 512 while dotted line represent rubbing direction of the first substrate 511. Subsequently, a nemtaic liquid crystal 520 containing a left-hand chiral agent for counter-clockwise rotation of the liquid crystal is filled between the substrates 511 and 512.

In the liquid crystal 520, the orientation of liquid crystals is progressively twisted by about 90° from the substrate 511 toward the substrate 512 due to the chiral agent and the alignment process as described above. Also, the pre-tilt direction with respect to the substrate surfaces progressively changes from the first substrate 511 toward the second substrate 512 so that the pre-tilt direction is opposite between the liquid crystal in the vicinity of the first substrate and that in the vicinity of the second substrate, as shown by arrows marked to the arcs for representing degrees $\alpha°$ and $\beta°$ in FIG. 61. With this structure, the liquid crystal 520 exhibits splay-type deformation so that the overall structure of the liquid crystal is called a splay-type TN deformation structure.

For the liquid crystal display cell manufactured in the manner as described above, pre-tilt angles in the vicinity of the inner surface of the substrates were measured. The pre-tilt angle in the area covered by the photoresist 540 after development was 5° while the pre-tilt angle in the area not covered by the photoresist was 1°, which measurement revealed that these two areas provided effective different pre-tilt angles.

As described above, in the liquid crystal 520, the orientation of liquid crystals in each of minute areas A differ from the orientation of liquid crystals in each of minute areas B. In each area A, the pre-tilt angle in the vicinity of surface of the first substrate 511 is larger than the pre-tilt angle in the vicinity of the inner surface of the second substrate 512. On the contrary, in each area B, the pre-tilt angle in the vicinity of the inner surface of the second substrate 512 is larger than the pre-tilt angle in the vicinity of the inner surface of the first substrate 511.

It was observed that when a voltage was applied to the liquid crystal display cell, liquid crystal in each of the minute areas A and B stood (tilted) in one direction according to the direction provided by a larger one of the pre-tilt angles between the inner surfaces of both substrates 511 and 512. In other words, liquid crystal in each of the minute areas A located from the first substrate toward the second substrate was aligned with the pre-tilt direction provided by the inner surface of the first substrate 511, while liquid crystal in each of the minute areas B located from the first substrate toward the second substrate was aligned with the pre-tilt direction provided by the inner surface of the second substrate 511.

That is, the liquid crystal in the minute areas A and the liquid crystal in the minute areas B were aligned in different directions upon application of the voltage. These different viewing angles in the minute areas were averaged on the liquid crystal display cell. Accordingly, an improved viewing angle characteristic was obtained which provided a wider viewing angle and which was symmetric as a whole.

Embodiment 38

The procedure of Embodiment 37 was repeated using SE-7210 supplied from Nissan Chemical Corp. as an orientation film. A liquid crystal cell was obtained in which pre-tilt angles in the minute areas differ from each other. The pre-tilt angle in the areas covered by the photoresist 540 after development(shown in FIG. 65C) was 4° while the pre-tilt angle in the remaining areas was 7°. Thus, the liquid crystal in the minute areas A and the liquid crystal in the minute areas B were aligned to different orientations upon application of a voltage. These different viewing angles in the minute areas were averaged, and an improved viewing angle characteristic was obtained which provided a wider viewing angle and which was symmetric as a whole.

Embodiment 39

The procedure of Embodiment 37 was repeated by using RN-715 of Nissan Chemical Corp. as an orientation film. A liquid crystal display cell was obtained in which pre-tilt angles in the minute areas differ from each other. The pre-tilt angle in the areas covered by the photoresist 540 after development was 9° while the pre-tilt angle in the remaining areas was 12°. Thus, the liquid crystals in the minute areas A and the liquid crystals in the minute areas B were aligned to different orientations upon application of a voltage. These different viewing angles in the minute areas were averaged, and an improved viewing angle characteristic was obtained which provided a wider viewing angle and which was symmetric as a whole.

Embodiment 40

Figure 68:
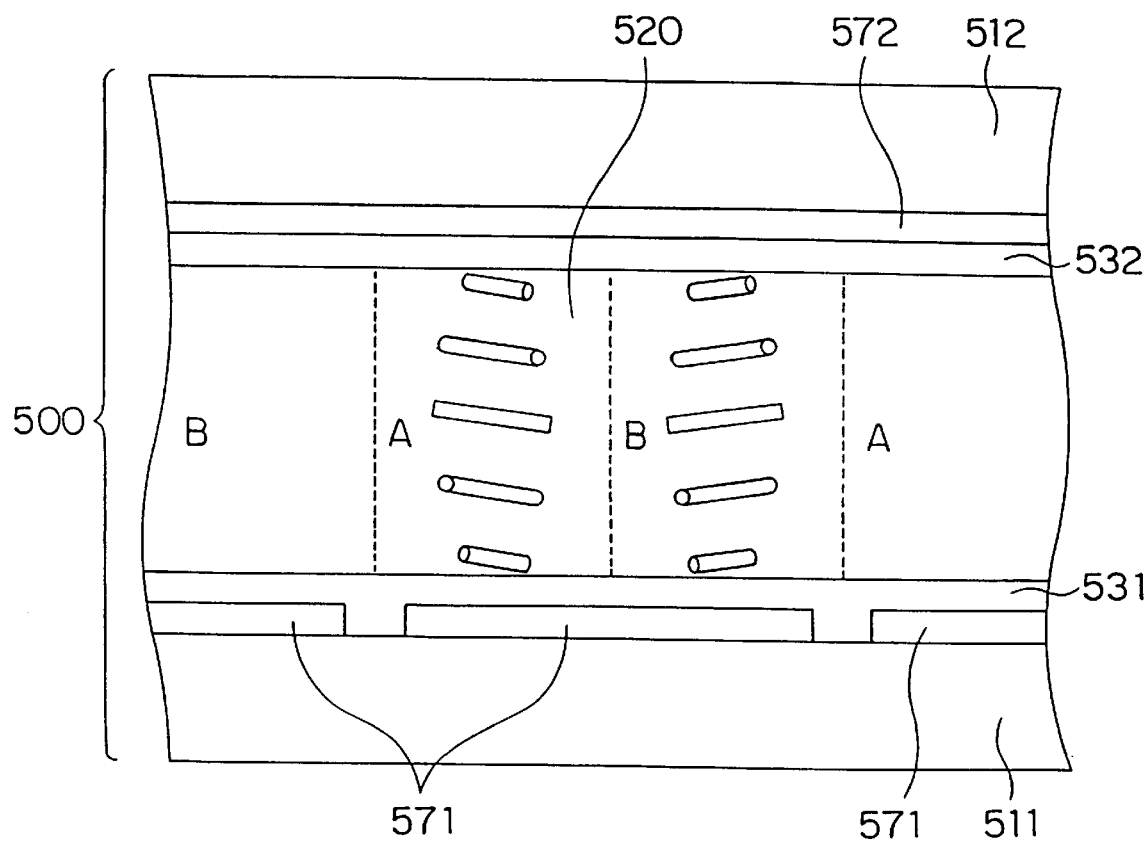
FIG. 68 is a sectional view showing another embodiment according to the sixth aspect of the present invention.

FIG. 68 shows a liquid crystal display cell 500 manufactured by a method of the present embodiment. Unillustrated polarizing panels are disposed on both sides of the liquid crystal display cell 500. The liquid crystal display cell 500 has a structure such that a liquid crystal 520 is filled between a pair of transparent substrates 511 and 512. Pixel electrodes 571 and an orientation film 531 are provided on the inner surface of the first substrate or lower substrate 511 as viewed in FIG. 68. The pixel electrodes 571 are connected to an unillustrated active matrix circuit. A common electrode 572 made of ITO is provided on the inner surface of the second substrate or upper substrate 512. Another orientation film 532 is formed on the common electrode 572.

The orientation alignment process for the first substrate 511 is performed in the same manner as that used for the liquid crystal cell of Embodiment 37, as described with reference to FIGS. 65A through 65D. Meanwhile, the alignment process for the second substrate 512 is performed in a simpler manner. An orientation film 532 made of an organic alignment agent such as polyimide is formed on the substrate 512. Subsequently, the orientation film 532 is rubbed in a predetermined direction. In the present embodiment, K-100b of Toray Corp. was used as the alignment agent for the orientation film 531 of the first substrate 511, while SE-7311 of Nissan Chemical Corp. was used as the alignment agent for the orientation film 532 of the second substrate 512.

The substrates which have been subjected to the above-described alignment process were combined with each other in the similar manner as in Embodiment 37. Subsequently, a nematic liquid crystal 520 containing a left-hand chiral agent was filled between the substrates. With this structure, the liquid crystal 520 has a splay-type TN deformation structure as a whole.

Using a liquid crystal display cell manufactured in the manner as described above, pre-tilt angles in the vicinity of the inner surfaces of the substrates were measured. As for the first substrate 511, the same results were obtained as in Embodiment 37. That is, the pre-tilt angle in the area covered by the photoresist 540 after development was 5° while the pre-tilt angle in other area not covered by the the photoresist 540 after development was 1°. As for the second substrate, the pre-tilt angle was 3° in all the areas.

With the structure as described above, in the liquid crystal 520 shown in FIG. 68, the orientation of liquid crystals in each of minute areas A differ from the orientation of liquid crystals in each of minute areas B. In each area A, the pre-tilt angle in the vicinity of the inner surface of the first substrate 511 is larger than the pre-tilt angle in the vicinity of the inner surface of the second substrate 512. On the other hand, in each area B, the pre-tilt angle in the vicinity of the inner surface of the second substrate 512 is larger than the pre-tilt angle in the vicinity of the inner surface of the first substrate 511. It was observed that when a voltage was applied to the liquid crystal display cell, liquid crystal in each of the minute areas A and B are oriented to a direction provided by larger one of the pre-tilt angles between the inner surfaces of both the substrates 511 and 512, liquid crystal in each of the minute areas A between the substrate was aligned with the pre-tilt direction provided by the inner surface of the first substrate 511, while liquid crystal in each of the minute areas B between the substrates was aligned with the pre-tilt direction provided by the inner surface of the second substrate 511. Thus, the liquid crystal in the minute areas A and the liquid crystals in the minute areas B were urged to stand upon the application of the voltage so as to have different orientations. Those different viewing angles in the minute areas were averaged on the liquid crystal display cell. Thus, an improved viewing angle characteristic was obtained which provided a wider viewing angle and which was symmetric as a whole.

Although the present invention is described with reference to the preferred embodiments, the present invention is not limited to such embodiments and it will be obvious for those skilled in the art that various modifications or alterations can be easily made based on the above embodiments within the scope of the present invention.

What is claimed is:

1. A liquid crystal display comprising:

a first and a second substrate opposed to each other;

an array of pixel electrodes overlying said first substrate, each of said pixel electrodes defining a pixel area and having an active element for applying a voltage to said pixel electrode;

at least one counter electrode overlying said second substrate and opposing said array of pixel electrodes;

a first and a second orientation film overlying said pixel electrode and said counter electrode, respectively, at least one of said first orientation film and said second orientation film being subjected to a divided orientation alignment in different directions to divide each said pixel area at a boundary into a first area and a second area;

a plurality of gate bus lines each for supplying a signal to control electrodes of a row of said active elements and a plurality of drain bus lines each for supplying a voltage to a column of said pixel electrodes through corresponding said active element;

liquid crystal interposed between said first orientation film and said second orientation film, said first area and said second area defining a first domain and a second domain, respectively, for said liquid crystal;

a first shield film, having at least a first part thereof disposed in alignment with a region corresponding to at least one of said gate bus lines and having at least a second part thereof disposed in alignment with a region corresponding to at least one of said drain bus lines, for shielding a disclination deformed by a lateral electric field acting between said pixel electrode and said at least one of said gate bus lines and drain bus lines during operation of said liquid crystal display cell; and a second shield film having at least a first part thereof disposed in alignment with a region adjacent to at least one of said gate bus lines, having at least a second part thereof disposed in alignment with a region adjacent to at least one of said drain bus lines, and having at least a third part thereof disposed in alignment with said boundary, for shielding a disclination deformed by a lateral field acting between said pixel electrode and said at least one of said gate bus lines and drain bus lines during operation of said liquid crystal display cell, wherein said first shield film overlies said second substrate, and wherein said second shield film is formed on said second substrate.

2. The liquid crystal display according to claim 1, wherein said first shield film is positioned so as to entirely surround each of said pixel electrodes along a plane corresponding to a cross-section of said each of said pixel electrodes.

3. liquid crystal display comprising:

a first and a second substrate opposed to each other;

an array of pixel electrodes overlying said first substrate, each of said pixel electrodes defining a pixel area and having an active element for applying a voltage to said pixel electrode;

at least one counter electrode overlying said second substrate and opposing said array of pixel electrodes;

a first and a second orientation film overlying said pixel electrode and said counter electrode, respectively, at least one of said first orientation film and said second orientation film being subjected to a divided orientation alignment in different directions to divide each said pixel area at a boundary into a first area and a second area;

a plurality of gate bus lines each for supplying a signal to control electrodes of a row of said active elements and a plurality of drain bus lines each for supplying a voltage to a column of said pixel electrodes through corresponding said active element;

liquid crystal interposed between said first orientation film and said second orientation film, said first area and said second area defining a first domain and a second domain, respectively, for said liquid crystal;

a first shield film, having at least a first part thereof disposed in alignment with a region corresponding to at least one of said gate bus lines and having at least a second part thereof disposed in alignment with a region corresponding to at least one of said drain bus lines, for shielding a disclination deformed by a lateral electric field acting between said pixel electrode and said at least one of said gate bus lines and drain bus lines during operation of said liquid crystal display cell; and a second shield film having at least a first part thereof disposed in alignment with a region adjacent to at least one of said gate bus lines, and having at least a second part thereof disposed in alignment with said boundary, for shielding a disclination deformed by a lateral field acting between said pixel electrode and said at least one of said gate bus lines and drain bus lines during operation of said liquid crystal display cell, wherein said first shield film overlies said second substrate, and wherein said second shield film is formed on said second substrate.

4. A liquid crystal display comprising:

a first and a second substrate opposed to each other;

an array of pixel electrodes overlying said first substrate, each of said pixel electrodes defining a pixel area and having an active element for applying a voltage to said pixel electrode;

at least one counter electrode overlying said second substrate and opposing said array of pixel electrodes;

a first and a second orientation film overlying said pixel electrode and said counter electrode, respectively, at least one of said first orientation film and said second orientation film being subjected to a divided orientation alignment in different directions to divide each said pixel area at a boundary into a first area and a second area;

a plurality of gate bus lines each for supplying a signal to control electrodes of a row of said active elements and a plurality of drain bus lines each for supplying a voltage to a column of said pixel electrodes through corresponding said active element;

liquid crystal interposed between said first orientation film and said second orientation film, said first area and said second area defining a first domain and a second domain, respectively, for said liquid crystal;

a first shield film, having at least a first part thereof disposed in alignment with a region corresponding to at least one of said gate bus lines and having at least a second part thereof disposed in alignment with a region corresponding to at least one of said drain bus lines, for shielding a disclination deformed by a lateral electric field acting between said pixel electrode and said at least one of said gate bus lines and drain bus lines during operation of said liquid crystal display cell; and a second shield film having at least a first part thereof disposed in alignment with a region adjacent to at least one of said drain bus lines, and having at least a second part thereof disposed in alignment with said boundary, for shielding a disclination deformed by a lateral field acting between said pixel electrode and said at least one of said gate bus lines and drain bus lines during operation of said liquid crystal display cell, wherein said first shield film overlies said second substrate, and wherein said second shield film is formed on said second substrate.

* * * * *